US012162295B2

(12) United States Patent
Hwang et al.

(10) Patent No.: US 12,162,295 B2
(45) Date of Patent: Dec. 10, 2024

(54) METHOD OF MANAGING THERMAL PRINTER AND THERMAL PRINTER FOR PERFORMING THE SAME

(71) Applicant: BIXOLON CO., LTD., Seongnam-si (KR)

(72) Inventors: Junho Hwang, Seongnam-si (KR); Jin Kook Kim, Seongnam-si (KR); Chan Wook Kang, Seongnam-si (KR); Seung Yong Kim, Seongnam-si (KR)

(73) Assignee: BIXOLON CO., LTD., Seongnam-si (KR)

( * ) Notice: Subject to any disclaimer, the term of this patent is extended or adjusted under 35 U.S.C. 154(b) by 0 days.

(21) Appl. No.: 18/349,572

(22) Filed: Jul. 10, 2023

(65) Prior Publication Data

US 2023/0347669 A1 Nov. 2, 2023

Related U.S. Application Data

(63) Continuation of application No. 17/233,876, filed on Apr. 19, 2021, now Pat. No. 11,738,584.

(30) Foreign Application Priority Data

Apr. 28, 2020 (KR) ........................ 10-2020-0051257
Apr. 28, 2020 (KR) ........................ 10-2020-0051258
(Continued)

(51) Int. Cl.
*B41J 29/17* (2006.01)
*B41F 31/30* (2006.01)
(Continued)

(52) U.S. Cl.
CPC ............. *B41J 29/17* (2013.01); *B41F 31/304* (2013.01); *B41J 2/32* (2013.01); *B41J 2/35* (2013.01);
(Continued)

(58) Field of Classification Search
None
See application file for complete search history.

(56) References Cited

U.S. PATENT DOCUMENTS 5,779,370 A 7/1998 Schroeder et al.
5,995,126 A 11/1999 Imai
(Continued)

FOREIGN PATENT DOCUMENTS

CN 102180034 A 9/2011
EP 0 256 660 A2 2/1988
(Continued)

OTHER PUBLICATIONS

Hoshii, MachineTranslationofJP-2015193155-A, 2015 (Year: 2015).*
(Continued)

*Primary Examiner* — Scott A Richmond
(74) *Attorney, Agent, or Firm* — Sughrue Mion, PLLC

(57) ABSTRACT

Disclosed herein is a method of managing a printing apparatus including a thermal print head. The method of managing a printing apparatus includes: starting, by the controller of a printing apparatus, the cleaning of a thermal print head when a predetermined condition is satisfied; selecting, by the controller, a cleaning method based on at least one the satisfied condition and previously stored information; and cleaning, by the controller, the thermal print head by driving at least one of heating elements, included in a plurality of recording elements constituting the thermal print head, according to the selected cleaning method.

19 Claims, 40 Drawing Sheets

(30) Foreign Application Priority Data

| | | | |
|---|---|---|---|
| Apr. 28, 2020 | (KR) | ........................ | 10-2020-0051259 |
| May 22, 2020 | (KR) | ........................ | 10-2020-0061560 |
| Jan. 29, 2021 | (KR) | ........................ | 10-2021-0013669 |

(51) Int. Cl.

| | |
|---|---|
| ***B41J 2/32*** | (2006.01) |
| ***B41J 2/35*** | (2006.01) |
| ***B41J 11/04*** | (2006.01) |
| ***B41J 11/24*** | (2006.01) |
| *B41J 2/165* | (2006.01) |
| *B41J 29/13* | (2006.01) |

(52) U.S. Cl.

CPC ................ *B41J 11/04* (2013.01); *B41J 11/24* (2013.01); *B41J 2/165* (2013.01); *B41J 29/13* (2013.01)

(56) References Cited

U.S. PATENT DOCUMENTS

| | | | | |
|---|---|---|---|---|
| 6,037,958 | A | 3/2000 | Terauchi et al. | |
| 2004/0061768 | A1 | 4/2004 | Nishimura | |
| 2005/0200690 | A1 | 9/2005 | Matsukawa | |
| 2019/0143723 | A1 * | 5/2019 | Kato ...................... | B41J 11/703 347/186 |

FOREIGN PATENT DOCUMENTS

| | | | | | |
|---|---|---|---|---|---|
| EP | 3 372 414 | A1 | | 9/2018 | |
| JP | 60-15173 | A | | 1/1985 | |
| JP | 63-25071 | A | | 2/1988 | |
| JP | 8-207323 | A | | 8/1996 | |
| JP | 10-16328 | A | | 1/1998 | |
| JP | 10-119330 | A | | 5/1998 | |
| JP | 11-20254 | A | | 1/1999 | |
| JP | 2001-278515 | A | | 10/2001 | |
| JP | 2004-167751 | A | | 6/2004 | |
| JP | 2004-345210 | A | | 12/2004 | |
| JP | 3636476 | B2 | | 4/2005 | |
| JP | 2006334858 | A | * | 12/2006 | |
| JP | 2015-62986 | A | | 4/2015 | |
| JP | 2015193155 | A | * | 11/2015 | .......... B41J 11/0095 |

OTHER PUBLICATIONS

Fujii, MachineTranslationofJP-2006334858-A, 2006 (Year: 2006).*

Non-Final Office Action issued in parent U.S. Appl. No. 17/233,876 mailed Nov. 1, 2022.

Notice of Allowance issued in parent U.S. Appl. No. 17/233,876 mailed Apr. 11, 2023.

* cited by examiner

[Fig. 1]
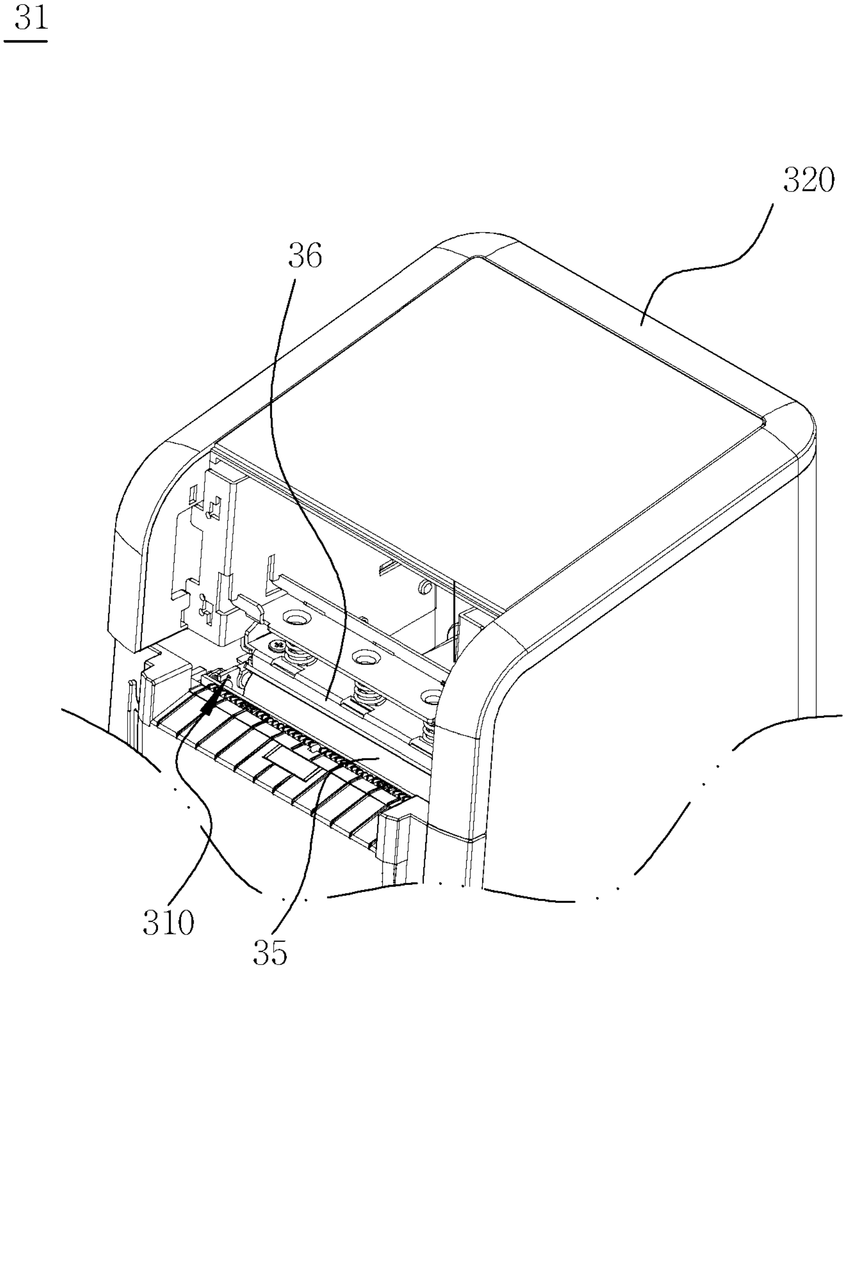

[Fig. 2]
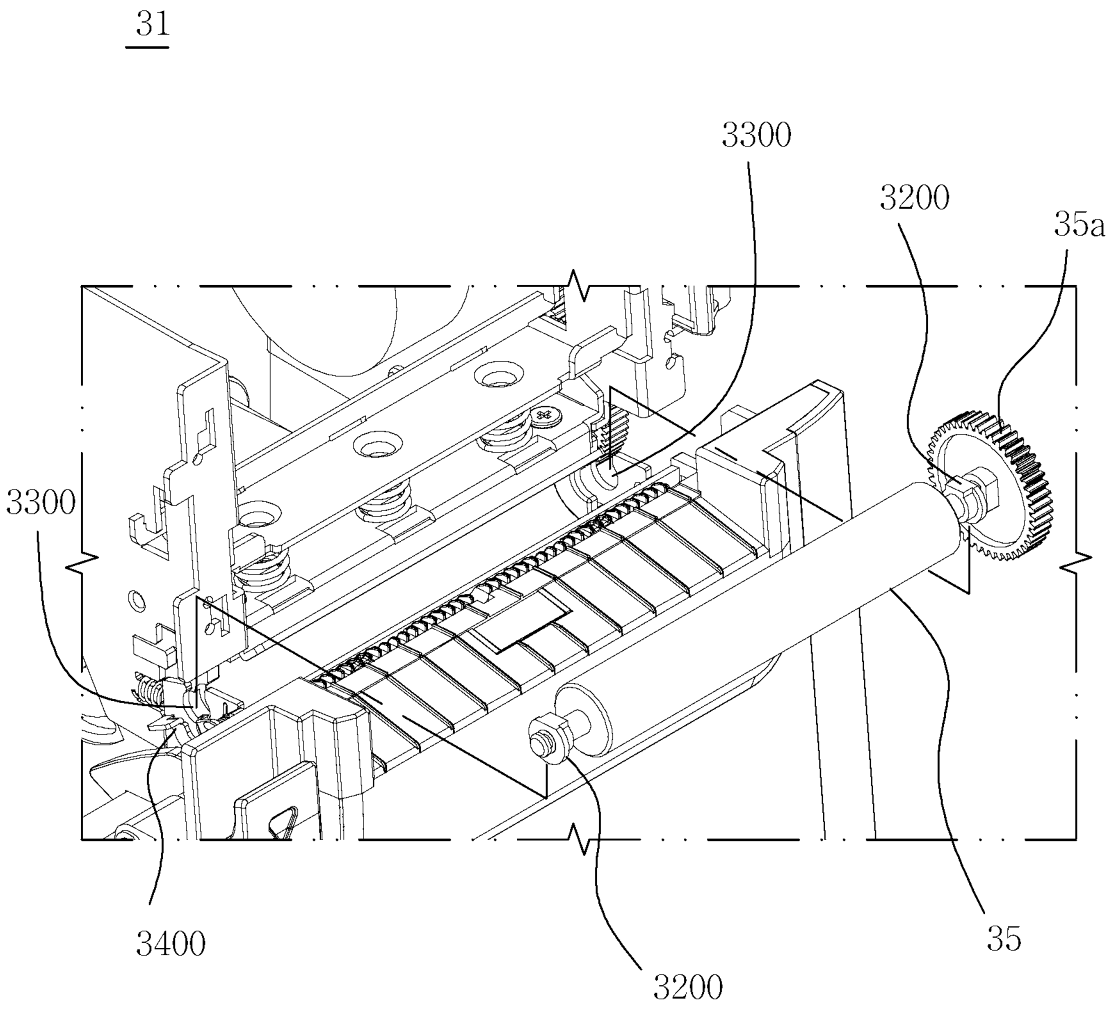

[Fig. 3]
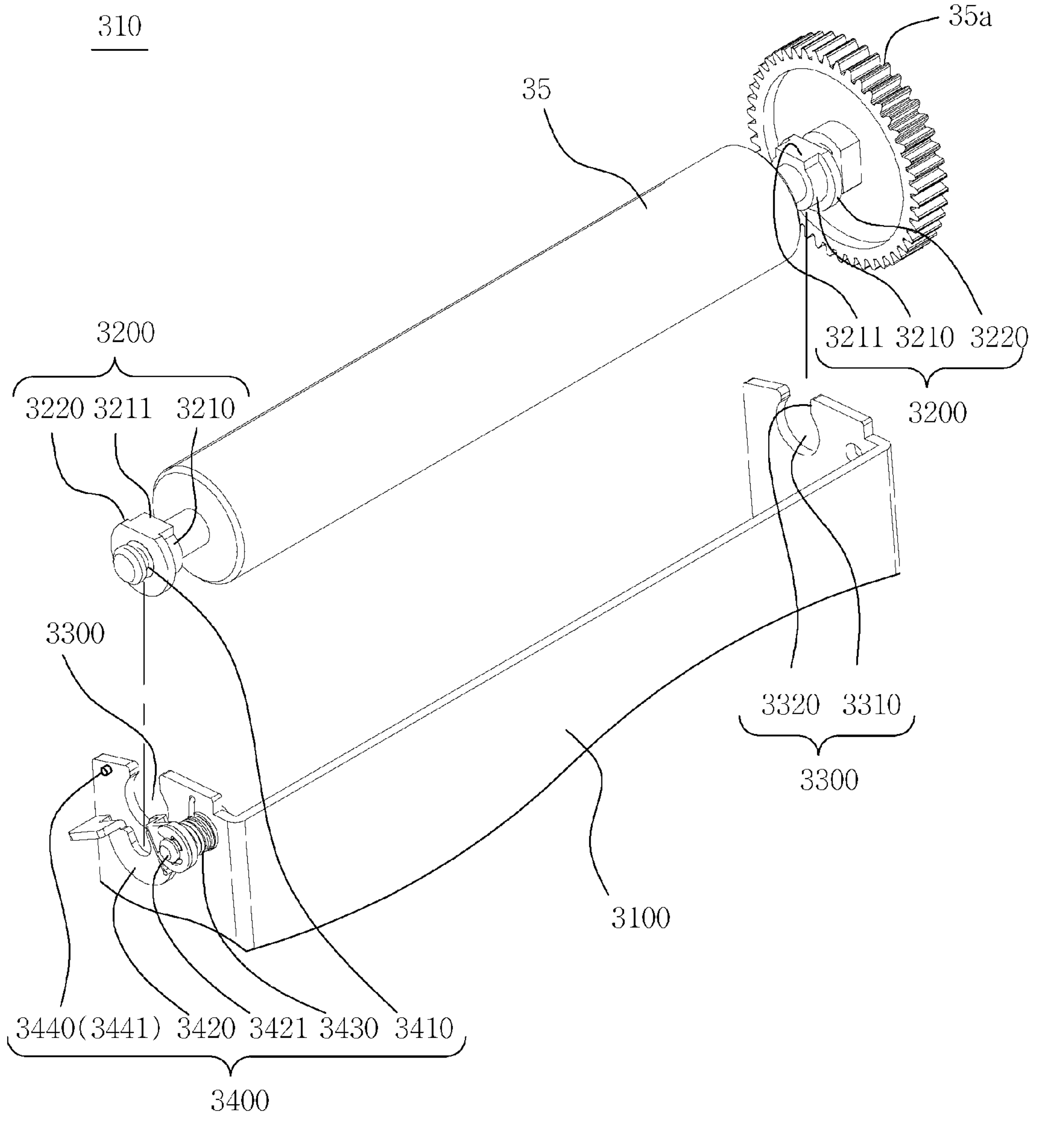

[Fig. 4]
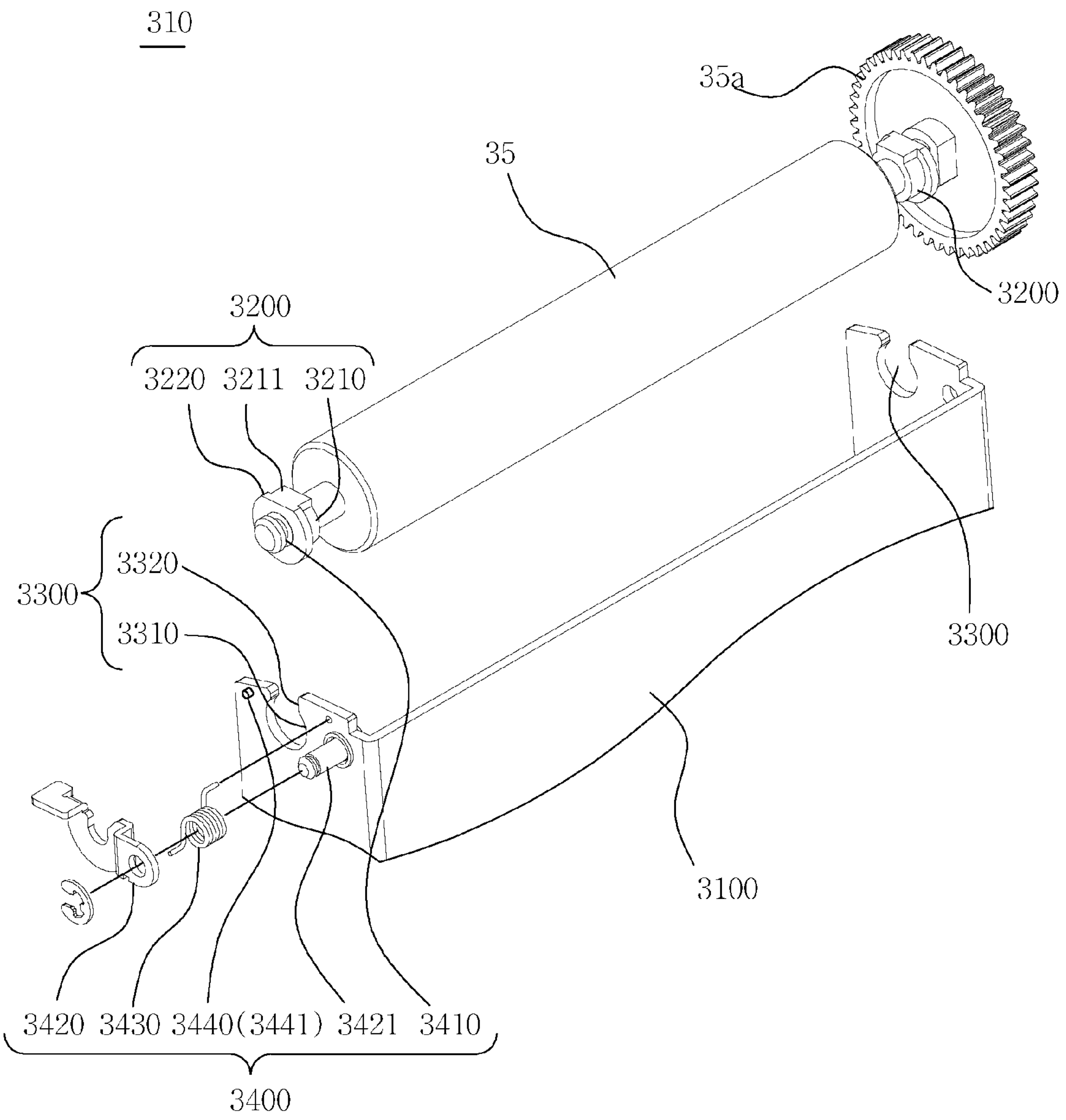

[Fig. 5]
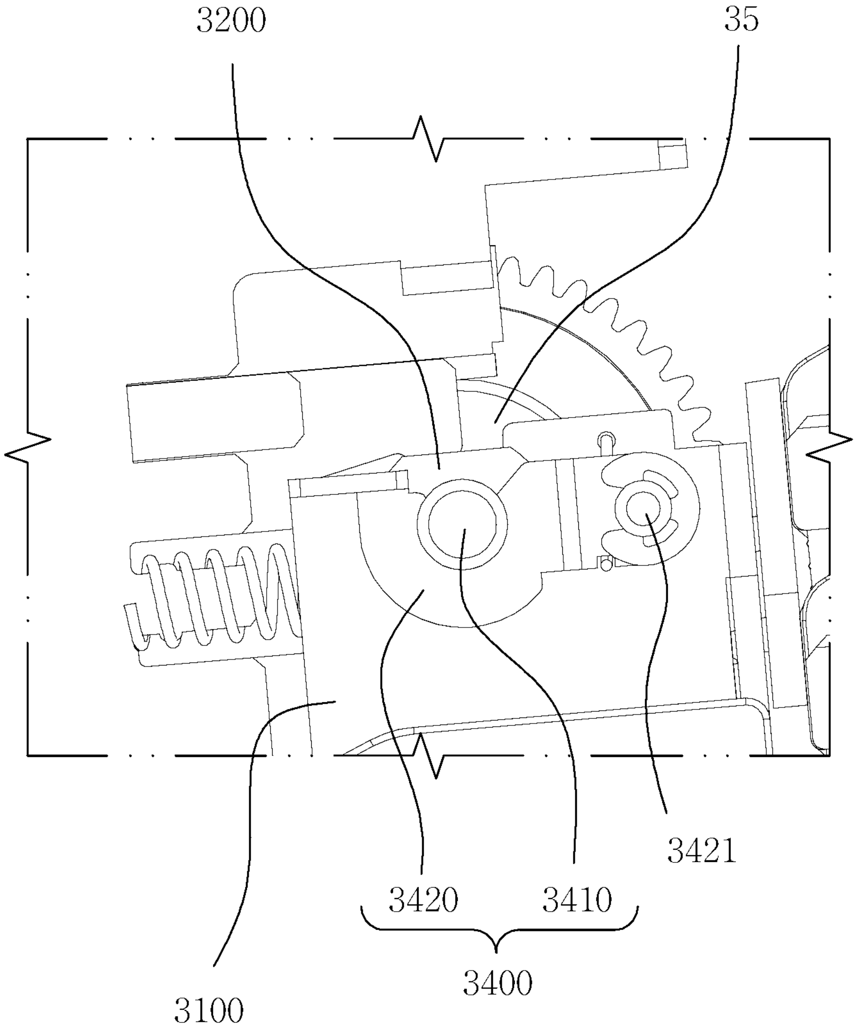

[Fig. 6]
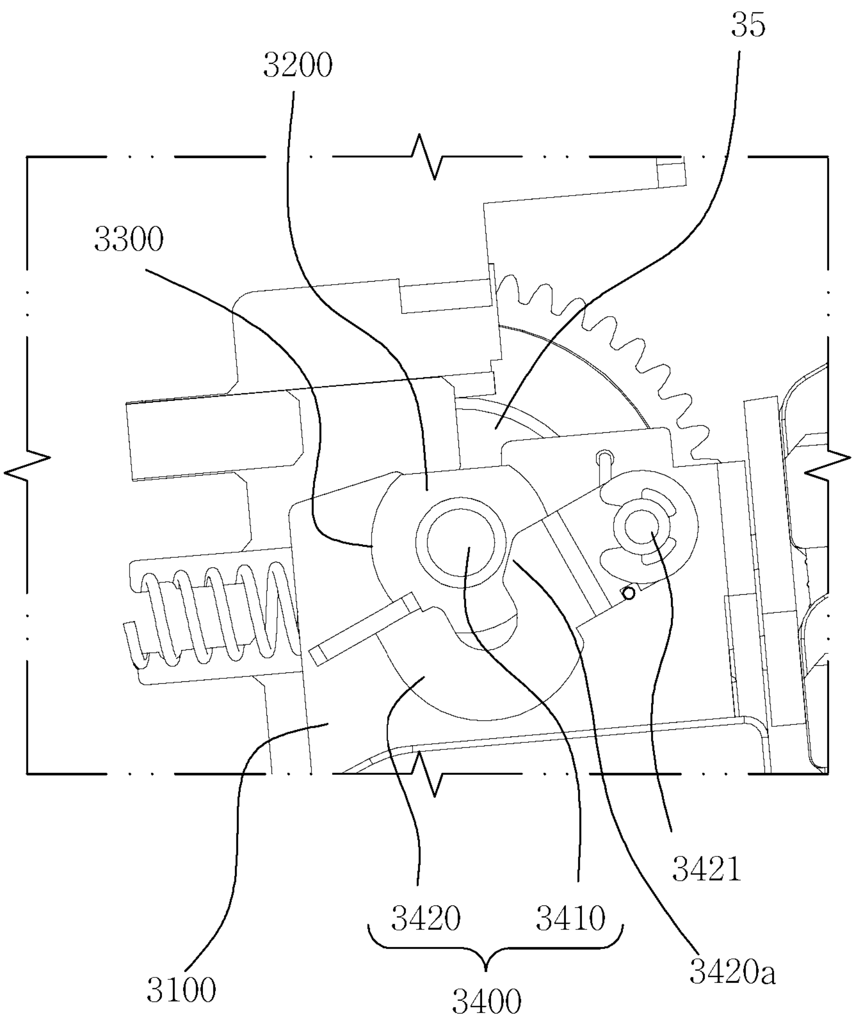

[Fig. 7]
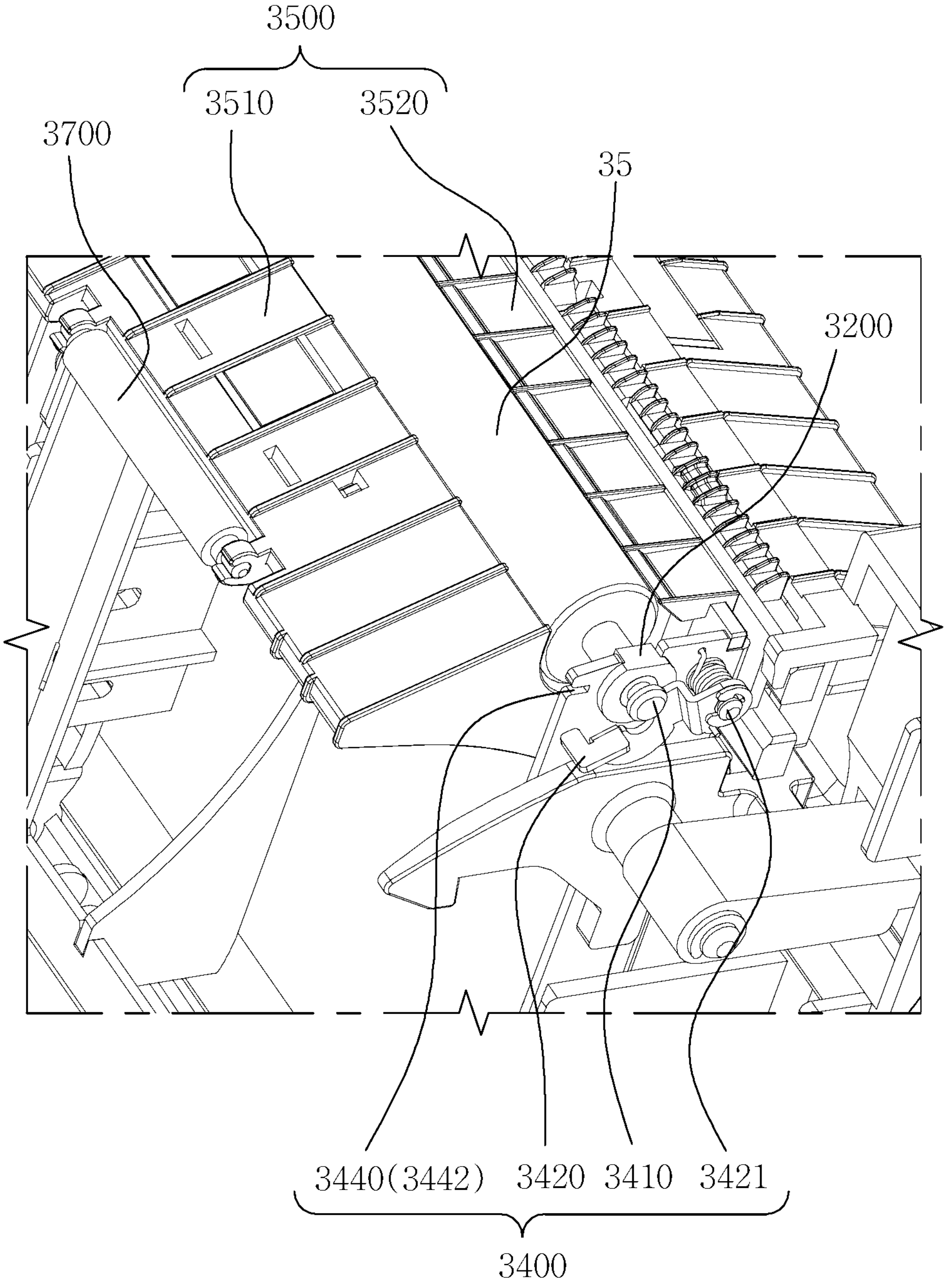

[Fig. 8]
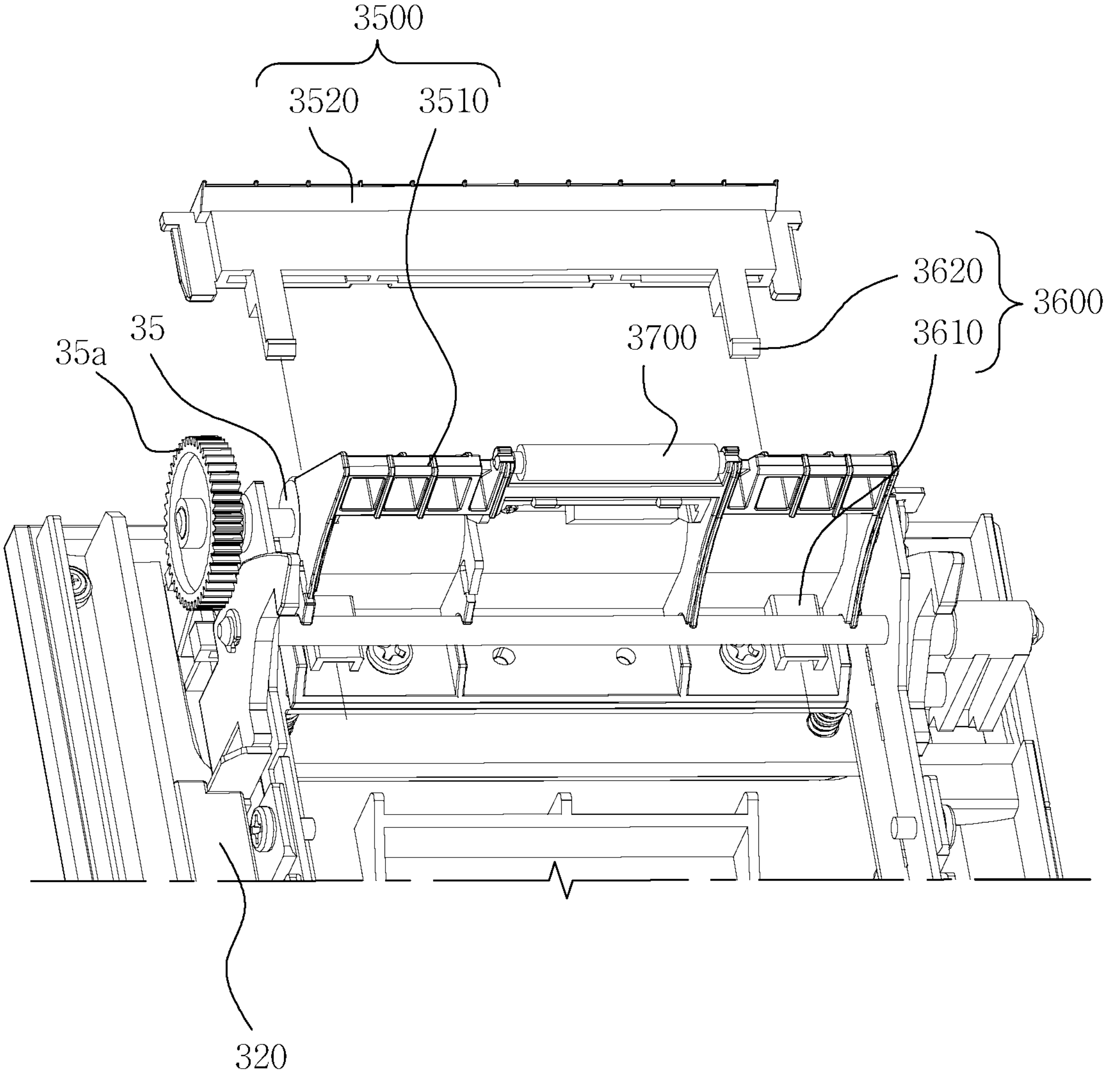

[Fig. 9]
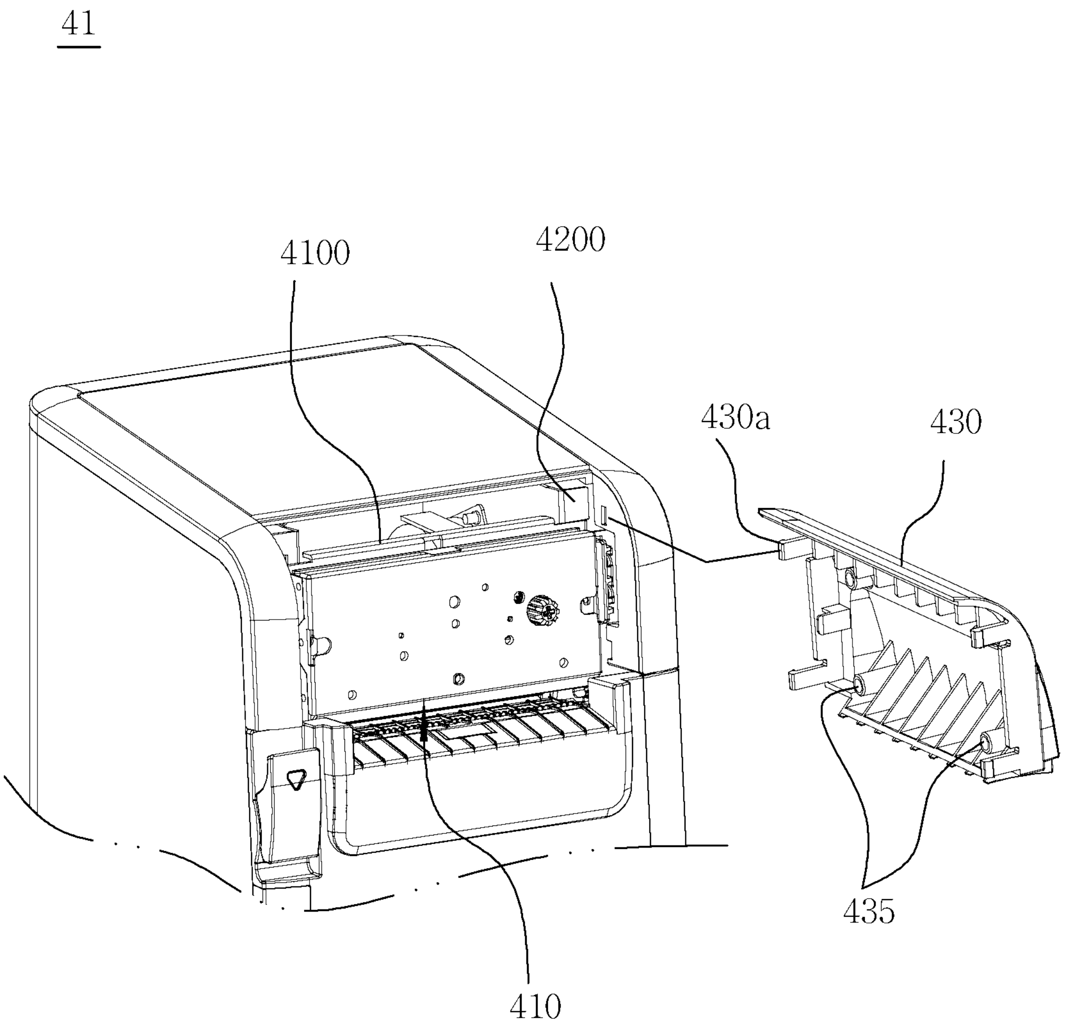

[Fig. 10]
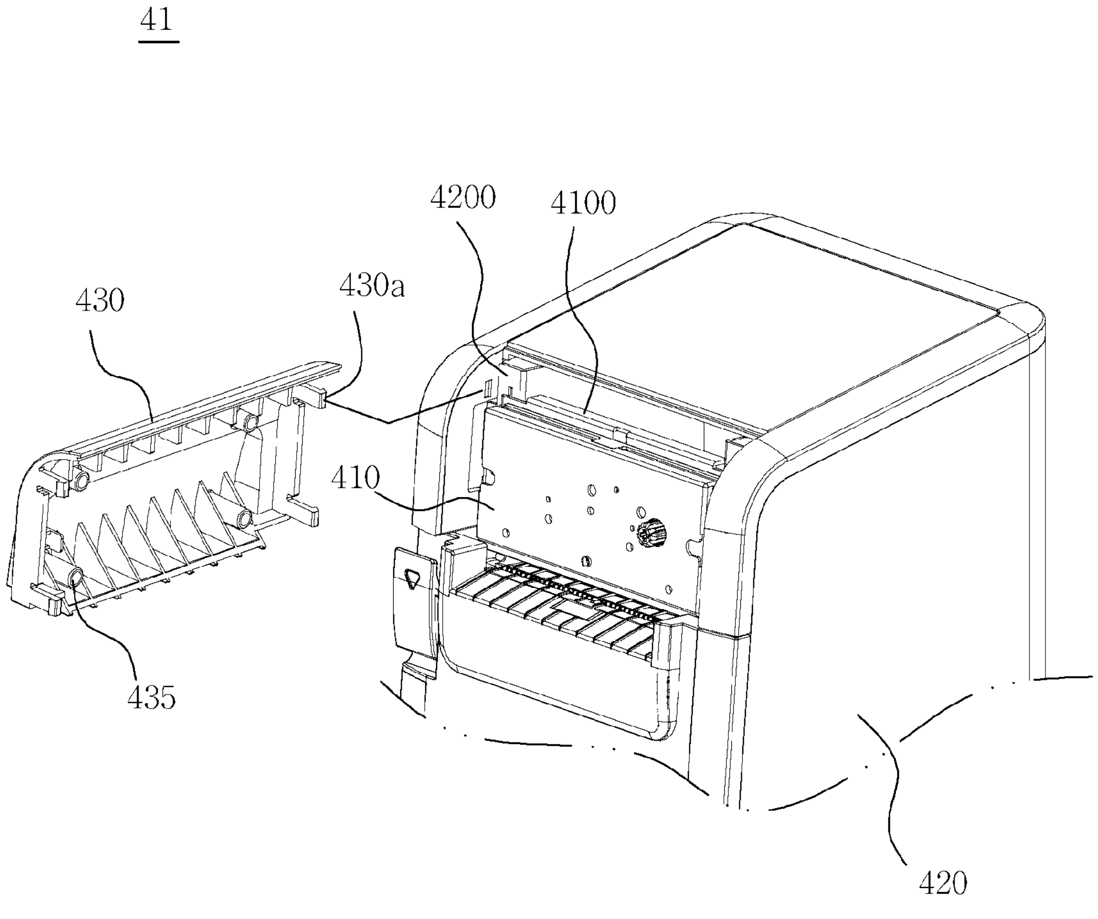

[Fig. 11]
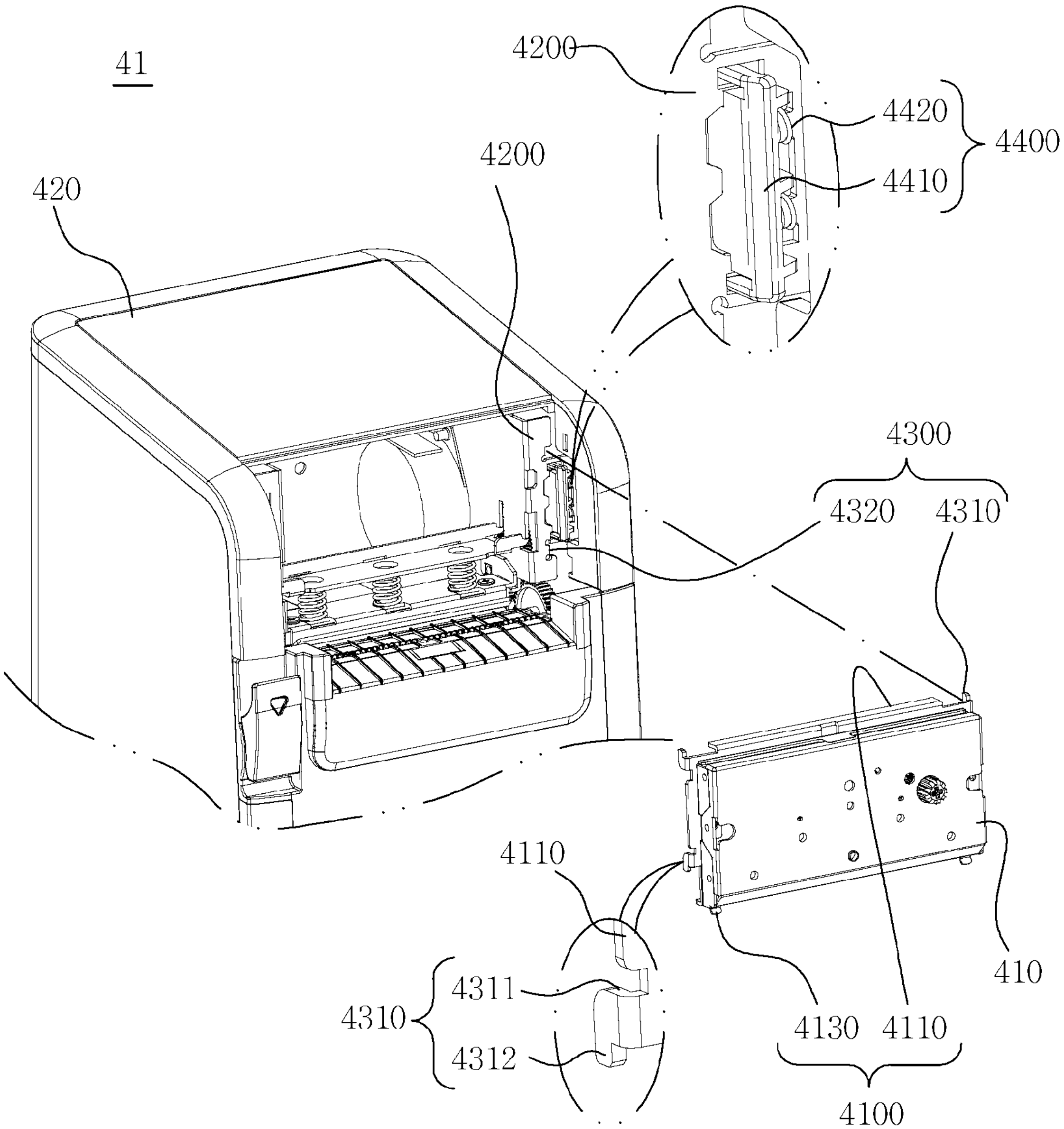

[Fig. 12]
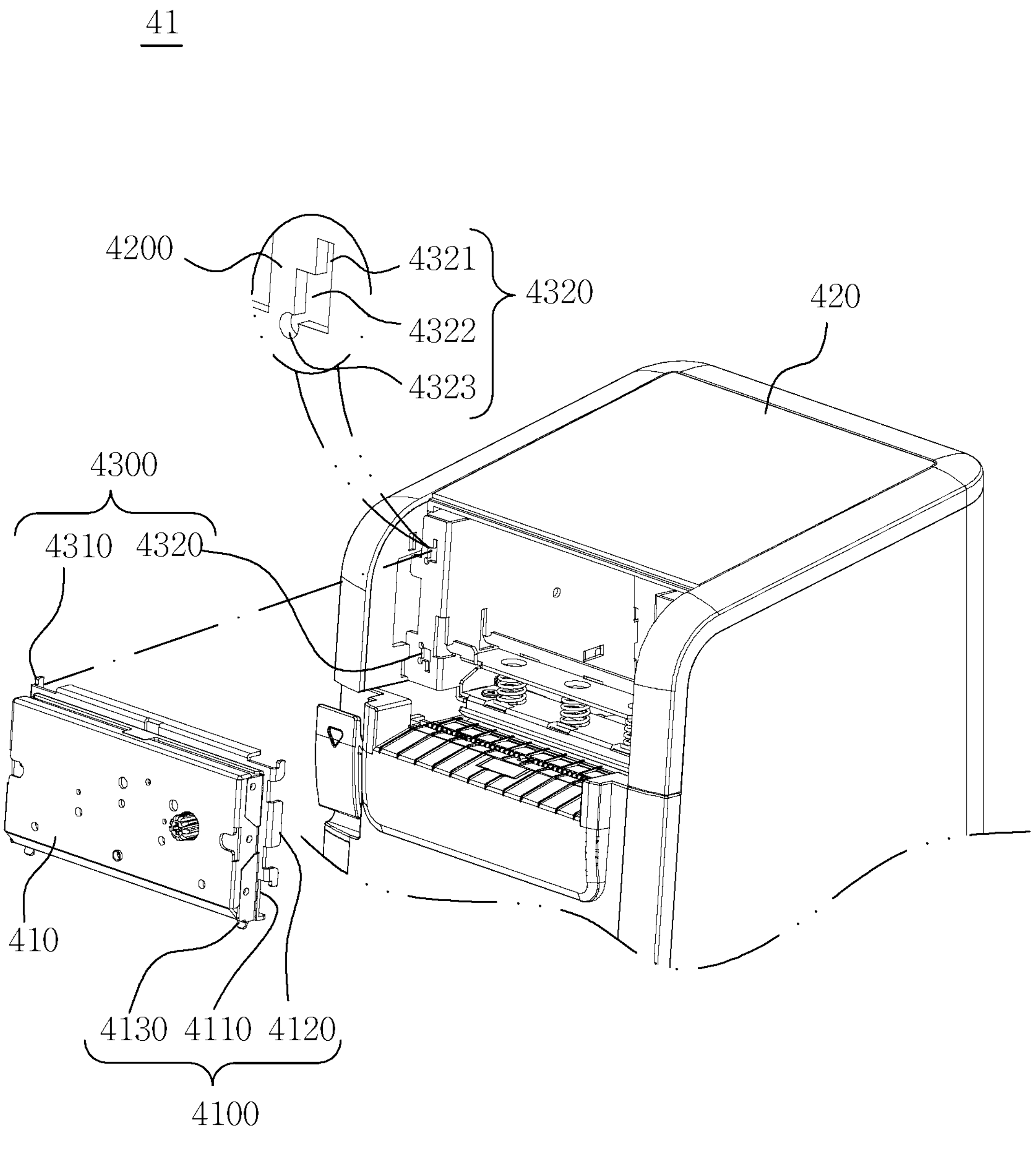

[Fig. 13]
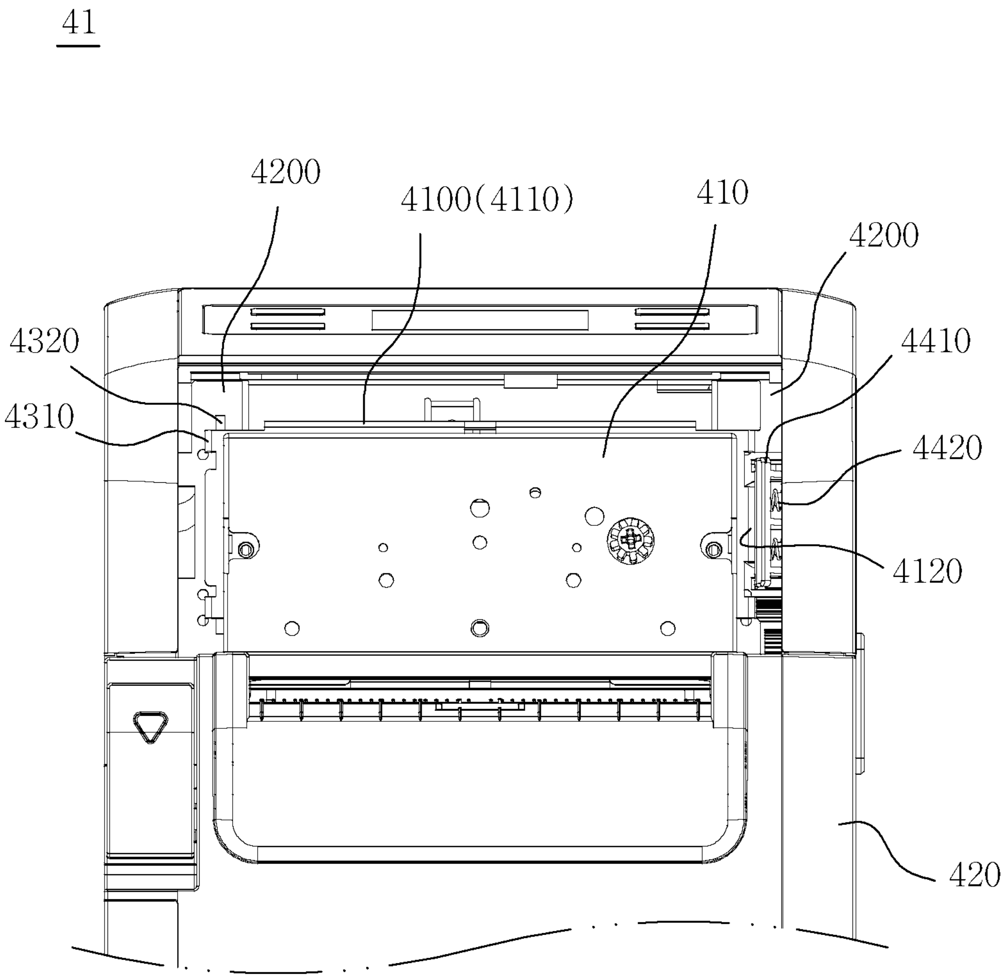

[Fig. 14]
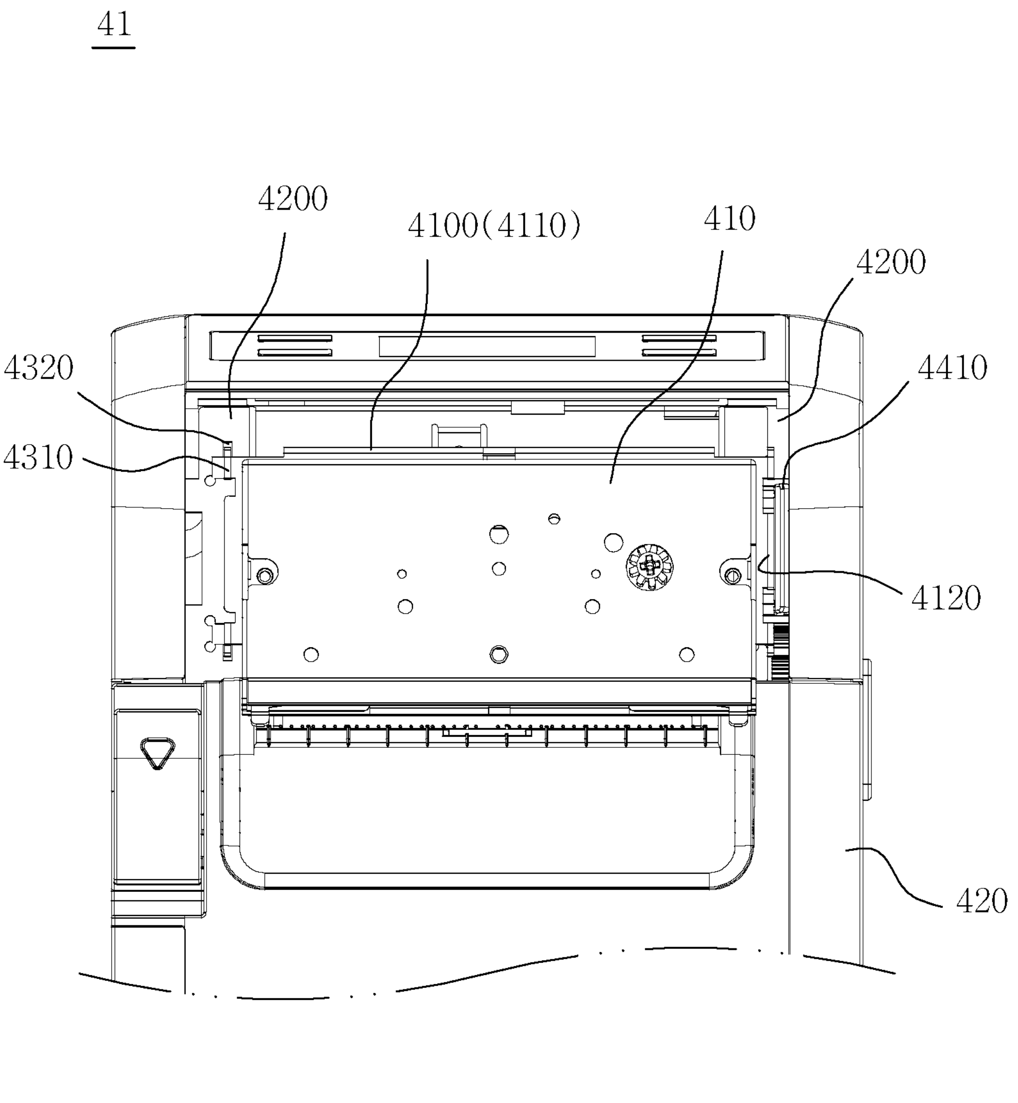

[Fig. 15]
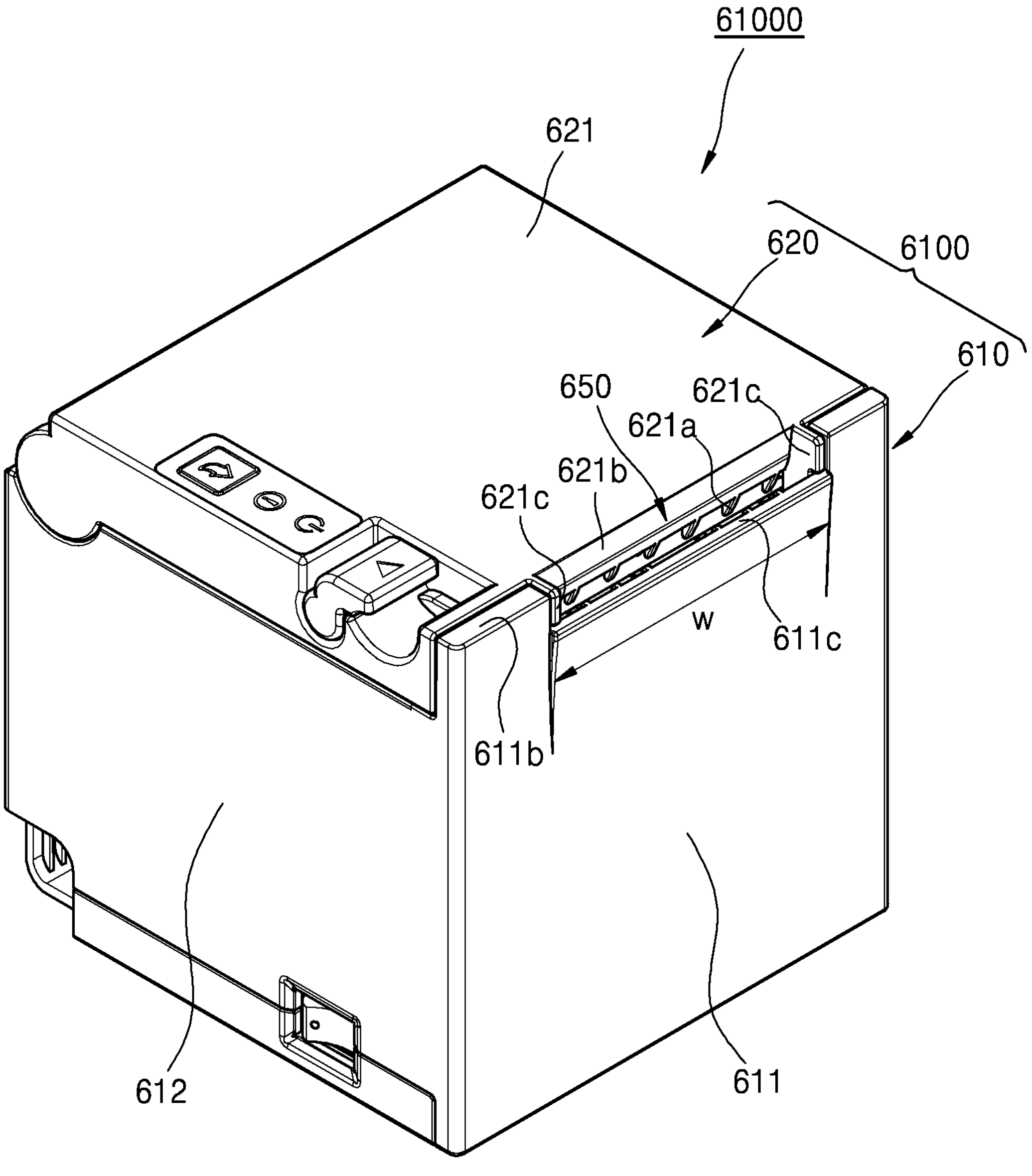

[Fig. 16]
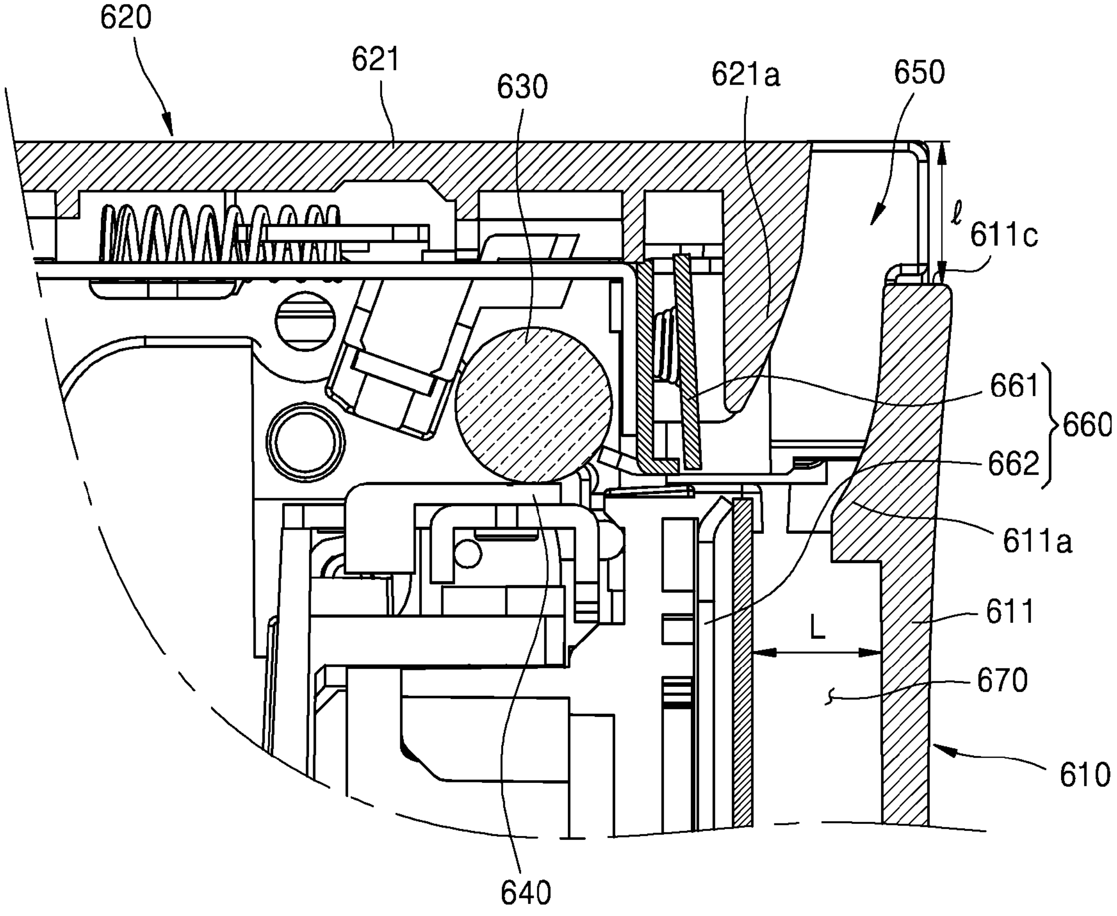

[Fig. 17]
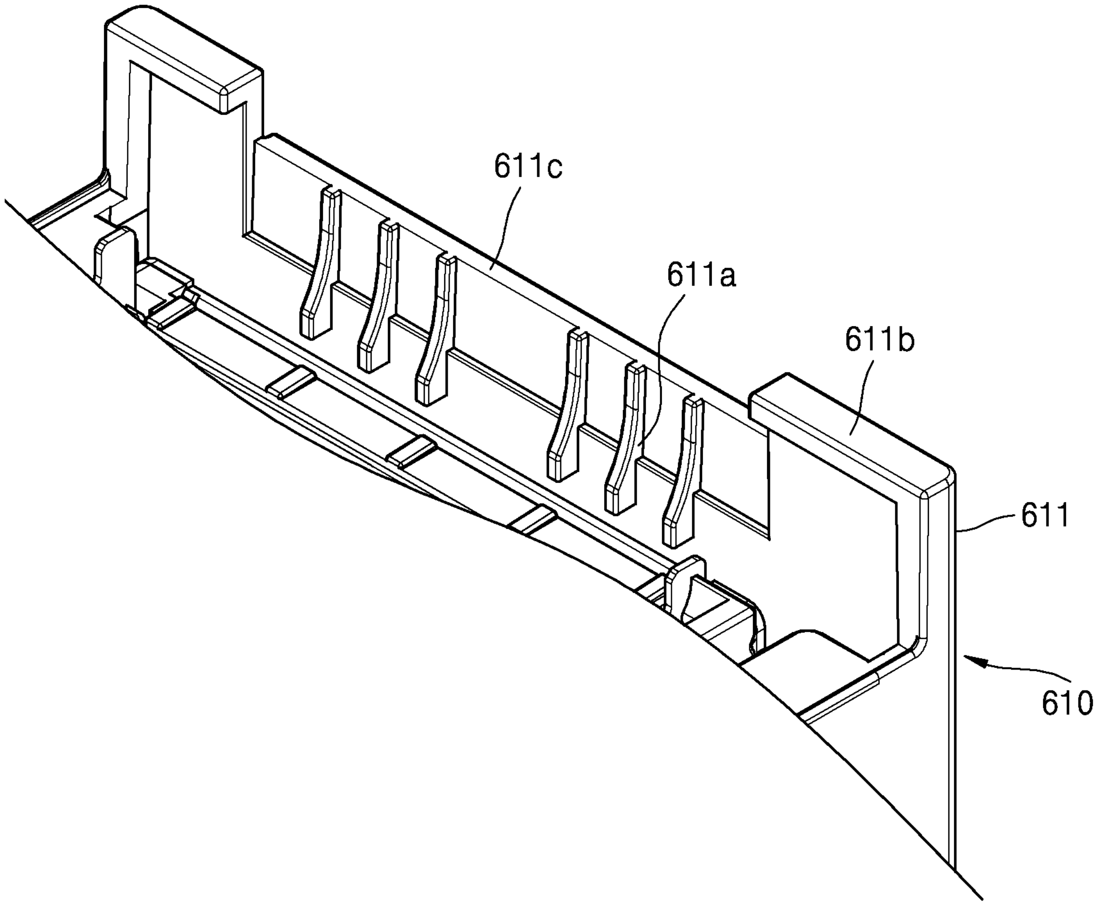

[Fig. 18]
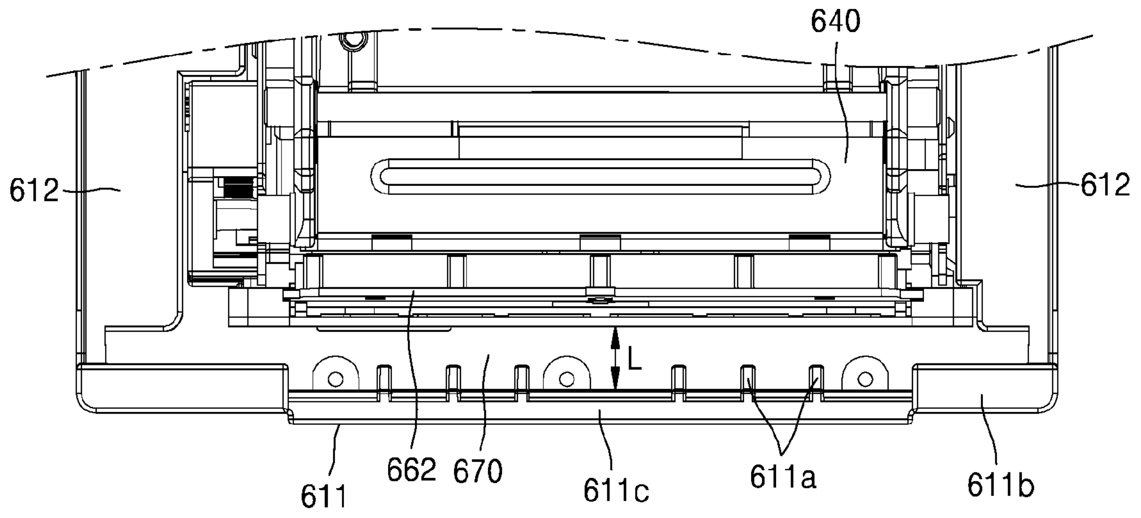

[Fig. 19]
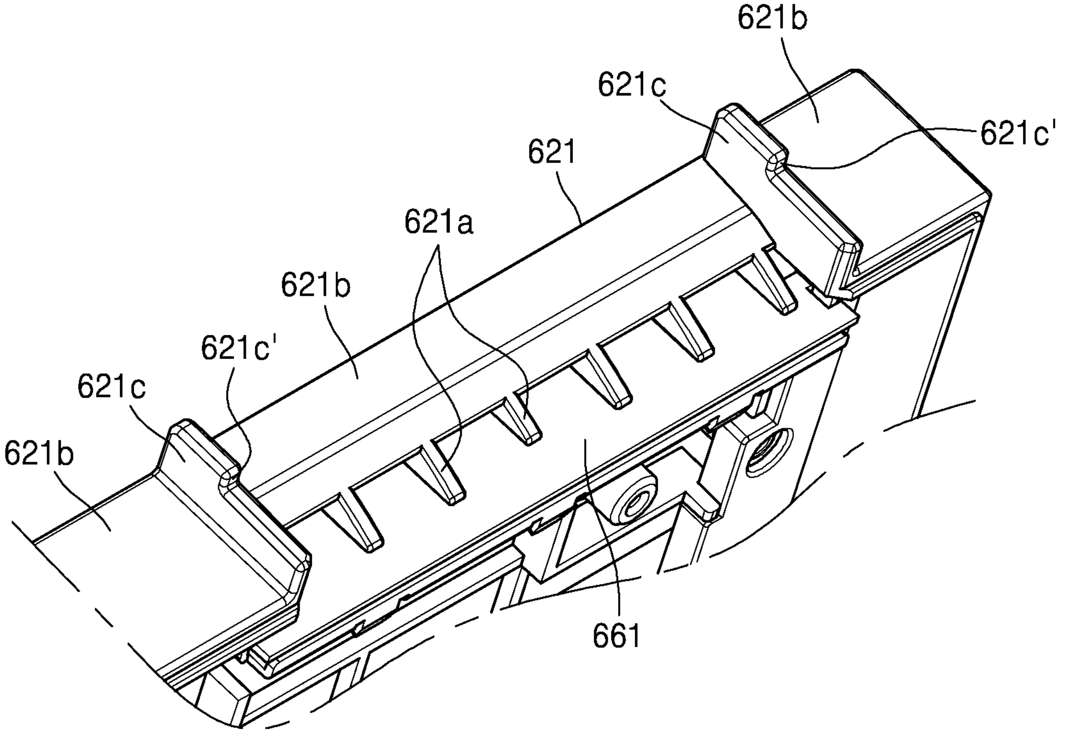

[Fig. 20]
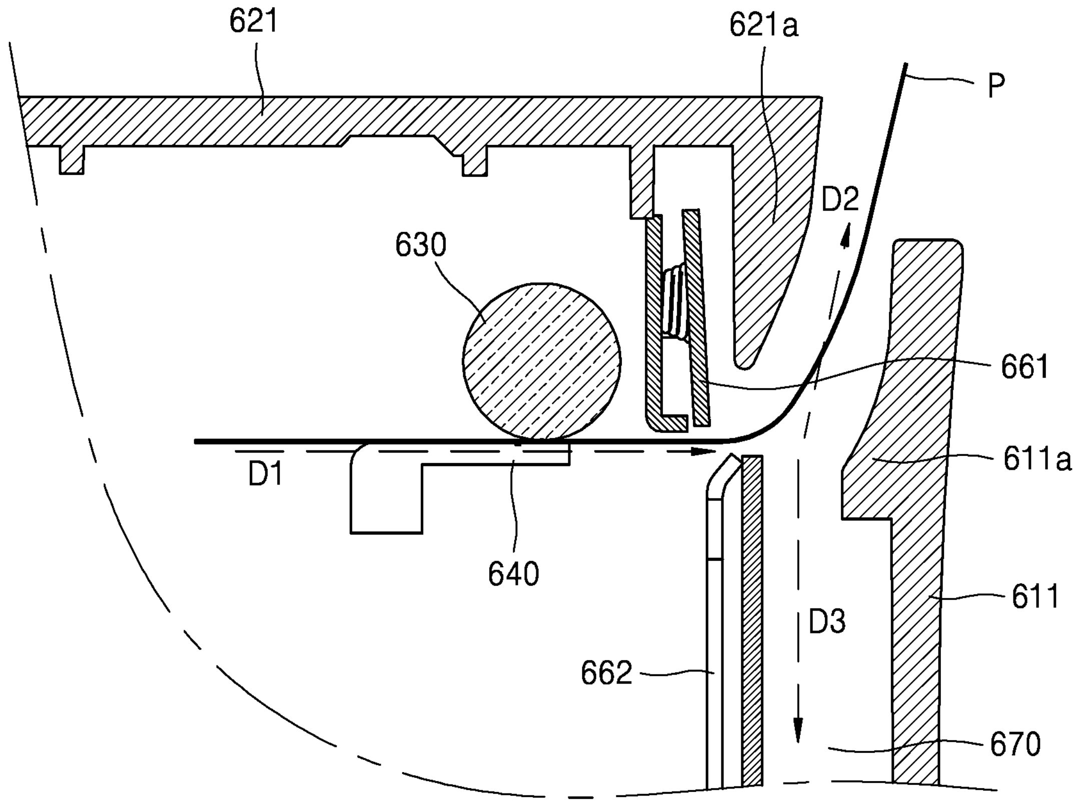

[Fig. 21]
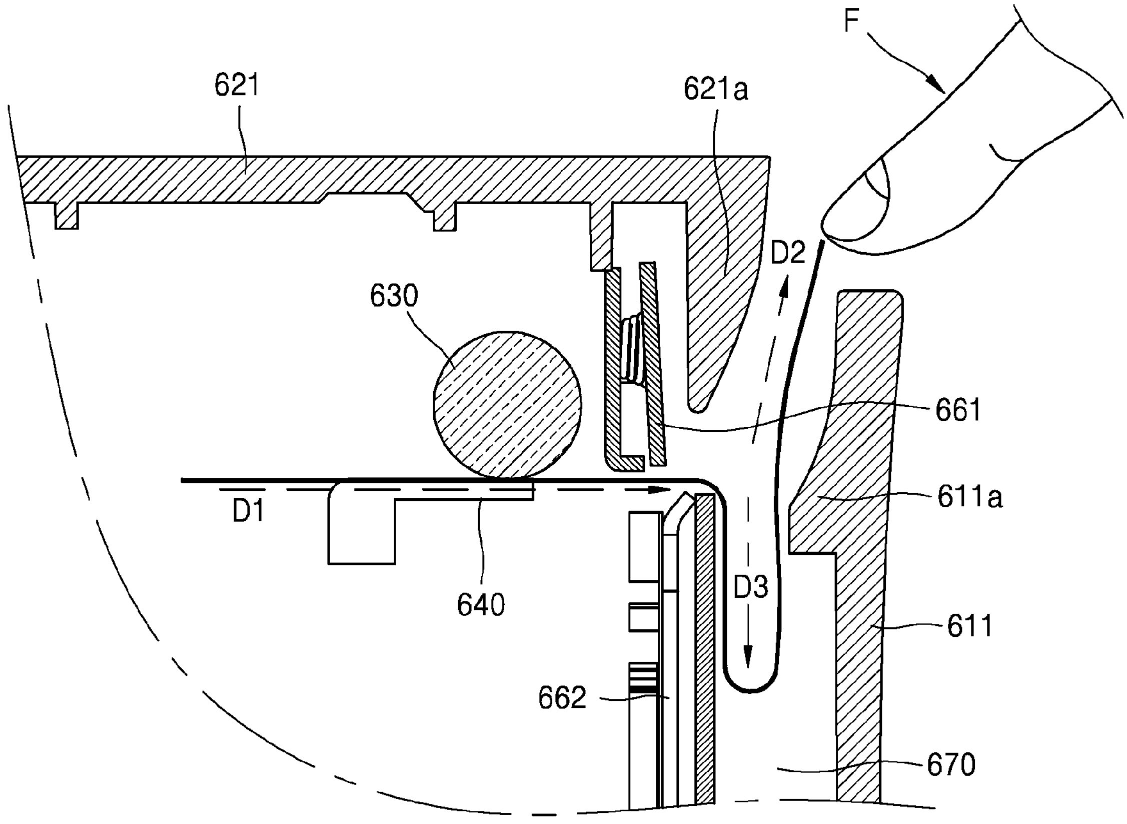

[Fig. 22]
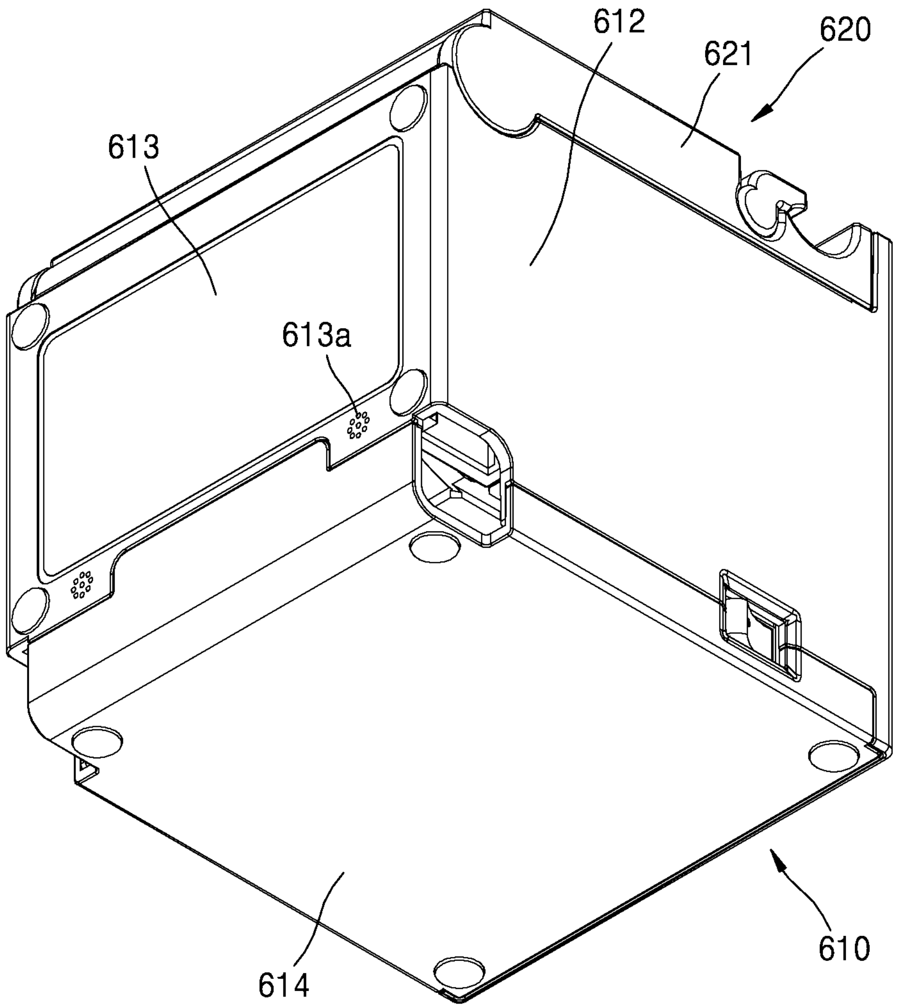

[Fig. 23]
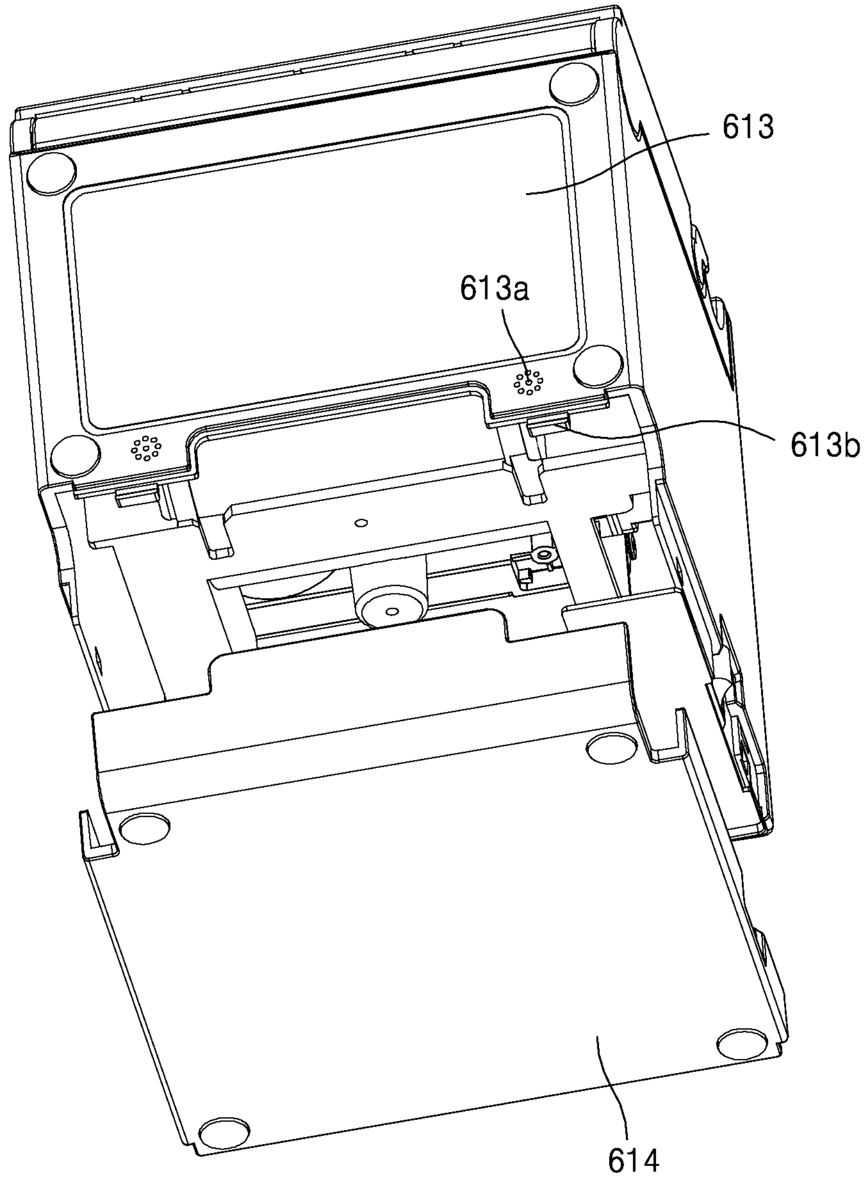

[Fig. 24]
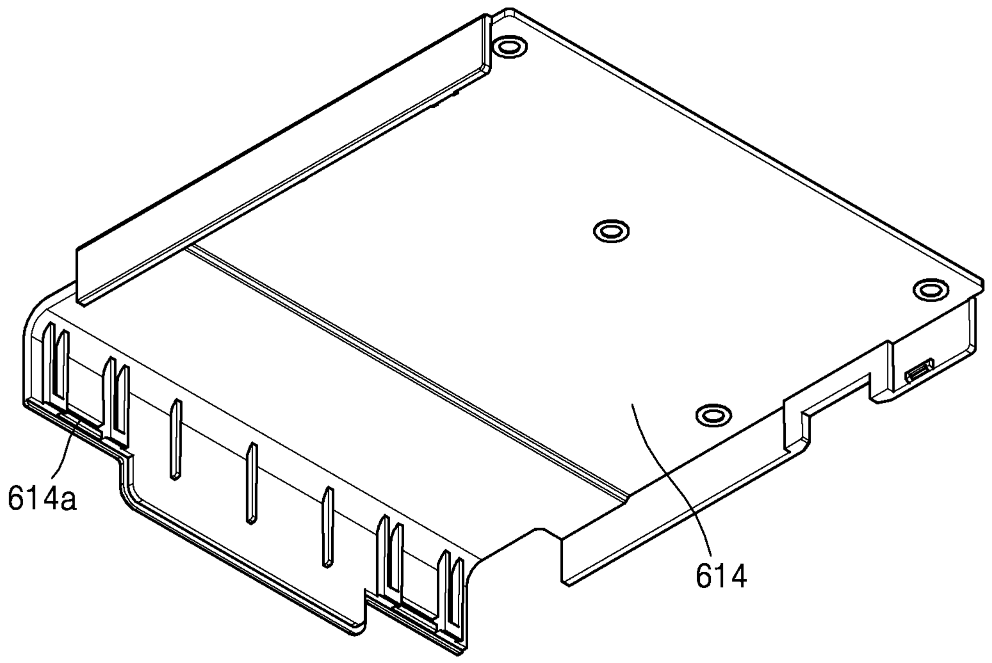

[Fig. 25]
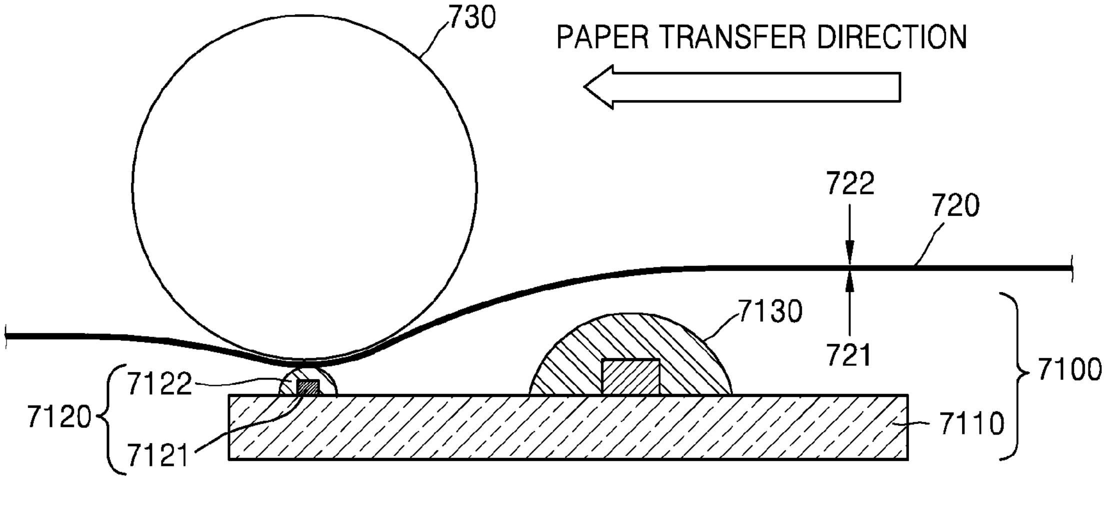

[Fig. 26]
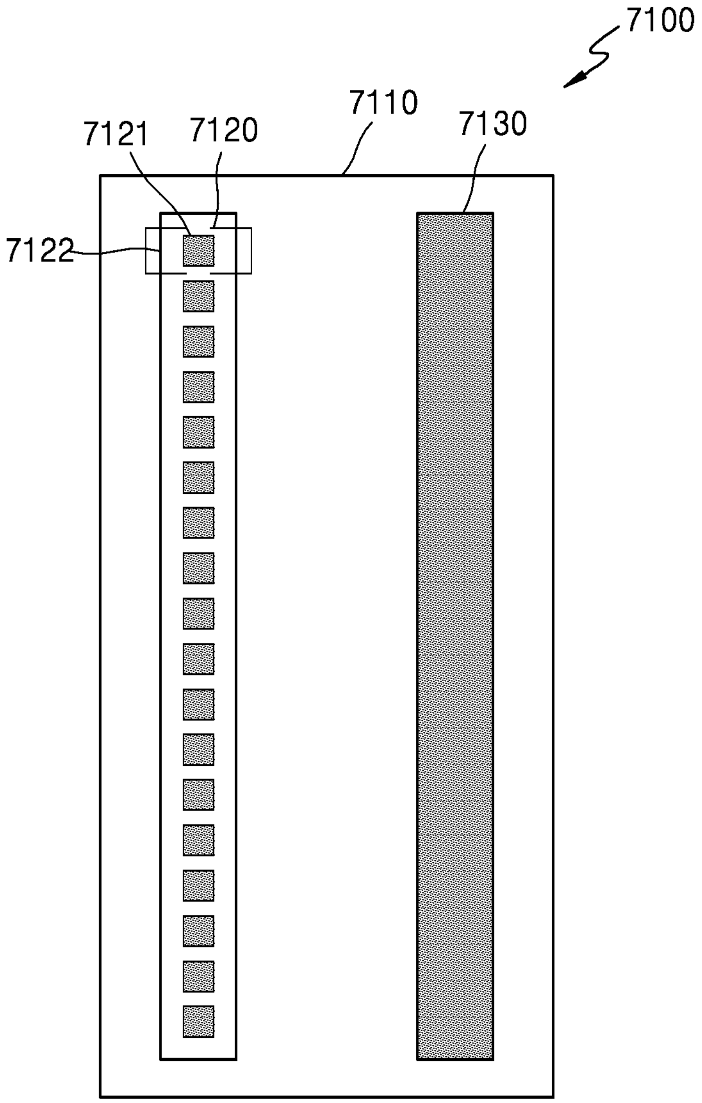

[Fig. 27]
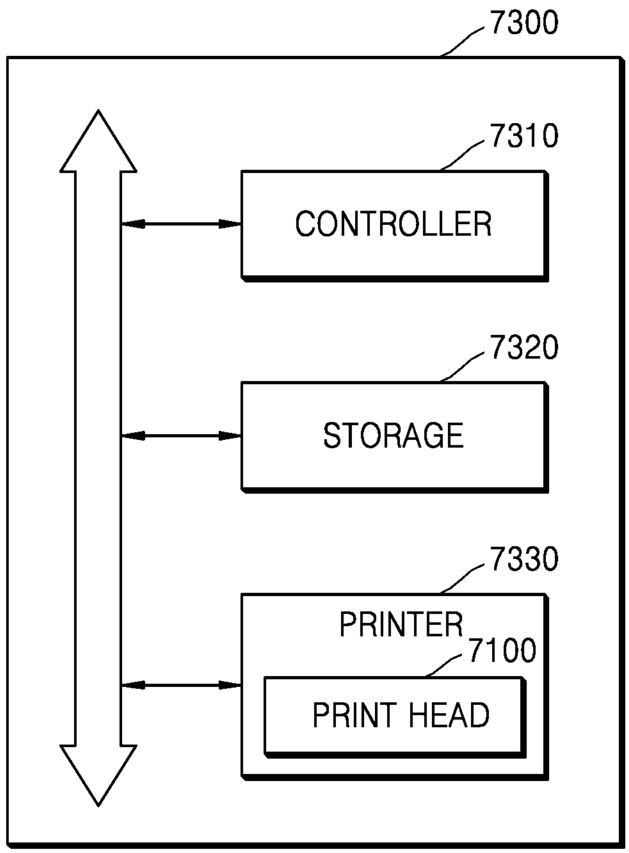

[Fig. 28]
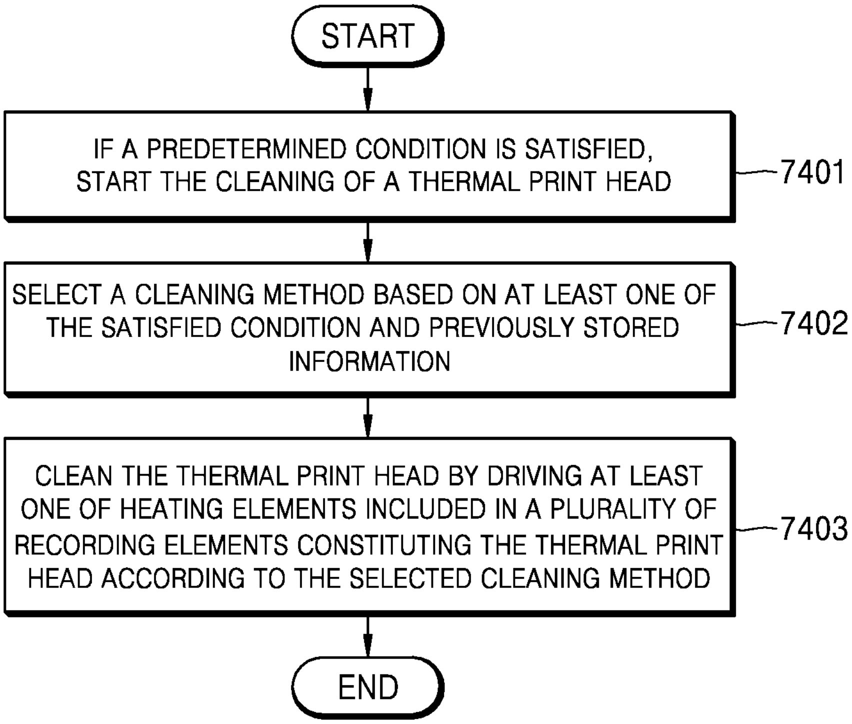

[Fig.29]
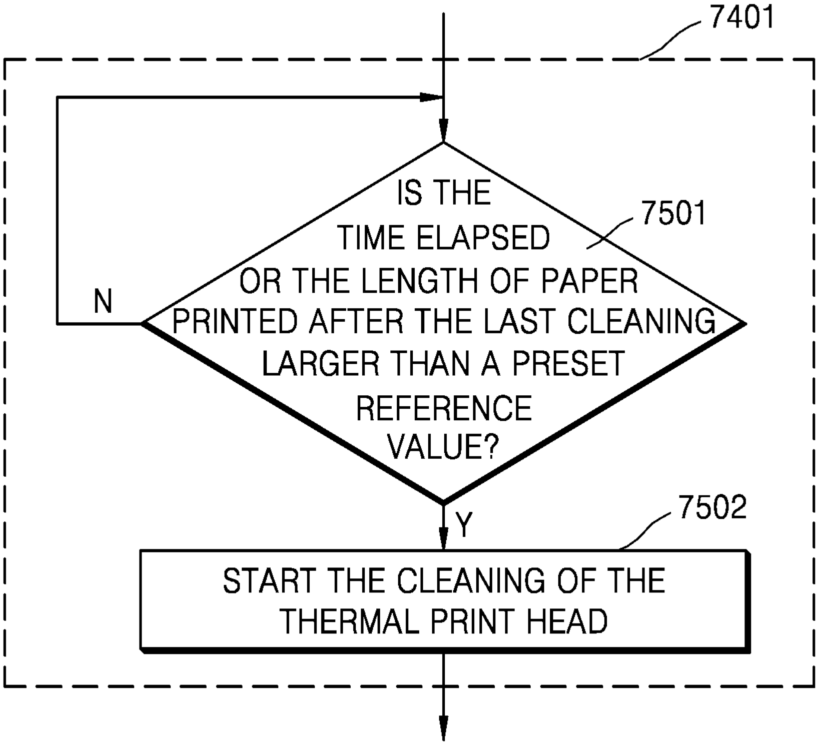

[Fig. 30]
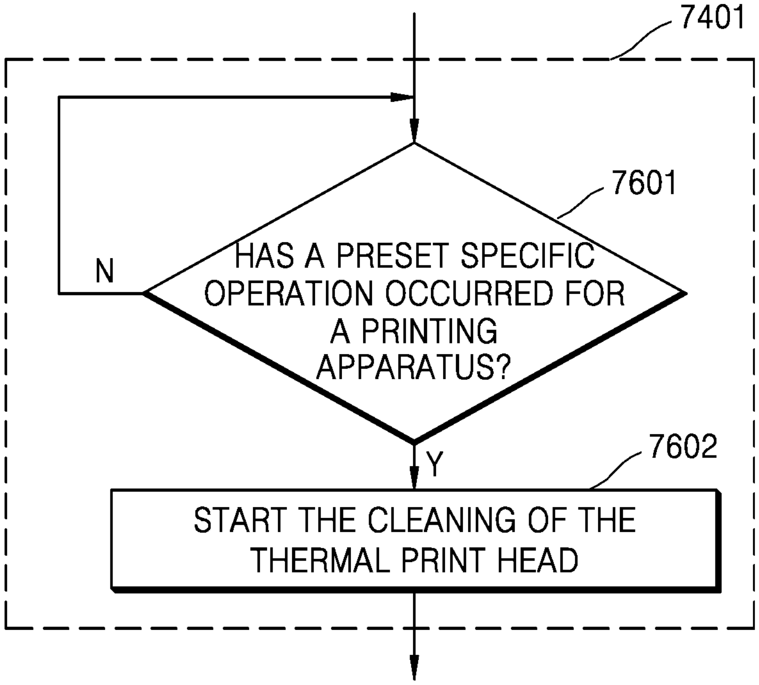

[Fig. 31]
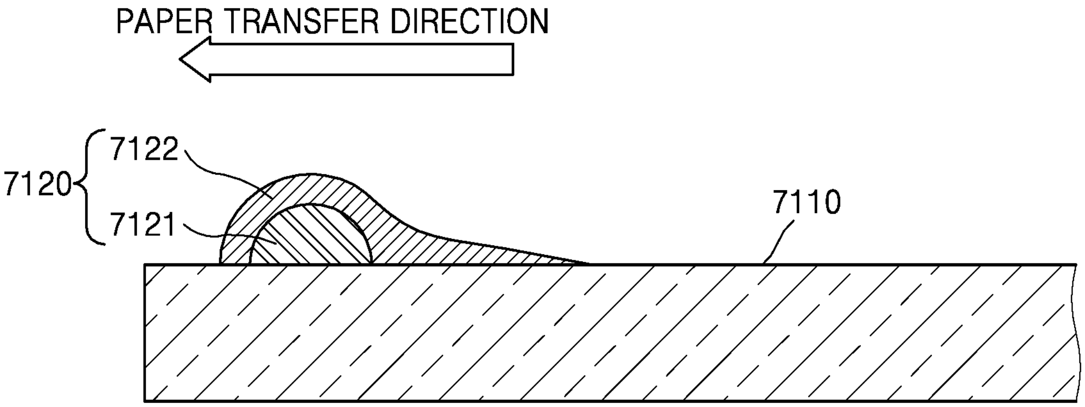

[Fig. 32]
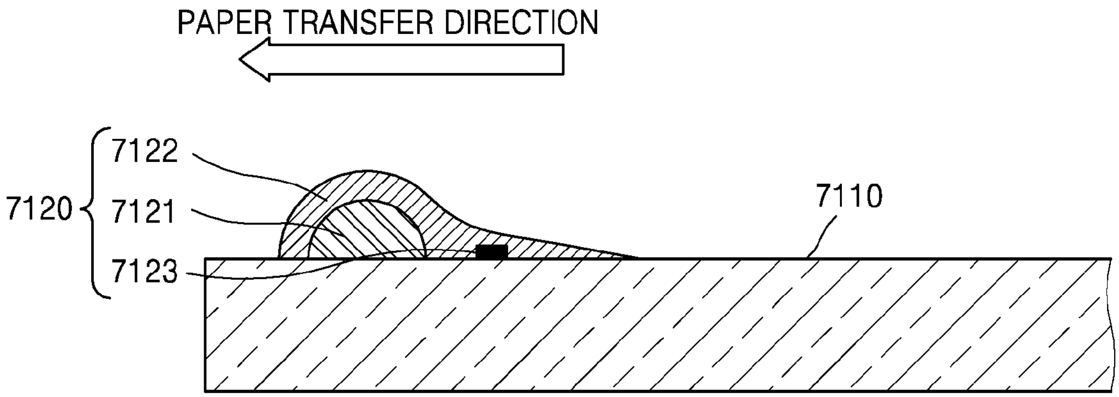

[Fig. 33]
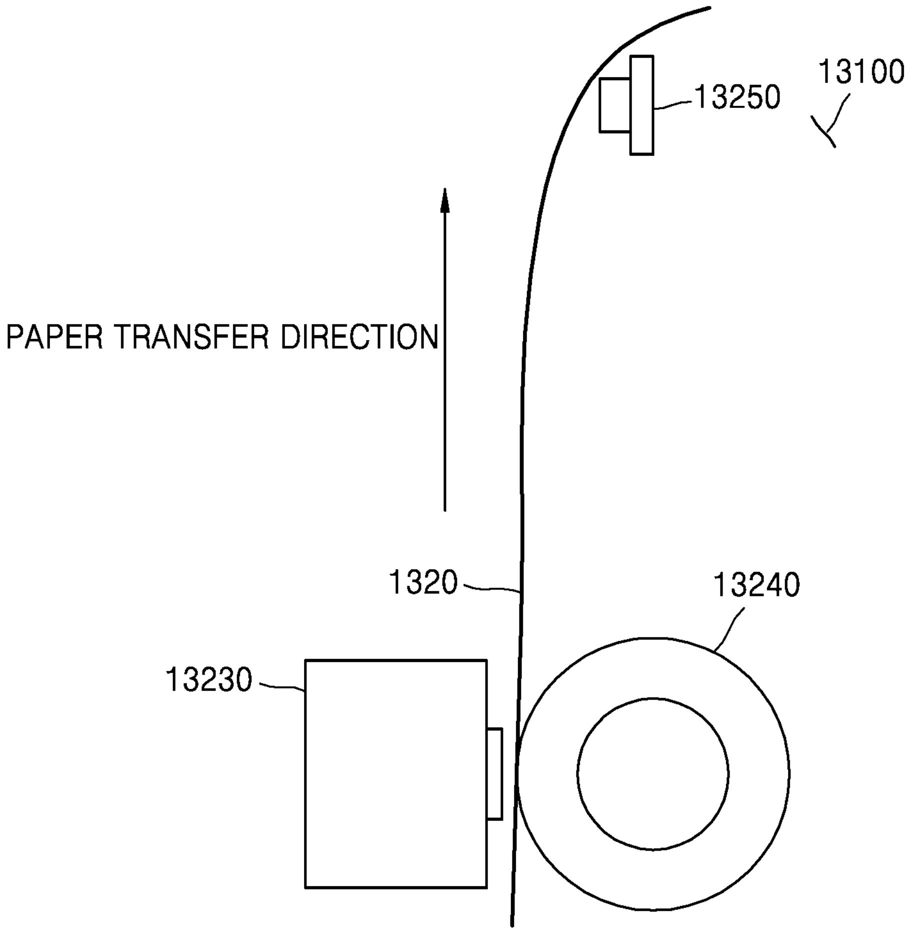

[Fig. 34]
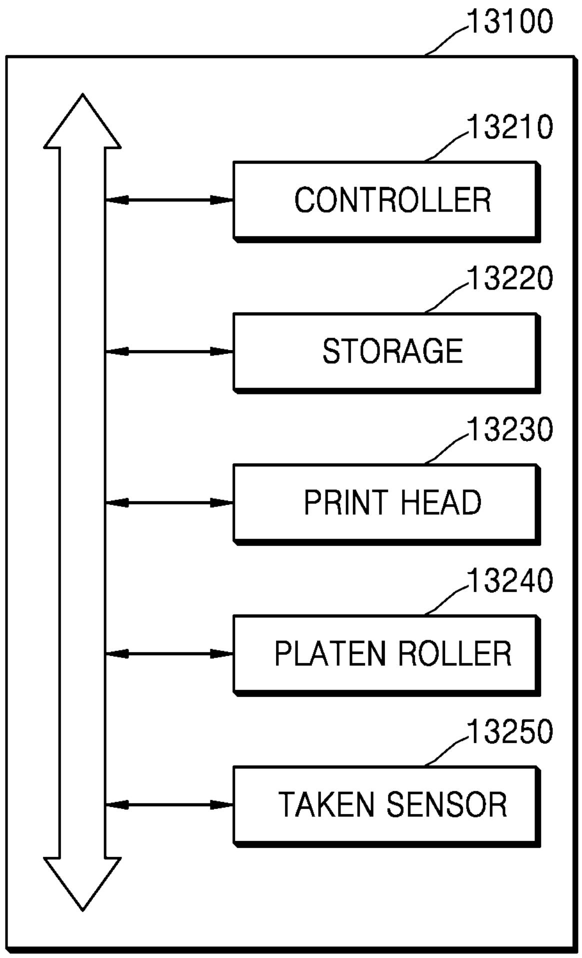

[Fig. 35]
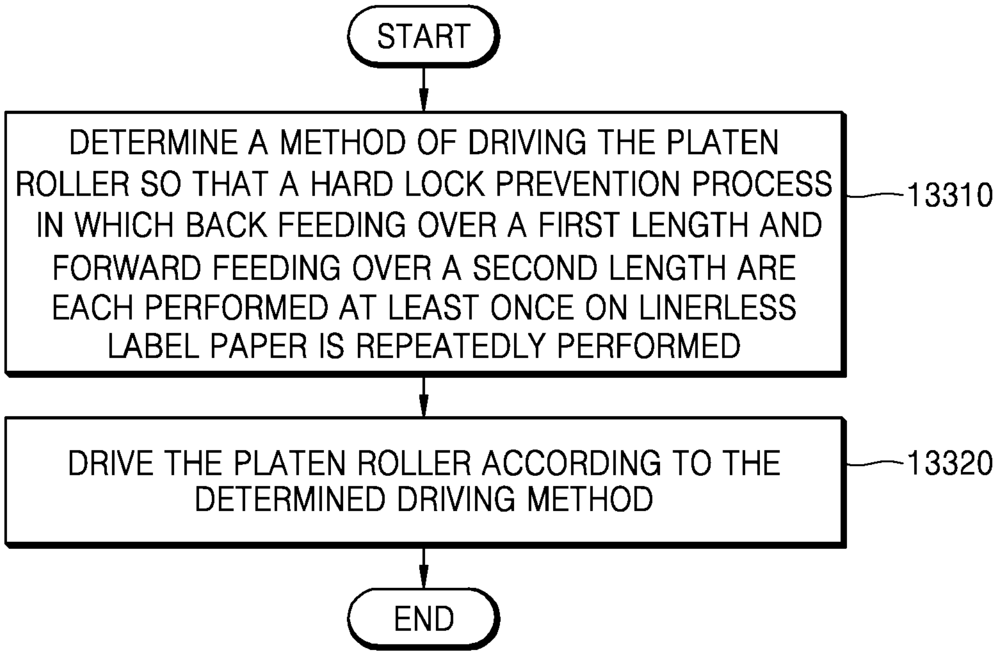

[Fig. 36]
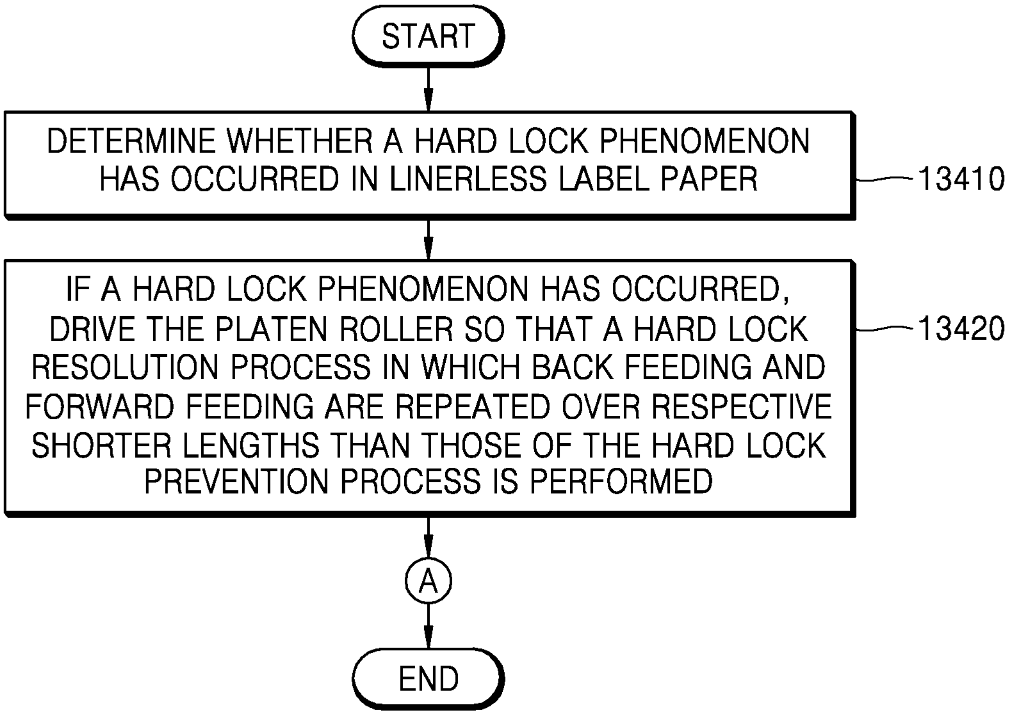

[Fig. 37]
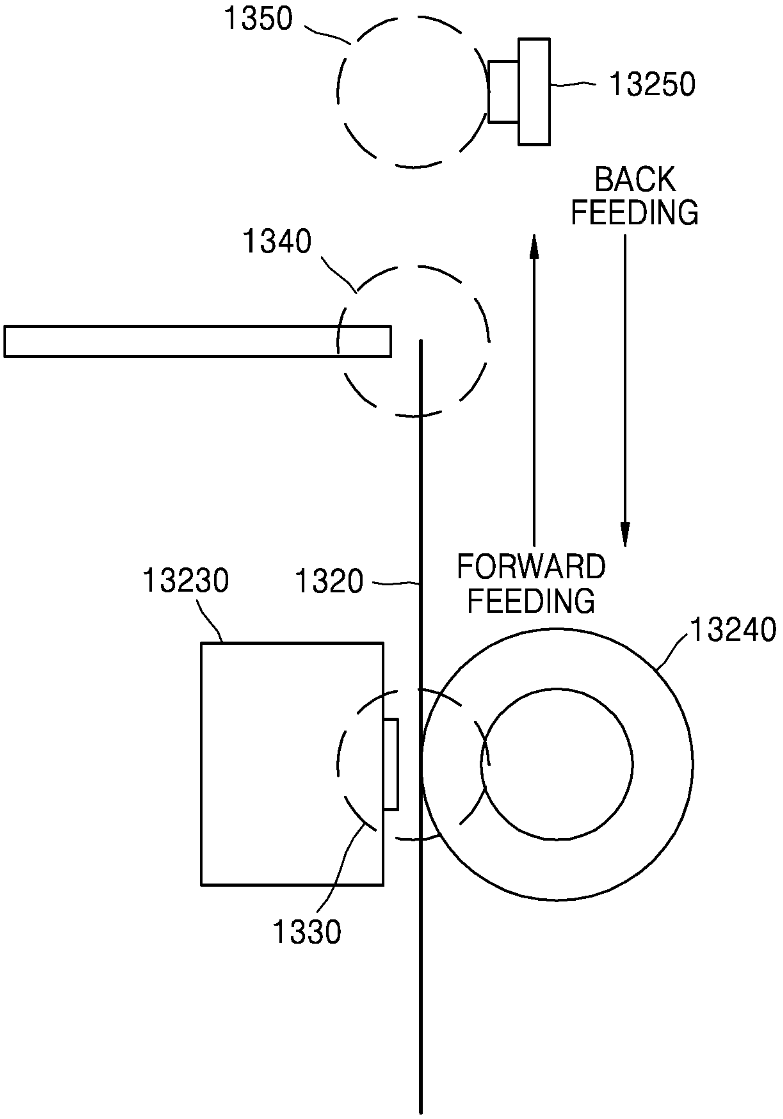

[Fig. 38]
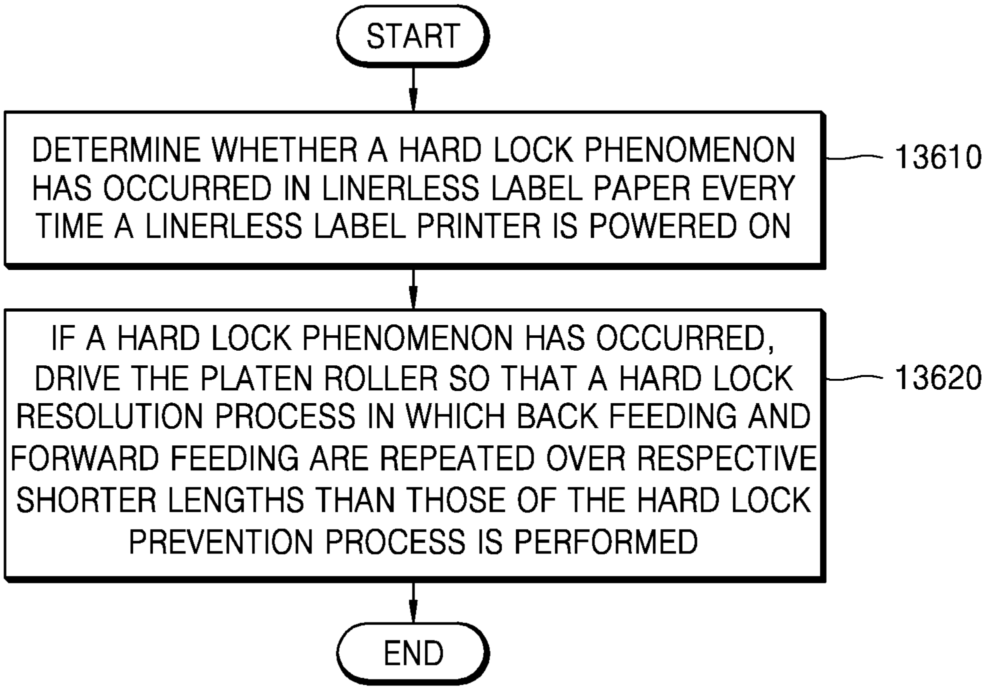

[Fig. 39]
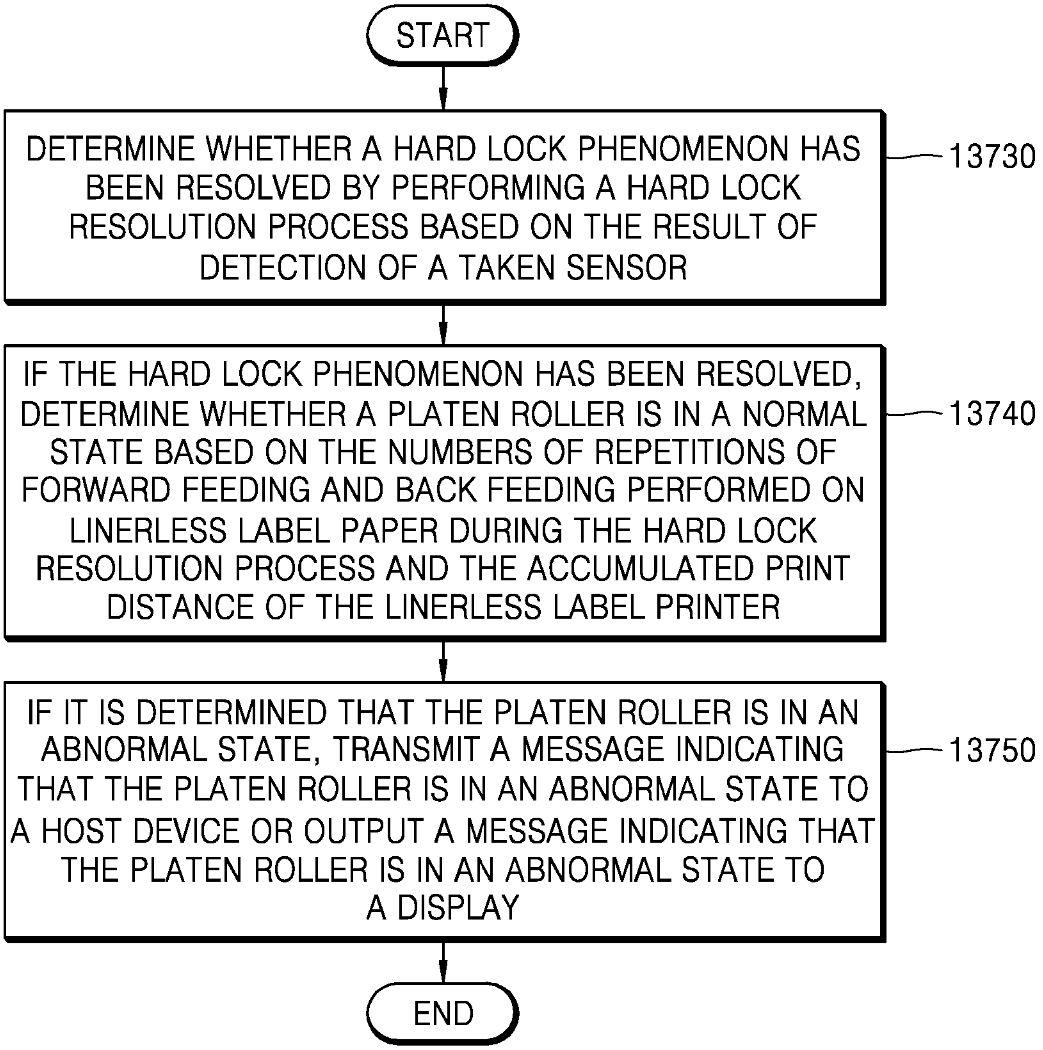

[Fig. 40]

| ACCUMULATED PRINT DISTANCE | MAXIMUM NUMBER OF REPETITIONS OF HARD LOCK RESOLUTION PROCESS |
|---|---|
| 5 KM OR SHORTER | 2 |
| LONGER THAN 5 KM AND EQUAL TO OR SHORTER THAN 10 KM | 3 |
| LONGER THAN 10 KM AND EQUAL TO OR SHORTER THAN 15 KM | 4 |
| LONGER THAN 15 KM AND EQUAL TO OR SHORTER THAN 20 KM | 5 |

METHOD OF MANAGING THERMAL PRINTER AND THERMAL PRINTER FOR PERFORMING THE SAME

CROSS-REFERENCE TO RELATED APPLICATION

This application is a continuation of U.S. application Ser. No. 17/233,876 filed on Apr. 19, 2021, which claims priority from Korean Patent Application No. 10-2020-0051257 filed on 2020 Apr. 28, Korean Patent Application No. 10-2020-0051258 filed on 2020 Apr. 28, Korean Patent Application No. 10-2020-0051259 filed on 2020 Apr. 28, Korean Patent Application No. 10-2020-0061560 filed on 2020 May 22, and Korean Patent Application No. 10-2021-0013669 filed on 2021 Jan. 29, which are hereby incorporated by reference herein in their entireties.

BACKGROUND

1. Technical Field

The embodiments disclosed therein relate to a method of managing a thermal printer and a thermal printer for performing the same.

2. Description of the Related Art

A thermal printer refers to a type of printer that performs printing by applying heat to thermal printing paper. A thermal print head (TPH) included in a thermal printer is composed of a plurality of recording elements including heating elements. When printing is performed, printing paper is pressed by a pressing roller while being in contact with the recording elements, heating elements included in at least some of the recording elements are driven according to print data, the recording elements are heated, and finally an image is formed in the shape of dots on the portions that come into contact with the heated recording elements.

Meanwhile, linerless label paper is paper coated with an adhesive on one surface thereof. Since linerless label paper is generally fabricated in a roll form, a printing surface and an adhesive surface remain in contact with each other for a considerable amount of time. Accordingly, in the linerless label paper, even after the adhesive surface in contact with the printing surface is removed, a small amount of adhesive remains on the printing surface, and thus a thermal print head may be contaminated during printing. If the adhesive is accumulated on the thermal print head, printing performance is not only deteriorated but problems such as the contamination of printing paper may also occur. Therefore, there is a demand for technology for overcoming these problems.

Meanwhile, the above-described background technology corresponds to technical information that has been possessed by the present inventor in order to contrive the present invention or that has been acquired in the process of contriving the present invention, and can not necessarily be regarded as well-known technology that had been known to the public prior to the filing of the present invention.

SUMMARY

The embodiments disclosed herein are intended to provide a method of cleaning a thermal print head contaminated by the accumulation of an adhesive when printing is performed using linerless label paper in a thermal printer, and a printing apparatus for performing the same.

As a technical solution for accomplishing at least one of the above-described objects, according to an embodiment, there is provided a method of managing a printing apparatus including a thermal print head, the method including: starting, by the controller of a printing apparatus, the cleaning of a thermal print head when a predetermined condition is satisfied; selecting, by the controller, a cleaning method based on at least one the satisfied condition and previously stored information; and cleaning, by the controller, the thermal print head by driving at least one of heating elements, included in a plurality of recording elements constituting the thermal print head, according to the selected cleaning method.

According to another embodiment, there is provided a non-transitory computer-readable storage medium having stored thereon a computer program that, when executed by a processor, causes the processor to perform a method of managing a printing apparatus including a thermal print head, wherein the method of managing a printing apparatus includes: starting, by the controller of a printing apparatus, the cleaning of a thermal print head when a predetermined condition is satisfied; selecting, by the controller, a cleaning method based on at least one the satisfied condition and previously stored information; and cleaning, by the controller, the thermal print head by driving at least one of heating elements, included in a plurality of recording elements constituting the thermal print head, according to the selected cleaning method.

According to another embodiment, there is provided a printing apparatus including: a printer including a thermal print head, and configured to perform printing on paper; storage configured to store a program for performing the cleaning of the thermal print head; and a controller configured to control the printer to perform printing and to perform the cleaning of the thermal print head by executing the program; wherein the controller starts the cleaning of a thermal print head when a predetermined condition is satisfied, selects a cleaning method based on at least one the satisfied condition and previously stored information, and cleans the thermal print head by driving at least one of heating elements, included in a plurality of recording elements constituting the thermal print head, according to the selected cleaning method.

BRIEF DESCRIPTION OF THE DRAWINGS

The above and other objects, features, and advantages of the present invention will be more clearly understood from the following detailed description taken in conjunction with the accompanying drawings, in which:

FIG. 1 is a perspective view showing a printing apparatus to which a device for fixing a platen roller for a printing apparatus according to an embodiment is applied;

FIG. 2 is a perspective view showing a state in which a platen roller has been separated from the device for fixing a platen roller for a printing apparatus according to the present embodiment;

FIG. 3 is a perspective view showing the configuration of the device for fixing a platen roller for a printing apparatus according to the present embodiment;

FIG. 4 is an exploded perspective view showing the configuration of the device for fixing a platen roller for a printing apparatus according to the present embodiment;

FIGS. 5 and 6 are front views showing the operation of the device for fixing a platen roller for a printing apparatus according to the present embodiment;

FIG. 7 is a perspective view showing another embodiment of the lever stopper shown in FIG. 5;

FIG. 8 is an exploded perspective view showing the curling prevention member of a printing apparatus according to an embodiment;

FIG. 9 is a perspective view showing a printing apparatus to which an installation structure for an auto-cutter module for a printing apparatus according to an embodiment is applied;

FIG. 10 is a perspective view showing the printing apparatus of FIG. 9 when viewed from the opposite direction;

FIG. 11 is a perspective view showing a state in which an auto-cutter module is separated from the printing apparatus to which the installation structure for an auto-cutter module for a printing apparatus according to the present embodiment is applied;

FIG. 12 is a perspective view showing the printing apparatus of FIG. 11 when viewed from the opposite direction;

FIG. 13 is a front view showing a state in which the auto-cutter module is coupled in the printing apparatus to which the installation structure for an auto-cutter module for a printing apparatus according to the present embodiment is applied;

FIG. 14 is a front view showing a state in which the auto-cutter module shown in FIG. 13 has been moved for separation;

FIG. 15 is a perspective view showing the appearance of a printing apparatus according to an embodiment;

FIG. 16 is a view showing a cross section of the printing apparatus according to the present embodiment;

FIG. 17 is a view showing the configuration of the inner side of the front wall of the main body of the printing apparatus according to the present embodiment;

FIG. 18 is a view showing the inside of the main body of the printing apparatus according to the present embodiment;

FIG. 19 is a view showing the front of the cover of the printing apparatus according to the present embodiment;

FIGS. 20 and 21 are views showing a cross section of the printing apparatus according to the present embodiment in use;

FIG. 22 is a view showing the rear and bottom surfaces of the printing apparatus according to the present embodiment;

FIG. 23 is a view showing a state in which the bottom wall of the main body of the printing apparatus according to the present embodiment has been removed;

FIG. 24 is a view showing the inside of the bottom wall of the main body of the printing apparatus according to the present embodiment;

FIG. 25 is a sectional view of a thermal print head according to an embodiment;

FIG. 26 is a diagram showing the top surface of the thermal print head according to the present embodiment;

FIG. 27 is a diagram showing the configuration of a printing apparatus including a thermal print head according to an embodiment;

FIGS. 28 to 30 are flowcharts illustrating a method of cleaning the thermal print head of a printing apparatus according to embodiments;

FIGS. 31 and 32 are cross-sectional views showing thermal print heads according to other embodiments;

FIG. 33 is a diagram showing a state in which label paper is transferred by a platen roller in a linerless label printer according to an embodiment;

FIG. 34 is a diagram showing the configuration of the linerless label printer according to the present embodiment;

FIGS. 35 and 36 are flowcharts illustrating a method of driving a linerless label printer according to an embodiment;

FIG. 37 is a view illustrating a method of driving a linerless label printer according to an embodiment;

FIGS. 38 and 39 are flowcharts illustrating methods of driving a linerless label printer according to embodiments; and FIG. 40 is a table illustrating a method of driving a linerless label printer according to an embodiment.

DETAILED DESCRIPTION

Various embodiments will be described in detail below with reference to the accompanying drawings. The following embodiments may be modified to various different forms and then practiced. In order to more clearly illustrate features of the embodiments, detailed descriptions of items that are well known to those having ordinary skill in the art to which the following embodiments pertain will be omitted.

Furthermore, in the drawings, portions unrelated to descriptions of the embodiments will be omitted. Throughout the specification, like reference symbols will be assigned to like portions.

Throughout the specification, when one component is described as being "connected or coupled" to another component, this includes not only a case where the one component is "directly connected or coupled" to the other component but also a case where the one component is "connected or coupled to the other component with a third component disposed therebetween." Furthermore, when one portion is described as "including or comprising" one component, this does not mean that the portion does not exclude another component but means that the portion may further include another component, unless explicitly described to the contrary.

Devices for fixing a platen roller for a printing apparatus according to embodiments will be described in detail below with reference to the accompanying drawings.

FIG. 1 is a perspective view showing a printing apparatus to which a device for fixing a platen roller for a printing apparatus according to an embodiment is applied, and FIG. 2 is a perspective view showing a state in which a platen roller has been separated from the device for fixing a platen roller for a printing apparatus according to the present embodiment. Furthermore, FIGS. 3 and 4 are perspective views showing the configuration of the device for fixing a platen roller for a printing apparatus according to the present embodiment, and FIGS. 5 and 6 are front views showing the operation of the device for fixing a platen roller for a printing apparatus according to the present embodiment.

As shown in FIGS. 1 and 2, the device 310 for fixing a platen roller for a printing apparatus according to the present embodiment is installed in the housing 320 of a printing apparatus 31, and fixes a platen roller 35 that pulls printing paper while being operated by a driving member (not shown).

In this case, the printing apparatus 31 according to the present embodiment may include the driving member (not shown), a cutter, the platen roller 35, and a thermal head 36 in the installation space of the housing 320 where an auto-cutter module is installed, and may be provided with a cover (not shown) configured to selectively open and close the installation space of the housing 320.

More specifically, the printing apparatus 31 according to the present embodiment may perform printing through the thermal head 36 while pulling printing paper via the platen roller 35 through the operation of the driving member, may discharge the printing paper from the housing 320, and may cut the printing paper while operating the cutter (not shown) through the driving member.

In this case, the platen roller 35 may pull printing paper while being rotated in such a manner that one of both ends of the platen roller 35 in the longitudinal direction thereof is provided with a gear 35*a* and connected to the driving member, as shown in FIG. 2, and the power provided by the driving member is transferred to the platen roller 35 through the gear 35*a*.

The device 310 for fixing a platen roller according to the present embodiment may include a fixing frame 3100, roller bearings 3200, bearing holders 3300, and a locking part 3400, as shown in FIGS. 2 and 3.

The fixing frame 3100 is a component that provides fixing portions used to install the platen roller 35 on the housing 320 of the printing apparatus 31.

More specifically, the fixing frame 3100 is installed in the installation space of the housing 320, as shown in FIGS. 3 and 4, and provides installation locations for the bearing holders 3300 to be described later, thereby providing fixing portions for both ends of the platen roller 35 in the longitudinal direction.

The fixing frame 3100 may be separate from the housing 320 of the printing apparatus 31, be fabricated in a bracket shape, and be coupled to the housing 320. Alternatively, the fixing frame 3100 may be integrated with the housing 320 as a single body.

The roller bearings 3200 are components configured to allow the rotation of the platen roller 35, and may be installed at both ends of the platen roller 35 in the longitudinal direction, as shown in FIG. 3, be coupled to the bearing holders 300 to be described later, and allow the rotation of the platen roller 35.

The bearing holders 3300 are components that are formed in the fixing frame 3100 and constitute coupling portions for the roller bearings 3200.

More specifically, the bearing holders 3300 may be each formed in the fixing frame 3100 in the shape of a partially opened circular cutout or hole, and may provide coupling portions for the roller bearings 3200 while accommodating the roller bearings 3200.

The bearing holders 3300 may have relatively narrow openings such that the roller bearings 3200 can enter and exit only in a horizontal direction corresponding to the longitudinal direction of the platen roller 35.

In other words, the bearing holders 3300 may allow the entry and exit of the roller bearings 3200 only in the horizontal direction.

More specifically, each of the bearing holders 3300 may include a holder fitting portion 3310 and a rotation prevention portion 3320, as shown in FIG. 3.

The holder fitting portion 3310 is a component that provides an accommodation space into which the roller bearing 3200 can be inserted and coupled in the horizontal direction. The holder fitting portion 3310 is formed in the fixing frame 3100 in the shape of a hole having a circular cross section corresponding to the roller bearing 3200, thereby accommodating the roller bearing 3200 while allowing the roller bearing 3200 to enter and exit only in the horizontal direction, i.e., the longitudinal direction of the platen roller 35.

The rotation prevention portion 3320 is a component that provides a stop portion configured to prevent the roller bearing 3200, coupled to the holder fitting portion 3310 described above, from rotating in the circumferential direction.

More specifically, the rotation prevention portion 3320 may be formed in a shape opened in a part of the holder fitting portion 3310, and may prevent the roller bearing 3200 from rotating in the circumferential direction by providing a stop portion on which a part of the roller bearing 3200 can be caught.

In this case, each of the roller bearings 3200 may include a roller fitting portion 3210 and a roller stop protrusion 3220, as shown in FIG. 3.

The roller fitting portion 3210 is a component which is fitted and coupled into the holder fitting portion 3310 constituting a part of the bearing holder 3300 in the horizontal direction and the rotation of which in the circumferential direction is prevented by the rotation prevention portion 3320.

The roller fitting portion 3210 is formed to have a circular cross section and a roller stop protrusion 3211 protrudes from a portion of the roller fitting portion 3210, so that they can be formed to have a cross section corresponding to the holder fitting portion 3310 and the rotation prevention portion 3320 and be coupled to the roller fitting portion 3310 and the rotation prevention portion 3320 in the horizontal direction.

In this case, as the roller fitting portion 3210 is fitted into the holder fitting portion 3310 in the horizontal direction, the roller fitting portion 3210 is inserted into and caught on the rotation prevention portion 3320 through the roller stop protrusion 3211, so that rotation in the circumferential direction may be prevented.

The roller stop protrusion 3220 is a component that allows the horizontal movement of the roller fitting portion 3210, horizontally entering the holder fitting portion 3310, only in one direction.

More specifically, the roller stop protrusion 3220 is formed in a stepped shape along the circumferential direction outside the roller fitting portion 3210 and is caught on the end of the holder fitting portion 3310 so that the entrance of the roller fitting portion 3210 may be allowed only in one direction of the holder fitting portion 3310.

Accordingly, the roller bearings 3200 may be fitted and coupled into the bearing holders 3300 while moving horizontally from locations outside the platen roller 35 to locations inside the platen roller 35.

In this case, the roller bearings 3200 are coupled to both ends of the platen roller 35 in the longitudinal direction, in which case at least one of the roller bearings 3200 may be coupled to be movable along the longitudinal direction of the platen roller 35.

Accordingly, the pair of roller bearings 3200 may be coupled to the bearing holders 3300 while moving horizontally from locations outside the bearing holders 3300 to locations inside the bearing holders 3300 in the state of having moved in directions away from the bearing holders 3300.

In this case, in the state in which the roller bearings 3200 have moved in directions away from the bearing holders 3300, both ends of the platen roller 35 are fitted into the holder fitting portions 3310 through the rotation prevention portions 3320 constituting parts of the bearing holders 3300 in the vertical direction. As the roller bearings 3200 are fitted into the bearing holders 3300 through horizontal movement, the platen roller 35, together with the roller bearings 3200, may be coupled to the bearing holders 3300.

The locking part 3400 is a component that fixes the roller bearings 3200, together with the platen roller 35, to the bearing holders 3300 in the state of being prevented from moving in the horizontal direction while restraining at least one of the both ends of the platen roller 35 to the bearing holder 3300.

As shown in FIGS. 3 and 4, the locking part 3400 may include a shaft stop protrusion 3410 and a locking lever 3420.

The shaft stop protrusion 3410 is a component that provides a stop portion for the locking lever 3420, to be described later, at the end of the platen roller 35.

More specifically, the shaft stop protrusion 3410 may be configured to form a depression at the end of the platen roller 35 along the circumferential direction, and may protrude outside the roller bearing 3200, thereby forming a stop protrusion on which the locking lever 3420 may be caught.

The locking lever 3420 is a component that comes into close contact with the roller bearing 3200 while being fitted into and caught on the shaft stop protrusion 3410 in the state of being installed on the above-described fixing frame 3100, thereby fixing the platen roller 35 and the roller bearing 3200 in the state in which horizontal movement is prevented.

More specifically, the locking lever 3420 may be formed in the shape of a hook having a handle, and may be pivotably coupled to the fixing frame 3100 via a hinge pin 3421 while being adjacent to the bearing holder 3300.

As shown in FIGS. 5 and 6, the locking lever 3420 is inserted into and caught on the shaft stop protrusion 3410 while pivotably rotating around the hinge pin 3421, thereby fixing the platen roller 35 while preventing the horizontal movement of the platen roller 35. During this process, the locking lever 3420 comes into close contact with one surface of the roller bearing 3200, and thus fixes the roller bearing 3200 while preventing the horizontal movement of the roller bearing 3200.

In this case, an inclined portion 3420*a* is formed on the portion of the locking lever 3420 fitted into the shaft stop protrusion 3410 as shown in FIG. 6, and thus the locking lever 3420 is smoothly coupled without interference in the process of being coupled to the shaft stop protrusion 3410.

Meanwhile, the locking lever 3420 may be pressed in the direction of the shaft stop protrusion 3410 by being coupled through an elastic member 3430, as shown in FIG. 4, and may be provided with a restoring force during rotation for the separation of the platen roller 35.

For example, the elastic member 3430 may be composed of a torsion spring. In the state in which the torsion spring is inserted over the hinge pin 3421, one end of the torsion spring may be fixed to the fixing frame 3100, and the other end thereof may be caught on and elastically supported by the locking lever 3420.

The torsion spring may be elastically compressed by the rotation of the locking lever 3420 when the locking lever 3420 pivots. The torsion spring may press the locking lever 3420 toward the shaft stop protrusion 3410 while providing a restoring force to the locking lever 3420.

Meanwhile, when the locking lever 3420 is brought into excessively close contact with the shaft stop protrusion 3410 by the pressing of the elastic member 3430, the interference of the platen roller 35 occurs during the rotation performed by the driving member, resulting in noise and a hindrance to smooth rotation.

To prevent this, the locking part 3400 may further include a lever stopper 3440, as shown in FIGS. 3 and 4.

The lever stopper 3440 may be provided on the fixing frame 3100 while forming a protrusion or depression shape, and may be disposed on the rotation trajectory of the locking lever 3420. The rotation radius of the locking lever 3420 may be limited by being caught by a part of the locking lever 3420 when the locking lever 3420 is rotated by the restoring force of the elastic member 3430.

Accordingly, when the locking lever 3420 is rotated by the restoring force of the elastic member 3430, the rotation of the locking lever 3420 is limited by the lever stopper 3440, so that excessively close contact with the shaft stop protrusion 3410 can be prevented. The locking lever 3420 may impose restraint to prevent only the horizontal movement of the shaft stop protrusion 3410 without interfering with the rotation of the shaft stop protrusion 3410.

More specifically, the lever stopper 3440 may be composed of a stop protrusion 3451 that protrudes from the fixing frame and is caught on the locking lever 3420, as shown in FIGS. 3 and 4.

Alternatively, the lever stopper 3440 may be composed of a lever slot 3442 which may be formed in the fixing frame in the shape of a depression and into and onto which a part of the locking lever 3420 is inserted and caught, as shown in FIG. 7.

In this case, a portion of the locking lever 3420 may be inserted into and caught on the lever slot 3442 while the locking lever 3420 is rotating around the hinge pin 3421, and thus the rotation of the locking lever 3420 in the forward or reverse direction may be prevented.

In this case, the locking lever 3420 is configured to be movable in the axial direction of the platen roller 35 in the state of being coupled to the hinge pin 3421. The locking lever 3420 may be rotated around the hinge pin 3421, and then a portion of the locking lever 3420 may be fitted and fixed into the lever slot 3442.

The operation and operation of the printing apparatus 31 to which the device 310 for fixing a platen roller according to the present embodiment, which includes the above-described components, is applied will be described below.

When the platen roller 35 is coupled to the printing apparatus 31, at least one of the pair of roller bearings 3200 may be moved along the longitudinal direction of the platen roller 35 such that the pair of roller bearings 3200 become away from each other. Both ends of the platen roller 35 may be vertically fitted into the bearing holders 3300 and then coupled to the bearing holders 3300 through horizontal movement.

In this case, the platen roller 35 is vertically fitted and coupled into the holder fitting portions 3310 through the rotation prevention portions 3320 constituting parts of the bearing holders 3300 in the state in which the roller bearings 3200 have been moved in a direction away from each other.

Furthermore, while the roller bearings 3200 are moving horizontally in a direction toward each other along the longitudinal direction of the platen roller 35, they may be fitted and coupled into the holder fitting portions 3310 and the rotation prevention portions 3320 through the roller fitting portions 3210 and the rotation prevention protrusions 3211, and may be caught on the steps of the roller fitting portions 3210 through the roller stop protrusions 3220.

In this case, the locking lever 3420 allows the platen roller 35 and the roller bearings 3200 to be coupled to the bearing holders 3300 in the state of having been rotated around the hinge pin 3421 by the user. After the platen roller 35 and the roller bearings 3200 have been coupled to the bearing holders 3300, the locking lever 3420 may be restored to its original location by the restoring force of the elastic member 3430 and inserted into and caught on the shaft stop protrusion 3410, and may allow the platen roller 35 and the roller bearings 3200 to be fixed to the bearing holders 3300 in the state in which horizontal movement is prevented.

Meanwhile, the printing apparatus 31 according to an embodiment may further include a pair of curling prevention members 3500 and a curling prevention connector 3600, as shown in FIGS. 7 and 8.

The curling prevention members 3500 are components that prevent printing paper from being curled around the platen roller 35 while guiding the printing paper through the transfer thereof when the platen roller 35 is rotated.

More specifically, the curling prevention members 3500 may include an upstream guide 3510 and a downstream guide 3520 each having a flat surface, as shown in FIG. 7. The curling prevention members 3500 may be disposed upstream of the platen roller 35 and downstream of the platen roller 35, respectively, in a direction in which the printing paper is transferred, and may guide the printing paper.

In this case, the upstream and downstream guides 3510 and 3520 guide printing paper by providing flat surfaces on the upstream and downstream sides of the platen roller 35 while exposing only the upper part of the platen roller 35, thereby preventing the printing paper from curling around the platen roller 35.

The curling prevention connector 3600 is a component that forms an entrance for the platen roller 35 that is used to selectively attach and detach the platen roller 35 by exposing the platen roller 35 as a whole.

In other words, the curling prevention connector 3600 may provide an entrance for the attachment and detachment of the platen roller 35 by allowing the user to perform easy separation while detachably coupling at least one of the upstream and downstream guides 3510 and 3520, exposing only a part of the platen roller 35, to the housing 320.

More specifically, the curling prevention connector 3600 may include a hook slot 3610 and a snap hook 3620, as shown in FIG. 8.

The hook slot 3610 is a component that provides a coupling portion for the downstream guide 3520, which is one of the upstream and downstream guides 3510 and 3520 constituting the curling prevention member 3500.

The hook slot 3610 may be formed in the form of a depression in the housing 320, and may provide a coupling portion into which the snap hook 3620 to be described later can be fitted in a snap manner and thus easily coupled.

The snap hook 3620 may be provided in the form of a hook on the downstream guide 3520, and may be detachably fitted and coupled into the hook slot 3610 in a snap manner.

In other words, the snap hook 3620 may be formed to be coupled or separated by the force of a user without a separate fixing member, and may be fitted and coupled into the hook slot 3610.

Accordingly, the downstream guide 3520 may be fixed with a part of the platen roller 35 exposed while being coupled to the hook slot 3610 through the snap hook 3620. When the platen roller 35 is attached or detached, the downstream guide 3520 is detached from the hook slot 3610 by the force of the user and allows the platen roller 35 to be exposed as a whole, thereby forming an entrance for the platen roller 35.

Meanwhile, the printing apparatus 31 according to an embodiment may further include a linerless roller 3700, as shown in FIGS. 7 and 8.

The linerless roller 3700 is a component that prevents a decrease in the coupling force of the platen roller 35 applied by the locking part 3400 by buffering the tension applied to the platen roller 35 by the printing paper.

The linerless roller 3700 is rotatably installed in the housing 320 in the state of being adjacent to the platen roller 35, and supports printing paper in a movable manner, thereby buffering the tension of the printing paper applied to the platen roller 35.

In other words, the linerless roller 3700 may movably support the printing paper while rotating on the supply side of the printing paper so that the printing paper can be transferred to the platen roller 35 in a straight direction. The printing paper is moved horizontally by the linerless roller 3700, and thus the tension applied to the platen roller by the printing paper may be buffered.

In this case, the linerless roller 3700 may be rotatably installed on the upstream guide 3510 constituting the curling prevention member 3500, as shown in FIG. 7. Alternatively, it may be rotatably installed on the housing 320.

As described above, according to the printing apparatus 31 including the device 310 for fixing a platen roller according to the present embodiment, the roller bearings 3200, together with the platen roller 35, are horizontally coupled to the bearing holders 3300, and the horizontal movement thereof is prevented by the locking part 3400. Accordingly, even when the platen roller 35 is operated, the platen roller may be securely fixed without being separated from the bearing holder 3300.

An installation structure for an auto-cutter module for a printing apparatus according to an embodiment will be described below with reference to the drawings.

FIGS. 9 and 10 are perspective views showing a printing apparatus to which the installation structure for an auto-cutter module for a printing apparatus according to the present embodiment is applied, FIGS. 11 and 12 are perspective views showing a state in which an auto-cutter module is separated in the printing apparatus to which the installation structure for an auto-cutter module for a printing apparatus according to the present embodiment is applied, and FIGS. 13 and 14 are front views showing a state of the auto-cutter module in the printing apparatus to which the installation structure for an auto-cutter module for a printing apparatus according to the present embodiment is applied.

The installation structure for an auto-cutter module for a printing apparatus according to the present embodiment is a structure for detachably installing an auto-cutter module 410 that is installed in the housing 420 of the printing apparatus 41 with a movable cutter (not shown) contained therein and that cuts the printing paper, discharged from the housing 420, through the reciprocating movement of the movable cutter while being operated by the driving member (not shown), as shown in FIGS. 9 and 10.

In this case, the printing apparatus 41 according to an embodiment may include a driving member, a platen roller, and a thermal head (not shown) in the installation space of the housing 420 in which the auto-cutter module 410 is installed, and may be provided with a cover 430 configured to selectively open and close the installation space of the housing 420.

More specifically, the printing apparatus 41 according to the present embodiment may perform a printing operation through the thermal head while pulling the printing paper through the platen roller by the operation of the driving member, may discharge the printing paper from the housing 420, and may cut the printing paper while operating the auto-cutter module 410 through the driving member.

The installation structure for the auto-cutter module 410 according to the present embodiment may include a cutter seating plate 4100, a fixing frame 4200, seating plate coupling members 4300, and a locking member 4400, as shown in FIGS. 11 and 12.

The cutter seating plate 4100 is a component that is coupled to the housing 420 or separated from the housing 420 together with the auto-cutter module 410 because the auto-cutter module 410 is fixed to the cutter seating plate 4100 in the state of being seated on one surface of the cutter seating plate 4100.

In this case, the auto-cutter module 410 may include a gear and a movable cutter contained in a container-type case, may be connected to the driving member of the printing apparatus 41, and may cut the printing paper in such a manner that the gear reciprocates the movable cutter while being rotated through the operation of the driving member.

A conventional configuration used in the printing apparatus 41 other than the above-described configuration may be applied to the auto-cutter module 410.

The cutter seating plate 4100 may include a seating plate body portion 4110, a seating plate pressing portion 4120, and a handle portion 4130.

The seating plate body portion 4110 is a component that provides a seating portion to which the auto-cutter module 410 can be fixed.

The seating plate main body 4110 may be composed of a plate having an area corresponding to one surface of the auto-cutter module 410, and may allow the auto-cutter module 410 to be fixed thereto in the state of being seated thereon.

In this case, the seating plate body portion 4110 may be fixed to the auto-cutter module 410 through a fixing member (not shown), and may be provided with a connector capable of connecting the auto-cutter module 410 and the driving member of the printing apparatus 41.

Meanwhile, stop protrusions 4310 constituting parts of the seating plate coupling members 4300 to be described later may be provided at both ends of the seating plate body portion 4110 in the longitudinal direction.

The seating plate pressing portion 4120 is a component that provides a pressing portion for a locking member 4400 to be described later to the seating plate body portion 4110, as shown in FIG. 12.

More specifically, the seating plate pressing portion 4120 may be composed of a protruding piece having a predetermined length that is bent in the state of being perpendicular to the seating plate body portion 4110 while protruding from one of both ends of the seating plate body portion 4110 in the longitudinal direction.

In this case, a non-slip protrusion (not shown) may be formed on the surface of the seating plate pressing portion 4120 in order to prevent the slip of the locking member 4400 when the seating plate pressing portion 4120 is pressed by the locking member 400 to be described later.

Meanwhile, the seating plate pressing portion 4120 may be bent while being integrated with the seating plate body portion 4110, as shown in FIG. 12. Alternatively, the seating plate pressing portion 4120 may be separated from the seating plate body portion 4110 and coupled to the seating plate body portion 4110.

In this case, the seating plate pressing portion 4120 may be coupled to the seating plate body portion 4110 to allow the adjustment of the distance to the locking member 4400, which will be described later. In other words, the seating plate pressing portion 4120 may securely fix the seating plate body portion 4110 by adjusting the elastic force of the locking member 4400 through the adjustment of the distance to the locking member 4400.

The handle portion 4130 is a component configured to provide a handle for moving the seating plate main body 4110, and may protrude from a part of the seating plate body portion 4110 while forming at least one part.

The handle portion 4130 may provide a handle used by a user when the seating plate body portion 4110 is installed or separated, so that the seating plate body portion 4110 can be more easily installed and separated.

Meanwhile, the cutter seating plate 4100 may be composed of only the configurations of the seating plate body portion 4110 and the seating plate pressing portion 4120 with the above-described configuration of the handle portion 4130 omitted therefrom.

The fixing frame 4200 is a component that provides fixing portions configured to install the cutter seating plate 4100 on the housing 420 of the printing apparatus 41.

More specifically, the fixing frame 4200 may be installed on both sides of the installation space of the housing 420, as shown in FIGS. 11 and 12, and may face both ends of the cutter seating plate 4100 in the longitudinal direction.

Furthermore, the fixing frame 4200 may provide installation portions for the cutter seating plate 4100 by forming protrusion holders 4320 constituting parts of the seating plate coupling members 4300 to be described later.

The fixing frame 4200 may be separated from the housing 420 of the printing apparatus 41, may be fabricated in the form of a bracket, and may be coupled to the housing 420. Alternatively, the fixing frame 4200 may be integrated with the housing 420.

The seating plate coupling members 4300 are components for detachably coupling the cutter seating plate 4100 to the fixing frame 4200, and may be formed on/in the cutter seating plate 4100 and the fixing frame 4200 in male and female shapes, respectively, as shown in FIGS. 11 and 12, and be selectively coupled to and separated from each other.

More specifically, the seating plate coupling members 4300 may include the stop protrusions 4310 provided on the cutter seating plate 4100 and the protrusion holders 4320 provided in the fixing frame 4200.

The stop protrusions 4310 are components constituting the male ones of the male and female structures constituting the seating plate coupling members 4300, and may protrude at both ends or one end of the cutter seating plate 4100 in the longitudinal direction, and be fastened into the protrusion holders 4320 to be described later while moving horizontally together with the cutter seating plate 4100 by pressing the lock member 4400 to described later.

Each of the locking protrusions 4310 may include a protrusion body portion 4311 and a hook portion 4312, as shown enlarged in FIG. 11.

At least one protrusion body portion 4311 may protrude from each end of the cutter seating plate 4100, may be fitted into the protrusion holder 4320, and may protrude in a direction perpendicular to the cutter seating plate 4100.

The hook portion 4312 is a component that forms a hook shape together with the protrusion body portion 4311 and provides a stop portion that can be fastened into the protrusion holder 4320.

More specifically, the hook portion 4312 may extend at an end of the protrusion body portion 4311 in the widthwise direction of the protrusion body portion 4311, and may form a stop protrusion that can be fastened into the protrusion holder 4320 by expanding the width of an end of the protrusion body portion 4311.

The stop holders 4320 are components constituting female ones of the male and female structures constituting the seating plate coupling members 4300, and may be formed in the form of holes or recesses in the fixing frame 4200, and provide fastening portions for the stop protrusions 4310.

More specifically, each of the stop holders 4320 may provide a fitting portion into which the protrusion body portion 4311 and the hook portion 4312 constituting the stop protrusion 4310 can be fitted, and may provide a fitting portion for the hook portion 4312 constituting a part of the stop projection 4310 while allowing the movement of the stop projection 4310 during the horizontal movement of the cutter seating plate 4100.

Each of the stop holders 4320 may include a fitting portion 4321 and a locking portion 4322, as shown enlarged in FIG. 12.

The fitting portion 4321 is a component that provides a fitting portion into which the protrusion body portion 4311 and the hook portion 4312 constituting the stop protrusion 4310 can be inserted. The fitting portion 4321 may be formed as a hole having a size corresponding to the width of the hook portion 4312, and may accommodate the stop protrusion 4310.

The stop portion 4322 is a component that provides a stop portion for the stop projection 4310 while allowing the movement of the stop projection 4310. The stop portion 4322 may be formed as a hole having a size corresponding to the width of the protrusion body portion 4311 constituting a part of the stop projection 4310, and may extend in the moving direction of the cutter seating plate 4100, thereby providing a stop portion for the hook portion 4312 while allowing the movement of the protrusion body portion 4311.

In sum, when the cutter seating plate 4100, together with the auto-cutter module 410, is coupled to the fixing frame 4200, it may be inserted into the protrusion holders 4320 through the stop protrusions 4310, as shown in FIG. 14, and be fastened while moving horizontally, as shown in FIG. 13. In this process, the hook portions 4312 constituting parts of the locking protrusions 4310 may be fastened by being caught on the stop portions 4322 constituting parts of the protrusion holders 4320.

Meanwhile, when the stop holders 4320 are formed in the shape of recesses opened at the ends of the fixing frame 4200 as shown in FIG. 11, the above-described fitting portions 4321 may be omitted and only the configuration of the stop portions 4322 may be provided.

Furthermore, each of the stop holders 4320 may further include a burr prevention portion 4323, as shown in FIG. 12.

The burr prevention part 4323 is a component for preventing a burr from being generated during the process of fabricating the stop holder 4320.

More specifically, the burr prevention portion 4323 may be formed in the state of being cut in an arcuate cross section at a corner of the stop portion 4322 or the fitting portion 4321. The burr prevention portion 4323 may prevent a burr from being generated in the corresponding portion during the formation of the stop holder 4320.

The locking member 4400 is a component that locks the stop protrusion 4310 and the protrusion holder 4320 in a fastened state while fastening the stop protrusion 4310 and the protrusion holder 4320 constituting the seating plate coupling member 4300 while moving the cutter seating plate 4100 horizontally by pressing the cutter seating plate 4100 in one direction.

In other words, the locking member 4400 fastens the seating plate coupling member 4300 through a pressing force that moves the cutter mounting plate 4100 horizontally in one direction, and at the same time, maintains the pressing force with the seating plate coupling member 4300 fastened, thereby locking the stop protrusion 4310 and the protrusion holder 4320 constituting the seating plate coupling member 4300 in a fastened state.

The locking member 4400 may include a pressing plate 4410 and an elastic element 4420, as shown in FIG. 11.

The pressing plate 4410 is a component that fastens the seating plate coupling member 4300 by moving the cutter seating plate 4100 horizontally by pressing the seating plate pressing portion 4120 constituting a part of the cutter seating plate 4100.

The pressing plate 4410 may be installed in the housing 420 of the printing apparatus 41 so that it can be reciprocated therein and be disposed adjacent to the seating plate pressing portion 4120 of the cutter seating plate 4100, and may move the cutter seating plate 4100 horizontally by pressing the seating plate pressing portion 4120 in the state of being in close contact with the seating plate pressing portion 4120 through the elastic force of the elastic body 4420 to be described later.

In this case, a fitting recess (not shown) into which the seating plate pressing portion 4120 can be fitted may be formed in the surface of the pressing plate 4410 so that the seating plate pressing portion 4120 can come into close contact with the pressing plate 4410 and be placed in a correct location.

The elastic element 4420 is a component for providing elastic force to the pressing plate 4410, and may provide elastic force to the pressing plate 4410 in the state of being interposed between the housing 420 and the pressing plate 4410.

This elastic body 4420 may be composed of a coil spring, as shown in the drawing. Alternatively, any configuration may be used as long as it is a configuration capable of providing elastic force to the pressing plate 4410, such as a leaf spring or a torsion spring.

In sum, the pressing plate 4410 may move the cutter seating plate 4100 horizontally by pressing the seating plate pressing portion 4120 of the cutter seating plate 4100 through the elastic force of the elastic element 4420, and the stop protrusion 4310 and the stop holder 4320 constituting the seating plate coupling member 4300 may be locked in a locked state while being fastened to each other by the horizontal movement of the cutter seating plate 4100.

Accordingly, the auto-cutter module 410, together with the cutter seating plate 4100, may be coupled to the fixing frame 4200.

Meanwhile, the above-described cover 430 may cover the auto-cutter module 410 while opening and closing the installation space of the housing 420, as shown in FIGS. 9 and 10.

The cover 430 may cover the auto-cutter module 410 while being coupled to the housing 420 through coupling protrusions 430*a* provided on the periphery thereof.

In this case, at least one cover protrusion 435 configured to prevent the movement of the auto-cutter module 410 may protrude from the cover 430.

The cover protrusion 435 may protrude from one surface of the cover 430 facing the auto-cutter module 410, and may prevent the movement of the auto-cutter module 410 in such a manner as to bring the cutter seating plate 4100 into close contact with the fixing frame 4200 by pressing the auto-cutter module 410 when the cover 430 is coupled to the housing 420.

Accordingly, the auto-cutter module 410 may be prevented from moving in the process of being operated by the driving member, thereby allowing an accurate cutting operation to be performed, and may also be prevented from being undesirably separated from the fixing frame 4200.

More specifically, the movement of the auto-cutter module 410 generated in the operating direction of the movable cutter during a cutting process may be prevented through the stop portion 4322 of the stop holder 4320, the movement generated in the direction of the cover 430 may be prevented through the hook portion 4312 of the stop protrusion 4310 and the cover protrusion 435, and the movement generated in the left and right directions of the cutter seating plate 4100 may be buffered by the elastic force of the pressing plate 4120 and the elastic element 4420.

The operation of the printing apparatus 41 to which the installation structure for the auto-cutter module according to the present embodiment, including the above-described components, is applied will be described.

When the auto-cutter module 410 is coupled to the printing apparatus 41, the cutter seating plate 4100 may be coupled to the fixing frame 4200 through the seating plate coupling member 4300 in the state of being held by a user through the handle portion 4130.

In this case, the stop protrusions 4310 may be fitted and coupled into the protrusion holders 4320, as shown in FIG. 14, and the pressing plate 4410 may press the seating plate pressing portion 4120 through the elastic force of the elastic element 4420 in the state of being in close contact with the seating plate pressing portion 4120 of the cutter seating plate 4100.

Accordingly, the cutter seating plate 4100 may be moved horizontally by pressing the pressure plate 4410, as shown in FIG. 13, and may be fastened into the stop holder 4320 as the stop protrusion 4310 moves horizontally, thereby being coupled to the fixing frame 4200.

Furthermore, the cutter seating plate 4100 may be locked in the state of being fastened to the fixing frame 4200 by being continuously pressed by the elastic force of the pressing plate 4410.

The cover 430 may be coupled to the housing 420, and may cover the auto-cutter module 410 while pressing the auto-cutter module 410 in the direction of the fixing frame 4200 through the cover protrusion 435.

The printing apparatus 41 may perform printing on printing paper through the thermal head while pulling the printing paper by rotating the platen roller through the operation of the driving member, and may then discharge the printing paper through the outlet of the housing 420.

The auto-cutter module 410 may cut the printing paper through the reciprocating movement of the contained movable cutter while being operated by the driving member.

In this case, the auto-cutter module 410 may maintain the state of being going to be locked by means of the pressing plate 4410 constituting a part of the locking member 4400 and be pressed by the cover protrusion 435, so that it can be operated stably without moving during operation or being undesirably separated from the fixing frame 4200.

Meanwhile, when the auto-cutter module 410 is separated from the housing 420, the cutter seating plate 4100 may be moved in the direction of the pressing plate 4410 in the state of being gripped through the handle portion 4130. In this process, the locking protrusion 4310 may be separated from the fixing frame 4200 by allowing the locking protrusion 4310 to be separated from the protrusion holder 4320.

As described above, according to the printing apparatus 41 including the installation structure for an auto-cutter module according to the present embodiment, the auto-cutter module 410 for cutting printing paper may be easily attached to or detached from the housing 420, and the stable operation of the auto-cutter module 410 may be achieved by securely locking the auto-cutter module 410 in the state of being coupled to the housing 420.

The configuration of a printing apparatus according to an embodiment will be described below with reference to the drawings.

FIG. 15 is a perspective view showing the appearance of a printing apparatus according to the present embodiment, FIG. 16 is a view showing a cross section of the printing apparatus according to the present embodiment, and FIG. 17 is a view showing the configuration of the inner side of the front wall of the main body of the printing apparatus according to the present embodiment.

FIG. 18 is a view showing the inside of the main body of the printing apparatus according to the present embodiment, FIG. 19 is a view showing the front of the cover of the printing apparatus according to the present embodiment, and FIGS. 20 and 21 are views showing a cross section of the printing apparatus according to the present embodiment in use.

Furthermore, FIG. 22 is a view showing the rear and bottom surfaces of the printing apparatus according to the present embodiment, FIG. 23 is a view showing a state in which the bottom wall of the main body of the printing apparatus according to the present embodiment has been removed, and FIG. 24 is a view showing the inside of the bottom wall of the main body of the printing apparatus according to the present embodiment.

As shown in FIG. 15, the printing apparatus 61000 according to the present embodiment includes a housing 6100.

The housing 6100 accommodates internal components while forming the appearance of the printing apparatus 61000 as a whole.

The housing 6100 is formed in an approximately hexahedral shape, includes six walls including a front wall 611 and an upper wall 621, and surrounds the interior of the printing apparatus 61000. In this case, the housing 6100 is not necessarily formed in a hexahedral shape. However, when the housing 6100 is formed in a hexahedral shape, a user may dispose the printing apparatus 61000 in a different seating direction for the sake of convenience.

For example, when an outlet 650 is formed at a corner portion where the front wall 611 and the upper wall 621 cooperate with each other and also the housing 6100 has a hexahedral shape as a whole as illustrated in FIG. 15, it may be contemplated for the sake of convenience to place and use the printing apparatus 61000 so that the rear surface of the printing apparatus 61000 faces downward.

Meanwhile, the housing 6100 may include a main body 610 and a cover 620 that are hinged to each other.

The main body 610 may form the front wall 611, rear wall 613, side walls 612, and bottom wall 614 of the housing 6100 under the cover 620 according to the present embodiment, and may include an accommodation space for printing paper therein. Furthermore, the cover 620 may form the top wall 621 of the housing 6100, may be hinged to the main body 610, and may selectively open and close the inner space of the main body 610. In other words, the housing 6100 may be selectively opened and closed by the rotation of the cover 620. In this case, an opening/closing means for selectively opening and closing the cover 620 may be provided on one side of the cover 620 or the main body 610.

However, the arrangement directions or coupling locations of the cover 620 and the main body 610 may be formed differently from those shown in the drawings according to an embodiment. For example, according to another embodiment, the cover 620 may be formed in the front of the housing 6100 to form the front wall of the housing 6100.

Meanwhile, as shown in FIG. 16, the printing apparatus 61000 includes a transfer roller 630 configured to transfer the printing paper accommodated in the main body 610, and a print head 640 configured to print data on the printing paper P transferred by the transfer roller 630.

The transfer roller 630 may transfer printing paper P and, at the same time, press the printing paper P toward the print head 640 by being rotated in the state of being in close contact with the printing paper P, so that printing can be performed.

Furthermore, the print head 640 is, e.g., a thermal print head, includes a recording element including a heating element, and performs printing by heating printing paper in such a manner that the heating element selectively generates heat. Accordingly, the print head 640 may heat printing paper while transferring the printing paper in close contact with the print head 640 by means of the transfer roller 630 so that data can be sequentially recorded along the direction in which the print paper is transferred.

Meanwhile, the printing apparatus 61000 is provided with the outlet 650. The outlet 650 is an exit through which the front end of the printed paper, which has been printed while passing between the transfer roller 630 and the print head 640, is discharged out of the housing 6100. The outlet 650 is disposed at the rear end of a transfer path in a second direction different from the transfer direction (hereinafter referred to as the "first direction") in which the printing paper is transferred by the transfer roller 630.

Referring to FIG. 19, the first direction D1 is the direction in which the printing paper P is transferred by the transfer roller 630 while printing is performed on the printing paper P. The first direction D1 may be a tangential direction at a contact point at which the transfer roller 630 is in contact with the print head 640.

Furthermore, the second direction D2 is a direction different from the first direction D1, and may be a direction that is changed by a predetermined angle, e.g., an angle within the range of 30 to 90 degrees, at the rear end of the transfer path in the first direction D1. Furthermore, the outlet 650 is disposed at the rear end of a transfer path in the second direction D2, and allows the printing paper P, transferred in the first direction D1, changed to the second direction D2, and then transferred again, to be exposed to the outside.

In this case, the outlet 650 may be formed by cooperation between the cover 620 and the main body 610. More specifically, the top wall 621, formed by the cover 620, and the front wall 611 of the main body 610 cooperate to form the outlet 650.

The front wall 611 may extend to the height of the top surface of the top wall 621 of the housing 6100, and the top wall 621 may selectively come into contact with the front wall 611 by the rotation of the cover 620 and selectively open and close the housing 6100. A retreat portion 611*c* formed by retreating the front wall 611 downward from the top wall 621 by a width w equal to or larger than the width of the printing paper P may be formed at the upper end 611*b* of the front wall 611.

In other words, the height of the upper end 611*b* of the front wall 611 at both ends thereof is the same as the height of the top surface of the top wall 621, and the height of the upper end 611*b* of the front wall 611 in the central part is retreated downward by more than the width of the printing paper, so that an opening formed by the retreat portion 611*c* forms the discharge port 650. In this case, the width w of the retreat portion 611*c* may be formed larger than the width of the printing paper P as described above. In addition, the distance 1 by which the retreat portion is retreated downward may be relatively shorter than the height of the cover, which will be described later.

In this case, the front wall 611 may be inclined forward as the portion of the front wall 611 below the retreat portion 611*c* becomes closer to the retreat portion 611*c*, i.e., as it approaches the retreat portion 611*c*, as shown in FIGS. 15 and 16. Accordingly, the outlet 650 may have an opening sufficient to discharge the printing paper P therethrough. In other words, the front wall 611 may be formed such that the portion of the front wall 611 below the retreat portion 611*c* is bent outward, thereby forming the outlet 650 having a margin.

Meanwhile, the printing apparatus 61000 may be provided with a cutter 660 configured to cut the rear end of the printed paper P. In this case, the cutter 660 may include one or more cutting blades, and FIG. 16 shows a configuration including a fixed blade 661 and a movable blade 662 as an embodiment. In the illustrated embodiment, the movable blade 662 is moved toward the fixed blade 661 so that the movable blade 662 and the fixed blade 661 cross each other, and thus the printing paper P placed therebetween is cut. Accordingly, the location at which the printing paper P is cut may be a location where the transfer path of the printing paper P crosses the vertically arranged cutter 660.

As described above, the cutter 660 is disposed on the transfer path of the printing paper P. More specifically, the cutter 660 may be disposed downstream of the print head 640 in the transfer direction such that when printing is completed, it is selectively operated and cuts the printing paper P.

Meanwhile, the above-described transfer path in the first direction D1 may extend to the location in which the printing paper P is cut by the cutter 660. In other words, in an embodiment, the transfer path in the first direction D1 formed by the transfer roller 630 is maintained up to the cutting location in which the cutter 660 is disposed, and no other configuration for changing the transfer path is disposed between them.

Furthermore, after the printing paper P has been passed through the cutting location, the direction of the transfer path may be changed in the second direction D2. To this end, according to an embodiment, there may be provided a first guide portion 611*a* disposed on the inside surface of the housing 6100 to face the transfer path in the first direction D1 and configured to come into contact with the printing paper P on which data has been printed, thereby changing the transfer path of the printing paper P in the second direction D2 and guiding the printing paper P to the outlet 650.

The first guide portion 611*a* is illustrated as being formed on the inside surface of the front wall 611 in one embodiment. However, this is only one embodiment. For example, when the first direction D1 is directed upward based on the drawing, the first guide portion 611*a* may be formed on the inside surface of the top wall 621 disposed in a direction corresponding to the upward direction.

The first guide portion 611*a* may include a slope inclined toward the second direction D2 to come into contact with the printing paper P at the rear end of the transfer path in the first direction D1 so that the printing paper P is bent in the second direction D2 and moves in order to guide the printing paper P, moving along the transfer path in the first direction D1, in the second direction D2 directed toward the outlet 650.

In particular, the first guide portion 611*a* may be configured in the form of one or more ribs protruding from the inside surface of the front wall 611 along the second direction to have a predetermined length and width, as shown in FIG. 17.

Each of the ribs includes a slope inclined in the second direction D2, as described above. To this end, the protruding height of the first guide portion 611*a* may be decreased toward a rear location based on the second direction D2.

In the drawing, there is shown the first guide portion 611*a* that extends on the inside surface of the front wall 611 from a height relatively lower than the height where the transfer path in the first direction D1 is formed to the upper end of the front wall 611 where the outlet 650 is formed. Accordingly, it can be seen that the printing paper P transferred in the first direction D1 comes into contact with the first guide portion 611*a*, is bent upward, and then reach the outlet 650.

In this case, when the first guide portion 611*a* is composed of a plurality of ribs, the individual ribs may have the same shape and be arranged at predetermined intervals. In this case, a rib may not be disposed or have a relatively low height in a center portion based on the direction in which the ribs are arranged.

The first guide portion 611*a* is disposed downstream of the cutting location in which the cutter 660 is disposed based on the direction in which the printing paper P is transferred. In this case, when the fixed blade 661 and movable blade 662 of the cutter 660 are operated, the largest load is formed in the central portion of the cutter 660 and the central portion of the cutter 660 in the longitudinal direction tends to be bent outward. Accordingly, in order to avoid interference with the cutter 660, when the first guide portion 611*a* is configured in the form of a plurality of ribs as described above, a rib may not disposed or the height of a rib may be limited in the central portion corresponding to the longitudinal central portion of the cutter 660.

Meanwhile, referring to FIG. 16 again, a second guide portion 621*a* may be formed at the front end of the top wall 621 formed in the cover 620. The second guide portion 621*a* guides the printing paper P in the second direction D2 in cooperation with the first guide portion 611*a*. To this end, the second guide portion 621*a* may include a slope inclined in the same direction as the first guide portion 611*a*, as shown in FIG. 16.

Through this, the printing paper P may be guided to the outlet 650 with the top surface of the printing paper P surrounded by the second guide portion 621*a* and the bottom surface thereof surrounded by the first guide portion 611*a*.

More specifically, the second guide portion 621*a* may extend downward from a cover front 621*b* formed at the front end of the cover 620 and be disposed in front of the fixed blade 661 of the cutter 660, as shown in FIG. 19.

In this case, the second guide portion 621*a* may be configured in the form of a plurality of ribs arranged at regular intervals, like the first guide portion 611*a*. In this case, the rib arranged in a central portion may have a relatively short length, as shown in the drawing, in order to avoid interference with the cutter 660. Alternatively, in an embodiment, a rib may not be disposed in the central portion.

Meanwhile, the cover front 621*b* formed at the front end of the cover 620 has a height corresponding to the height of the cover 620, and is selectively exposed by being opened and closed by the front wall 611 through the opening and closing of the cover 620. In particular, both ends of the cover front 621*b* may be completely closed by the upper end 611*b* of the front wall 611, and the central portion of the cover front surface 621*b* may be partially exposed to the outside through the outlet 650 even when the cover 620 is closed.

Meanwhile, the cover front 621*b* may be provided with a pair of paper guides 621*c* configured to extend forward and cover both ends of the retreat portion 611*c* to guide the discharged printing paper in the widthwise direction.

In this case, the height of the cover 620 may be formed larger than the distance 1 by which the retreat portion 611*c* is retreated downward, and accordingly the paper guide 621*c* may also be extended forward with respect to the overall height of the cover 620. Furthermore, in the state in which the cover 620 is closed, the lower end of the paper guide 621*c* is closed by the front wall 611, and the upper end thereof may be exposed to the outside by the retract portion 611*c*.

To this end, in the state in which the cover 620 is closed, the lower end of the paper guide 621*c* may have a width extending from the cover front 621*b* to the inside surface of the front wall 611, and the upper end of the paper guide 621*c* may have a width extending further forward than the lower end from the cover front surface 621*b* so as to surround both ends of the retreat portion 611*c*. Accordingly, the paper guide 621*c* may have steps 621*c*' in the vertical direction.

Therefore, the portions in which the steps 621*c*' are formed may be caught and seated on the retract portion 611*c* when the cover 620 is closed.

Meanwhile, a paper accommodation space 670 may be formed in the printing apparatus 61000. More specifically, the paper accommodation space 670 may be formed as a cavity that is located on a transfer path branching from the rear end of the transfer path in the first direction toward a third direction different from the second direction.

Referring to FIG. 16, the paper accommodation space 670 may be formed as a cavity that extends in a direction opposite to the second direction in front of the movable blade 662 of the cutter 660.

In this case, the paper accommodation space 670 may be formed by spacing the front wall 611 of the housing 6100 apart from the cutting location, where the cutter 660 is disposed, outward, e.g., forward according to the embodiment shown in the drawing, by a predetermined distance L. In the embodiment shown in the drawing, the front wall 611 is spaced apart from the cutting location. Alternatively, in another embodiment, the paper accommodation space 670 may be formed by spacing one side wall of the housing 6100, facing the transfer path in the first direction D1, apart from the cutting location.

In this case, the predetermined distance L is the distance from a partition wall to the front wall 611 that prevents the separation of the movable blade 662 constituting a part of the cutter 660 and limits a movable range. In general, the predetermined distance L may be a distance that exceeds a normal level of spacing that may be formed between components when a device is fabricated. For example, the predetermined distance may be 3 mm or more.

Referring to FIG. 18, it can be seen that the inside surface of the front wall 611 may be spaced apart from the partition wall of the cutter 660 by the predetermined distance L, so that the paper accommodation space 670 is formed inside the front wall 611 of the printing apparatus 61000.

The paper accommodation space 670 may temporarily accommodate the printing paper P that is transferred without being discharged from the printing apparatus 61000 when interference with the discharge of the printing paper P occurs in the outlet 650 due to a person's hand or an object.

In this case, the third direction D3 in which the paper accommodation space 670 extends is a direction branching at the rear end of the transfer path in the first direction D1 toward a direction different from the second direction D2, as shown in FIG. 20 or 21. In particular, the third direction D3 may be the direction opposite to the second direction D2. In the case where the third direction D3 is the direction opposite to the second direction D2, when the printing paper P is accumulated in front of the outlet 650 due to interference, the printing paper P newly transferred by the transfer roller 630 may be guided to the paper accommodation space 670 by being naturally directed at the rear end of the transfer path in the first direction D1 to the third direction D3 by the external force generated by the accumulated printing paper P.

Furthermore, in the case where the third direction D3 is disposed along a straight line in the direction opposite to the second direction D2, even when the printing paper P accommodated in the paper accommodation space 670 is manually discharged to the outlet 650 in the future, the paper may be discharged along a straight path without damage such as wrinkling or tearing.

As shown in FIG. 20, the printing paper P is unwound by the transfer roller 630, and data is recorded on the printing paper P while the printing paper is pressed against the print head 640. In this case, the printing paper P is moved to the cutting location, in which the movable blade 661 and the fixed blade 662 are arranged in a straight line, along the transfer path in the first direction D1.

When the printing paper P is fed to the first guide portion 611*a* formed on the front wall 611 beyond the cutting location, it is directed toward the second direction D2 by the first guide portion 611*a* and then guided to the outlet 650. Meanwhile, as shown in FIG. 21, when there is an obstacle such as a human finger F in front of the outlet 650 and it is difficult to discharge the printing paper P, the printing paper P that is transferred along the transfer path in the first direction D1 may be bent by the external force generated by the front portion of the accumulated printing paper P, and may then be guided in the third direction D3 in which the paper accommodation space 670 is formed.

Accordingly, the printing paper P is at least temporarily accommodated in the paper accommodation space 670, so that the jam, wrinkle and damage of the paper can be prevented and printing can be performed normally.

Furthermore, the printing paper P accommodated in the paper accommodation space 670 may be removed by the user later. When the front end of the printing paper P is pulled through the outlet 650, the paper accommodated in the paper accommodation space 670 is moved to the outlet 650 along a straight path, thereby preventing the paper from being jammed, wrinkled, or damaged.

Meanwhile, in an embodiment, the printing apparatus 61000 may be configured such that the bottom wall 614 of the main body 610 is detachable in order to facilitate the manual removal of the paper accumulated in the paper accommodation space 670.

Referring to FIGS. 22 to 24, hooks 613*b* configured to be hooked to the bottom wall 614 may extend downward at both ends of the lower portion of the rear wall 613, in which case the front ends of the hooks 613*b* may protrude outward.

Furthermore, push locations 613*a* may be marked on the upper ends of the hooks 613*b*, respectively. Accordingly, the hooks 613*b* may be configured to retreat inward when the user presses the push locations 613*a*.

Furthermore, stop protrusions 614*a* may be formed on the bottom wall 614 at locations corresponding to those of the hooks 613*b*. The front ends of the hooks protruding outward may be hooked and coupled to the stop protrusions 614*a*.

Accordingly, the user may remove the bottom wall 614 by pressing the push locations 613*a* and thus easily releasing the fastened state of the hooks 613*b*. Through this, the paper excessively accumulated in the paper accommodation space 670 may be removed.

Meanwhile, as an example, in the drawing, the first direction D1 is formed in a horizontal direction, so that the printing paper P is moved in the horizontal direction, is brought into contact with the first guide portion 611*a* formed on the inside surface of the front wall 611, is guided in the second direction, which is a vertical direction, and is then discharged upward. Alternatively, according to another embodiment, the first direction D1 may be formed in a vertical direction, so that the printing paper P is moved upward, and may then be transferred in the second direction D2, which is a horizontal direction, by a guide portion formed on the inside surface of the cover 620. In this case, the printing paper P may be discharged in the horizontal direction, in which case the outlet may be disposed in the front portion of the printing apparatus 61000. In this case, the paper accommodation space 670 may be formed under the cover 620 to extend in the third direction D3 toward the rear surface of the printing apparatus 6100.

A method of managing a thermal printer and a thermal printer for performing the same according to an embodiment will be described with reference to the drawings.

FIG. 25 is a sectional view of a thermal print head according to the present embodiment, and FIG. 26 is a diagram showing the top surface of the thermal print head according to the present embodiment. Referring to FIGS. 25 and 26, the thermal print head (TPH) 7100 according to the present embodiment may include a substrate 7110, a recording element 7120, and a driving circuit 7130. The TPH 7100 may include a plurality of recording elements 7120. Each of the recording elements 7120 may include a heat element 7121 deposited in a dot shape, and a protective layer 7122.

When printing is performed, the printing paper 720 is transferred by the rotation of a transfer roller (not shown) and a pressing roller 730, and a printing surface 721 is pressed by the pressing roller 730 while being in contact with the recording elements 7120. When the driving circuit 7130 drives at least one of the heating elements 7121, included in the plurality of recording elements 7120, according to the print data, the recording element 7120 including the driven heating element 7121 is heated and an image in the form of a dot is formed on a portion of the printing surface 721 in contact with the heated recording element 7120.

In the embodiments of the present specification, it is assumed that the printing paper 720 is linerless label paper, and thus an adhesive surface 722 is formed on the opposite side of the printing surface 721. Since the printing paper 720 is fabricated in the form of a roll, the printing surface 721 and the adhesive surface 722 remain in contact with each other for a considerable amount of time. Therefore, a part of the adhesive applied to the adhesive surface 722 remains on the printing surface 721, and the adhesive remaining on the printing surface 721 is accumulated in the recording elements 7110 and cured over time in a process in which the printing paper 720 is transferred in the state of being compressed against the recording elements 7110.

However, it was found through an experiment that when the heating elements 7121 were driven to heat the recording elements 7120, the adhesive accumulated and cured in the recording elements 7120 melted and was attached to and discharged on the printing paper 720. Accordingly, the TPH 7100 may be cleaned by driving the heating elements 7121 in various manners under predetermined conditions, and a specific method thereof will be described below.

FIG. 27 is a diagram showing the configuration of a printing apparatus including a thermal print head according to an embodiment. Referring to FIG. 27, the printing apparatus 7300 includes a controller 7310, storage 7320, and a printer 7330, and the printer 7330 includes a print head 7100.

The controller 7310 is a component including at least one processor such as a CPU. The controller 7310 may control the overall operation of the printing apparatus 7100, and may allow a printing operation to be performed by controlling the printer 7330. In particular, the controller 7310 may control the cleaning of the TPH 7100 to be performed by executing a program stored in the storage 7320. A detailed method in which the controller 7310 performs the cleaning of the TPH 7100 will be described in detail below with reference to other drawings.

Various types of programs and data may be stored in the storage 7320. In particular, a program for controlling the controller 7310 to clean the TPH 7100 may be stored in the storage 7320. In addition, various programs or data required for printing may be stored in the storage 7320.

The printer 7330 is a component for performing printing, and may include components such as the TPH 7100 and the pressing roller 730, shown in FIG. 25. The printer 7330 performs printing on the printing paper 720 in compliance to a command from the controller 7310.

A specific method of performing the cleaning of the TPH 7100 will be described below.

A method of performing the cleaning of the TPH 7100 in the above-described printing apparatus 7300 will be described below. FIGS. 28 to 30 are flowcharts illustrating a method of cleaning the thermal print head of a printing apparatus according to embodiments. The method of cleaning a thermal print head according to the embodiments shown in FIGS. 28 to 30 includes steps that are processed in a time-series manner by the TPH 7100 and the printing apparatus 7300 shown in FIGS. 25 to 27. Accordingly, the descriptions that are omitted below but have been given above in conjunction with the TPH 7100 and the printing apparatus 7300 shown in FIGS. 25 to 27 may also be applied to the method of cleaning a thermal print head according to the embodiment shown in FIGS. 28 to 30.

Referring to FIG. 28, at step 7401, the controller 7310 of the printing apparatus 7300 starts the cleaning of the TPH 7100 when a predetermined condition is satisfied. The condition for starting the cleaning of the TPH 7100 may be set in various manners. This will be described in detail with reference to FIGS. 29 and 30 below.

Referring to FIG. 29, at step 7501, the controller 7310 determines whether the time elapsed or the length of paper printed after the last cleaning is larger than a preset reference value. In this case, the reference value may be preset to an appropriate value for time or length. If, as a result of the determination, the time elapsed or the length of paper printed is larger than the preset reference value, the process proceeds to step 7502, and the controller 7310 starts the cleaning of the TPH 7100.

Meanwhile, in the embodiment shown in FIG. 29, the controller 7310 checks the elapsed time or the quantity of printing (the length of printed paper) based on the time when the last cleaning was performed, and compares it with the corresponding reference value. Alternatively, it may also be possible to check the elapsed time or the quantity of printing based on the time when printing was first performed. Alternatively, a setting may be made such that the controller 7310 checks the elapsed time or the quantity of printing based on the time when the printing apparatus 7300 performs some other specific operation and compares this with a corresponding reference value.

Referring to FIG. 30, at step 7601, the controller 7310 determines whether a predetermined specific operation has occurred for the printing apparatus 7300. In this case, the specific operation may be set in various manners. For example, it may be at least one of an operation of receiving an input requesting the cleaning of the TPH 7100 from a user, an operation in which the cover of the printing apparatus 7300 is opened and closed, an operation in which the power of the printing apparatus 7300 is turned on and off, an operation in which an error occurs in the printing apparatus 7300, and an operation of the maintenance of the printing apparatus 7300.

If, as a result of the determination, it is determined that the predetermined specific operation has occurred with respect to the printing apparatus 7300, the process proceeds to step 7602 and the controller 7310 starts the cleaning of the TPH 7100.

A case in which the controller 7310 starts the cleaning of the TPH 7100 in response to the reception of an input requesting the cleaning of the TPH 7100 from the user will be described in greater detail.

The printing apparatus 7300 may further include an input/output interface (not shown) configured to receive various inputs from a user or display the status of the printing apparatus 7300. According to an embodiment, the user may select the intensity of cleaning while requesting the cleaning of the TPH 7100 through the input/output interface. The intensity of cleaning may include a plurality of levels. If high-intensity cleaning is continuously performed, damage may be imposed to the TPH 7100.

Accordingly, if the user requests to perform cleaning of a high intensity higher than a predetermined reference value a predetermined number of times or more within a predetermined period of time, the controller 7310 may perform the cleaning by limiting the intensity of cleaning or the number of times cleaning is performed despite the request of the user.

Alternatively, if a thermistor is installed around the TPH 7100 and the temperature measured through the thermistor exceeds a reference value, the controller 7310 may also perform control not to perform cleaning despite the request of the user for cleaning or not to perform cleaning after a predetermined period of time.

Meanwhile, the controller 7310 may perform control so that the cleaning of the TPH 7100 is periodically performed after the time when the TPH 7100 is replaced. In this case, the intervals at which cleaning is performed may be determined according to the length of accumulated printing paper 720 after the time when the TPH 7100 is replaced. In this case, the term "interval" may mean a predetermined time interval or a predetermined length interval. In other words, the fact that the cleaning of the TPH 7100 is periodically performed means that cleaning may be performed at predetermined time intervals or that cleaning may be performed for each predetermined amount of printing (for each predetermined length of printing paper).

The controller 7310 may perform control so that the cleaning interval is shortened as the length of the accumulated printing paper 720 increases. The reason for this is that frequent cleaning is required because when the TPH 7100 is used more frequently, the degree of contamination is more severe. For example, the length of the accumulated printing paper 720 may be divided into a plurality of sections, and cleaning intervals may be set for the respective sections in advance. In this case, a section having a larger length value may have a shorter cleaning interval.

If it is assumed that the total length of the printing paper 720 is 30 km, the controller 7310 may perform control so that the TPH 7100 is cleaned every time the length of the printed printing paper 720 reaches 1 km in a first section (the length of the accumulated printing paper ranges from 0 to km), the TPH 7100 is cleaned every time the length of the printed printing paper 720 reaches 500 m in a second section (the length of the accumulated printing paper ranges from 10 to 20 km), and the TPH 7100 is cleaned every time the length of the printed printing paper 720 reaches 250 m in a third section (the length of the accumulated printing paper ranges from 20 to 30 km).

The controller 7310 may initialize the cleaning intervals when the TPH 7100 is replaced.

Meanwhile, the controller 7310 may perform control so that the cleaning of the TPH 7100 is not started in a specific situation even when the predetermined condition set in advance at step 401 is satisfied. In other words, the controller 7310 may control the cleaning of the TPH 7100 according to a positive condition and a negative condition. When the positive condition is satisfied, the cleaning of the TPH 7100 is started. In contrast, when both the positive and negative conditions are satisfied, the cleaning of the TPH 7100 may not be performed. All of the predetermined conditions described above with reference to FIGS. 29 and 30 correspond to positive conditions, and negative conditions will be described below.

The controller 7310 may perform control so that the cleaning of the TPH 7100 is not performed even when a positive condition is satisfied in the case where the remaining amount of the printing paper 720 is smaller than a predetermined reference. For example, although not shown, the printing apparatus 7300 may include a near-end sensor configured to detect the remaining amount of the printing paper 720. When the near-end sensor detects the remaining amount of the printing paper 720 as being lower than a predetermined reference, the controller 7310 may prevent the TPH 7100 from being cleaned. When the TPH 7100 is cleaned in the state in which the printing paper 720 runs out, the temperature of the TPH 7100 may be excessively high, and thus damage may be caused.

Alternatively, the controller 7310 may not clean the TPH 7100 in the case where the lifespan of the TPH 7100 is not long even when the positive condition is satisfied. In this case, a notification message directing the TPH 7100 to be manually cleaned may be additionally displayed to the user through a display screen provided in the printing apparatus 7300. For example, the controller 7310 may perform control so that the TPH 7100 can be prevented from being cleaned when in the case where the lifespan of the TPH 7100 is 50 km, printing has been performed on paper of a length of 45 km and thus the remaining lifespan is equal to or lower than 10% of the total lifespan.

Alternatively, the controller 7310 may check the number of damaged ones of the plurality of heating elements 7121 included in the TPH 7100 at predetermined intervals (for a predetermined quantity of printing), and may prevent the cleaning of the TPH 7100 from being performed even when the positive condition is satisfied in the case where the number of damaged heating elements 7121 is equal to or larger than a predetermined reference. In addition, the controller 7310 may not perform the control operation of determining whether to clean the TPH 7100 based on the number of damaged heating elements 7121 as described above until the quantity of printing performed after the replacement of the TPH 7100 reaches a predetermined reference.

Returning to FIG. 28 again, at step 7402, the controller 7310 selects a cleaning method based on at least one of a satisfied condition and pre-stored information. The controller 7310 may clean the TPH 7100 in various manners. First, various cleaning methods will be described, and then a specific method of selecting a cleaning method will be described.

First, the controller 7310 may perform cleaning by simultaneously driving all the heating elements 7121 included in the plurality of recording elements 7120 of the TPH 7100. This is called a full-dot method. In the case of the full-dot method, as all the recording elements 7120 are heated, the adhesive is well removed. In contrast, this method has disadvantages in that power consumption is high, the recording elements 7120 may be overheated, and the lifespan of the heating elements 7121 is shortened.

Second, the controller 7310 divides the plurality of recording elements 7120 of the TPH 7100 into two or more groups. Cleaning may be performed by driving heating elements 7121 included in recording elements 7120 for each group. This is called a group method. All of the plurality of groups may be sequentially driven, only some of the groups may be driven, or some of the groups may be driven at a shorter period than the other groups.

For example, when cleaning is performed once, the heating elements 7121 of recording elements 7120 included in a plurality of groups may be sequentially driven in groups. The recording element 7120 can be prevented from being overheated by driving the heating elements 7121 at time intervals as described above.

Furthermore, for example, only the heating elements 7121 of recording elements 7120 included in groups corresponding to a predetermined area having a high degree of contamination among the plurality of groups may be driven. As described above, contaminants may be effectively removed while lowering power consumption compared to the full-dot method by driving only the heating elements 7121 of some of the recording elements 7120.

Alternatively, for example, the plurality of groups may be driven in rotation. In greater detail, it is assumed that the recording elements 7120 may be divided into first to fourth groups. Cleaning may be performed by driving only the heating elements 7121 of recording elements 7120 included in the first group when first cleaning is performed, by driving only the heating elements 7121 of recording elements 7120 included in the second and third groups when the second cleaning is performed, by driving only the heating elements 7121 of recording elements 7120 included in the fourth group when third cleaning is performed.

Third, the controller 7310 may perform cleaning by driving at least one of the heating elements 7121 included in the plurality of recording elements 7120 while stopping the transfer of the printing paper 720. This is called a stop method. When cleaning is performed with the transfer of the printing paper 720 stopped as described above, it may be possible to expect the effect of saving the printing paper 720 compared to other cleaning methods. The reason for this is that in the case of other cleaning methods, all the printing paper 720 printed during a cleaning process has to be discarded. However, in the case of the stop method, the recording elements 7120 are heated with the printing paper 720 stopped. Assuming that the heating elements 7121 generate the same heat, the temperature of the recording elements 7120 is increased compared to other cleaning methods. Therefore, it is necessary to adjust the intensity and length of voltage signals applied to the heating elements 7121 by taking into consideration the above point.

Fourth, the controller 7310 may perform cleaning by applying a multi-pulse signal to at least one of the heating elements 7121 included in the plurality of recording elements 7120 of the TPH 7100. This is called a multi-pulse method. The multi-pulse method may expect an effect in which the recording elements 7120 are prevented from being overheated, and accordingly the lifespan thereof may be extended compared to that of the method of applying a single-pulse signal.

Fifth, the controller 7310 may perform cleaning by driving at least one of the heating elements 7121 included in the plurality of recording elements 7120, with the driving shaft of the pressing roller 730 being moved. This is called a roller movement method. When reference is made to FIG. 25 and the transfer direction of the printing paper 720 is taken into consideration, it can be seen that more adhesive is accumulated on the right sides of the recording elements 7120 (the direction in which the printing paper is transferred).

Accordingly, in order to effectively remove the adhesive accumulated on the right sides of the recording elements 7120, cleaning may be performed, with the driving shaft of the pressing roller 730 being moved by a predetermined length in the direction opposite to the direction in which the printing paper is transferred. In this way, the adhesives accumulated on the right sides of the recording elements 7120 may be effectively heated and pressed, so that it can be removed desirably.

Meanwhile, the driving shaft of the pressing roller 730 is not moved only when cleaning is performed, but the driving shaft of the pressing roller 730 may always be biased toward the direction in which the printing paper is transferred with respect to the recording elements 7120. However, even in this case, the location of the drive shaft of the pressing roller 730 needs to be determined such that the printing paper can be compressed between the pressing roller 730 and the recording elements 7120.

The controller 7310 may independently use the five cleaning methods described above, or may use two or more of the cleaning methods in combination.

Meanwhile, a specific method by which the controller 7310 selects a cleaning method is as follows.

As described above, the controller 7310 selects a cleaning method based on at least one of a satisfied condition and previously stored information. A method of selecting a cleaning method based on a satisfied condition will be described first. The conditions for determining whether to start cleaning have been described above. A cleaning method corresponding to each of the conditions may be preset and then stored. The reason for this is that an effective cleaning method may differ depending on the situation in which cleaning is performed. Accordingly, the manufacturer or user of the printing apparatus 7300 may preset cleaning methods that are considered to be the most suitable for respective conditions, and the controller 7310 may select a cleaning method according to a satisfied condition when the cleaning starts.

The controller 7310 may select a cleaning method based on previously stored information. In this case, the previously stored information refers to a cleaning method previously selected by the user. In other words, the user may preset a clearing method to be used to perform cleaning, and the controller 7310 may select the cleaning method according to the setting of the user.

At step 7403, the controller 7310 cleans the TPH 7100 by driving at least one of the heating elements 7121 included in the plurality of recording elements 7120 constituting the TPH 7100 according to the selected cleaning method.

Meanwhile, as described above, more adhesive may be accumulated on one side of each of the recording elements 7120 than on the other side. The structure of the TPH 7100 for solving this problem will be described below with reference to FIGS. 31 and 32.

FIGS. 31 and 32 are cross-sectional views showing thermal print heads according to other embodiments.

Referring to FIG. 31, it can be seen that the slope of the protective layer 7122 on the right side of the heating element 7121, i.e., an upstream side in the direction in which printing paper is transferred, is formed gentler than that on the opposite side. If the slope of the protective layer 7122 on a side in the direction in which the paper is transferred is steep, the adhesive attached to the surface of the paper may be separated as if it were cut off, and may then be accumulated on the TPH 7100. Accordingly, the present embodiment is intended to reduce the amount of accumulated adhesive by forming the slope of the protective layer 7122 gentle on an upstream side in the direction in which the printing paper is transferred.

Referring to FIG. 32, the recording element 7120 includes two heating elements 7121 and 7123. If the heating element 7121 used when printing is performed is referred to as a first heating element and the heating element 7123 used when cleaning is performed is referred to as a second heating element, the second heating element 7123 is located on the right side of the first heating element 7121, i.e., an upstream side in the direction in which the printing paper is transferred, so that the adhesives accumulated in the corresponding area are effectively removed.

The controller 7310 may drive only the second heating element 7123 when cleaning is performed, may drive both the first heating element 7121 and the second heating element 7123 as necessary, or may drive the two heating elements 7121 and 7123 alternately.

As described above, when a predetermined condition is satisfied, the printing apparatus 7300 according to an embodiment drives at least one of the heating elements 7121 included in the plurality of recording elements 7120 constituting the TPH 7100, so that the effect of applying heat to the cured adhesive accumulated on the TPH 7100 and allowing the adhesive to be attached onto printing paper and then discharged can be expected.

In addition, the printing apparatus 7300 according to an embodiment may perform cleaning in the most appropriate manner according to the situation by selecting a cleaning method based on a condition that is a basis for determining whether to perform cleaning.

A method of driving a linerless label printer for periodically repeating a hard lock prevention process according to an embodiment and a linerless label printer for performing the same will be described with reference to the drawings.

However, prior to the following description, the meanings of the terms used below are defined first.

Forward feeding means that linerless label paper is transferred in the same direction as a transfer direction when printing is performed, and back feeding means that linerless label paper is transferred in the opposite direction to a transfer direction when printing is performed.

Terms requiring descriptions, other than the terms defined above, will be separately described below.

FIG. 33 is a diagram showing a state in which label paper is transferred by a platen roller in a linerless label printer according to an embodiment, and FIG. 34 is a diagram showing the configuration of the linerless label printer according to the present embodiment. Referring to FIGS. 33 and 34, the linerless label printer 13100 according to the present embodiment includes a controller 13210, storage 13220, a print head 13230, a platen roller 13240, and a taken sensor 13250.

When printing is performed, the linerless label paper 1320 is transferred by the rotation of the platen roller 13240, and the print head 13230 performs printing on the linerless label paper 1320 in compliance with a command from the controller 13210.

In the embodiments of the present specification, the linerless label paper 1320 is used as printing paper, and an adhesive surface is formed on the surface of the linerless label paper 1320 opposite to the printing surface of the linerless label paper 1320. Accordingly, when the linerless label paper 1320 is not printed for a long time, there may occur a hard lock in which the adhesive surface is fixed to the platen roller 13240 between the platen roller 13240 for transferring printing paper and the print head 13230 for performing a printing operation.

The controller 13210 is a component including at least one processor, such as a CPU. The controller 13210 may control the overall operation of the linerless label printer 13100, and may allow a printing operation to be performed by controlling the print head 13230. In particular, the controller 13210 may control the platen roller 13240 to perform a hard lock prevention process or a hard lock resolution process on the linerless label paper 1320 by executing a program stored in the storage 13220. A specific method in which the controller 13210 performs a hard lock prevention process or a hard lock resolution process on the linerless label paper 1320 will be described in detail below with reference to other drawings.

Various types of programs and data may be stored in the storage 13220. In particular, a program for controlling the platen roller 13240 so that the controller 13210 performs a hard lock prevention process or a hard lock resolution process on the linerless label paper 1320 may be stored in the storage 13220. In addition, the storage 13220 may store various types of programs or data required to perform printing.

The print head 13230 is a component for performing printing, and performs printing on the linerless label paper 1320 in compliance with a command from the controller 13210. The platen roller 13240 is a component for transferring the linerless label paper 1320 by rotating while being in contact with the adhesive surface of the linerless label paper 1320, and transfers the linerless label paper 1320 in compliance with a command from the controller 13210.

The taken sensor 13250 may detect whether the linerless label paper 1320 transferred by the platen roller 13240 has reached a set location. In addition, the controller 13210 may determine whether a hard lock phenomenon has occurred in the linerless label paper 1320 by using a step motor (not shown) together with the taken sensor 13250. For example, it is assumed that the taken sensor 13250 can detect whether the linerless label paper 1320 has reached exactly a location of 15 mm in a forward feeding direction. In this case, when the linerless label paper 1320 is normally fed up to 18 mm based on the rotation speed of the step motor but the taken sensor 13250 is not reached, the controller 13210 may determine that a hard lock phenomenon has occurred in the linerless label paper 1320.

A specific method of performing a hard lock prevention process or a hard lock resolution process on the linerless label paper 1320 will be described below.

FIG. 35 is a flowchart illustrating a method of performing a hard lock prevention process for the linerless label printer 13100 according to an embodiment, and FIG. 36 is a flowchart illustrating a hard lock resolution process for the linerless label printer 13100 according to an embodiment. The methods of driving the linerless label printer 13100 shown in FIGS. 35 and 36 include steps that are processed in a time-series manner by the linerless label printer 13100 shown in FIGS. 33 and 34. Accordingly, the descriptions that are omitted below but have been given above in conjunction with the linerless label printer 13100 shown in FIGS. 33 and 34 may also be applied to the methods of driving the linerless label printer 13100 according to the embodiments shown in FIGS. 35 and 36.

The method of performing a hard lock prevention process on the linerless label paper 1320 will be described below. Referring to FIG. 35, at step 13310, the controller 13210 of the linerless label printer 13100 determines a method of driving the platen roller 13240 in order to perform a hard lock prevention process in which back feeding and forward feeding are performed on the linerless label paper 1320 at least once. At step 13320, the controller 13210 drives the platen roller 13240 according to the determined driving method. The method of driving the platen roller 13240 may be determined in various manners, which will be described in detail with reference to FIG. 37.

Referring to FIG. 37, it can be seen that there are shown a first point 1330 where the print head 13230 and the platen roller 13240 abut on each other, a second point 1340 where the linerless label paper 1320 is cut when printing on a piece of linerless label paper 1320 is terminated, and a third point 1350 where the taken sensor 13250 is located. When printing is not performed for a long period of time in the state in which the front end of the linerless label paper 1320 cut when printing on a piece of linerless label paper 1320 is terminated is located at the second point 1340, a hard lock phenomenon may occur at the first point 1330 in connection with the linerless label paper 1320 and the platen roller 13240. According to an embodiment, the controller 13210 may perform a hard lock prevention process by feeding the linerless label paper 1320 forward by 15 mm from the second point 1340 by driving the platen roller 13240 to move the linerless label paper 1320 to the third point 1350, feeding the linerless label paper 1320 back by 25 mm from the third point 1350 to move the linerless label paper 1320 to the first point 1330, and then feeding the linerless label paper 1320 forward by 10 mm from the first point 1330 to move back the linerless label paper 1320 to the second point 1340. In this case, the linerless label paper 1320 may be fed forward by more than 15 mm from the second point 1340. However, if so, a phenomenon in which the adhesive surfaces of the linerless label paper 1320 may stick to each other occurs during subsequent back feeding, and thus it is preferable to perform forward feeding up to 15 mm. In another embodiment, the controller 13210 may perform a hard lock prevention process of feeding the linerless label paper 1320 back from the second point 1340 by 10 mm by driving the platen roller 13240 to move the linerless label paper 1320 to the first point 1330, feeding the linerless label paper 1320 forward by 25 mm from the first point 1330 to move the linerless label paper 1320 to the third point 1350, and then feeding the linerless label paper 1320 back by 15 mm from the third point 1350 to move the linerless label paper 1320 back to the second point 1340. In this case, the controller 13210 of the linerless label printer 13100 may drive the platen roller 13240 to periodically perform a hard lock prevention process on the linerless label paper 1320 at regular intervals (e.g., 1 hour).

In connection with this, the controller 13210 may drive the platen roller 13240 to perform back feeding and then forward feeding when driving the platen roller 13240 to perform a hard lock prevention process.

In connection with this, the controller 13210 drives the platen roller 13240 to perform a hard lock prevention process. Every time the platen roller 13240 repeats forward feeding and back feeding, the length of the forward feeding and the length of the back feeding may be changed. In addition, when the forward feeding and the back feeding are repeatedly performed, the paper is slightly pushed up due to the adhesive effect of the linerless label. To prevent this, the controller 13210 may set the length of the forward feeding and the length of the back feeding to different values when the hard lock prevention process is performed.

Furthermore, the controller 13210 may drive the platen roller 13240 so that the hard lock prevention process is periodically repeated for the linerless label paper 1320. In this case, the controller 13210 may determine the interval at which the hard lock prevention process is repeatedly performed based on a temperature measurement value of the thermistor provided in the linerless label printer. The relationship between the temperature (the season) and the frequency of occurrence of a hard lock is as follows. As the temperature is higher, the adhesion is higher. Accordingly, in summer, the temperature of an environment outside the linerless label printer 13100 is high, so the frequency of occurrence of a hard lock is high. In contrast, in winter, the temperature of the environment outside the linerless label printer 13100 is low, so that the frequency of occurrence of a hard lock is relatively low. Accordingly, the controller 13210 may shorten the interval at which the hard lock prevention process is performed in summer when the temperature is high, and may set the interval at which the hard lock prevention process is performed to a relatively long period in winter when the temperature is low. Thereafter, the platen roller 13240 may be driven to periodically repeat the hard lock prevention process at set intervals. In this case, the thermistor is a device capable of measuring a temperature lower than about 300° C. with relatively high accuracy, and the print head 1330 may include a plurality of thermistors.

Furthermore, when the interval at which the hard lock prevention process is to be performed arrives, the controller 13210 may reset the counting of the interval and then count the interval again without performing the hard lock prevention process when the linerless label printer is performing printing. When the hard lock prevention process is performed while the linerless label printer is performing printing, a printing operation may be slowed down or the hard lock prevention process may collide with the printing operation. Accordingly, it is preferable that the controller 13210 does not perform the hard lock prevention process while the label printer 13100 is performing printing.

Furthermore, when the linerless label printer performs printing before the interval at which the hard lock prevention process is to be performed arrives, the controller 13210 may reset the counting of the interval. If a short period of time elapses after the linerless label printer has performed printing, the printing is performed normally and thus the possibility of occurrence of a hard lock phenomenon is low, so that it is preferable that the hard lock prevention process is not performed.

Furthermore, the controller 13210 may determine the numbers of times and feeding lengths of the back feeding and the forward feeding included in the hard lock prevention process based on the input of the user. The linerless label printer 13100 may further include an input/output interface (not shown) capable of receiving various inputs from the user or displaying the status of the linerless label printer 13100. According to an embodiment, the controller 13210 may determine the interval at which the hard lock prevention process is performed, details of the hard lock prevention process (the order, number of times and feeding lengths of forward feeding and back feeding), and whether to perform the hard lock prevention process based on a command from a driver in a host server or a software development kit (SDK).

In connection with this, the controller 13210 may change the interval by receiving an interval change request for the hard lock prevention process from the host device. In this case, the interval change request may be a request for a change of the interval at which the hard lock prevention process is repeated according to a season or preset working time.

In connection with this, the relationship between the temperature (the season) and the interval at which the hard lock prevention process is performed is as follows. As the temperature is higher, the adhesive force is higher. Accordingly, in summer, the temperature of an environment outside the linerless label printer 13100 is high, so that the number of repetitions of the hard lock prevention process required is large. In contrast, in winter, the temperature of an environment outside the linerless label printer 13100 is low, so that the number of repetitions of the hard lock prevention process required is small. Accordingly, the controller 13210 may receive a request for a change of the interval at which the hard lock prevention process is performed from the host device, and may set the interval at which the hard lock prevention process is performed to a relatively short period in summer when the temperature is high and set the interval at which the hard lock prevention process is performed to a relatively long period in winter when the temperature is low.

Furthermore, the relationship between working hours and the interval at which the hard lock prevention process is performed is as follows. As the working hours are longer, the linerless label printer is used more often. Accordingly, as the working hours are longer, the number of repetitions of the hard lock prevention process required is smaller. Therefore, the controller 13210 may receive a request for a change of the interval at which the hard lock prevention process is repeated according to preset working hours from the host device, and may change the interval.

Meanwhile, the controller 13210 may allow the linerless label printer 13100 to perform the hard lock resolution process or the hard lock prevention process only during non-working hours when the linerless label printer 13100 is not used.

The method of performing a hard lock resolution process on the linerless label paper 1320 will be described below. Referring to FIG. 36, at step 13410, the controller 13210 may determine whether a hard lock phenomenon has occurred in the linerless label paper 1320. In this case, step 13410 may be performed after step 13320. More specifically, if the taken sensor 13250 does not detect the linerless label paper 1320 even when the platen roller 13240 has been driven to feed the linerless label paper 1320 forward by a preset length, the controller 13210 determines that a hard lock phenomenon has occurred in the linerless label paper 1320. In this case, the controller 13210 may determine whether a hard lock phenomenon has occurred in the linerless label paper 1320 by using a step motor (not shown) together with the taken sensor 13250. For example, assuming that the taken sensor 13250 can detect whether the linerless label paper 1320 has reached exactly 15 mm in a forward feeding direction, the controller 13210 may determine that a hard lock phenomenon has occurred in the linerless label paper 1320 if the taken sensor 13250 is not reached even when the linerless label paper 1320 is fed forward by 18 mm based on the number of revolutions of the step motor.

If, as a result of the determination, it is determined that a hard lock phenomenon has occurred in the linerless label paper 1320, the platen roller 13240 is driven to perform a hard lock resolution process in which back feeding and forward feeding are repeated at shorter length or time intervals than those of a hard lock prevention process at step 13420. A method of driving the platen roller 13240 to perform a hard lock resolution process may be determined in various manners, which will be described in detail with reference to FIG. 37.

Referring to FIG. 37, as described above, it can be seen that there are shown a first point 1330 where the print head 13230 and the platen roller 13240 abut on each other, a second point 1340 where the linerless label paper 1320 is cut upon the termination of printing for a piece of linerless label paper 1320, and a third point 1350 where the taken sensor 13250 is located. The starting point of the hard lock resolution process for the linerless label paper 1320 may vary depending on the situation. According to an embodiment, in the state in which the front end of the cut linerless label paper 1320 cut upon the termination of printing for a piece of linerless label paper 1320 is located at the second point 1340, when the linerless label is not printed for a long period of time, the paper 1320 and the platen roller 13240 may suffer from a hard lock phenomenon at the first point 1330. In this case, the hard lock resolution process may be performed on the linerless label paper 1320, and a method of performing the process is as follows. The controller 13210 repeatedly performs the hard lock resolution process of feeding the linerless label paper 1320 back from the second point 1340 by 3 mm, allowing a predetermined time interval, feeding the linerless label paper 1320 forward again by 6 mm, allowing a predetermined time interval, and then feeding the linerless label paper 1320 back by 6 mm by driving the platen roller 13240. In this case, the reason for allowing the predetermined time intervals is to provide sufficient time required for the linerless label paper 1320 to be separated from the platen roller 13240. In addition, since the linerless label paper 1320 is curled when forward feeding is preceded in the hard lock resolution process, it is preferable that back feeding is preceded.

In connection with this, the controller 13210 may drive the platen roller 13240 to perform the hard lock resolution process, in which case the platen roller 13240 may be driven to allow a preset time interval between back feeding and forward feeding. In this case, allowing a preset time interval between back feeding and forward feeding means allowing the above-described predetermined time interval therebetween.

Referring to FIG. 38, at step 13610, the controller 13210 may determine whether a hard lock phenomenon has occurred in the linerless label paper 1320 every time the linerless label printer 13100 is powered on. If, as a result of the determination, it is determined that a hard lock phenomenon has occurred, the controller 13210 may drive the platen roller 13240 so that the platen roller 13240 performs a hard lock resolution process at step 13620. In addition, the controller 13210 may drive the platen roller 13240 to perform a hard lock resolution process on the linerless label paper 1320 every time the linerless label printer 13100 is powered on. The reason for this is to perform the hard lock resolution process unconditionally every time power is turned on.

FIG. 39 shows steps that are performed after step 13420 of FIG. 36. Referring to this drawing, at step 13730 after step 13420 of performing the hard lock resolution process, the controller 13210 detects whether the hard lock phenomenon of the linerless label paper 1320 has been resolved by performing the hard lock resolution process based on the result of detection of the taken sensor 13250. If, as a result of the determination, it is determined that the hard lock phenomenon has been resolved, the controller 13210 may determine whether the platen roller 13240 is in a normal state based on the numbers of repetitions of forward feeding and back feeding performed on the linerless label paper 1320 during the hard lock resolution process and the accumulated print distance of the linerless label printer at step 13740. If, as a result of the determination, it is determined that the platen roller 13240 is in an abnormal state, the controller 13210 may transmit a message indicating that the platen roller 13240 is in an abnormal state to the host device or may allow the display of the linerless label printer to output a message indicating that the platen roller 13240 is in an abnormal state at step 13750. Each of the steps will be described in detail below.

Meanwhile, when the accumulated print distance of the linerless label printer 13100 increases, the diameter of the platen roller 13240 decreases due to wear. Accordingly, when it is determined whether the platen roller is in a normal state, the controller 13210 may perform determination by taking into consideration the accumulated print distance of the linerless label printer. For example, even when the number of steps of the motor driving the platen roller 13240 is 10, the linerless label paper 1320 transferred by the platen roller 13240 having a longer accumulated print distance is transferred by a shorter length than the linerless label paper 1320 transferred by a platen roller having a shorter accumulated print distance. In addition, the controller 13210 may determine that the platen roller 13240, which has transferred the linerless label paper 1320 by a length shorter than a transfer length corresponding to an accumulated print distance, is in an abnormal state.

Meanwhile, at step 13730, the controller 13210 may determine whether the hard lock phenomenon of the linerless label paper 1320 has been resolved by performing the hard lock resolution process based on the result of detection of the taken sensor 13250. More specifically, after the hard lock resolution process has been performed, the controller 13210 may drive the platen roller 13240 to feed the linerless label paper 1320 forward to the taken sensor 13250. If the controller 13210 drives the platen roller 13240 to feed the linerless label paper 1320 forward to the taken sensor 13250 but the taken sensor 13250 does not detect this, the controller 13210 may determine that the hard lock phenomenon has still occurred in the linerless label paper 1320. Thereafter, the controller 13210 may drive the platen roller 13240 to perform the hard lock resolution process again. In this case, the number of repetitions of the hard lock resolution process accumulated at step 13730 is used when it is determined whether the platen roller 13240 is in a normal state.

Meanwhile, a hard lock sensor may be provided between the taken sensor 13250 and the print head 13230, and may detect whether a hard lock phenomenon has occurred. If the controller 13210 drives the platen roller 13240 to feed the linerless label paper 1320 forward to the hard lock detection sensor but the hard lock detection sensor does not detect this, the controller 13210 may determine that the hard lock phenomenon has still occurred in the linerless label paper 1320. In this case, the hard lock sensor may detect whether the linerless label paper 1320 transferred by the platen roller 13240 has reached a set location.

Furthermore, when the hard lock resolution process is performed by the platen roller 13240, the controller 13210 controls the platen roller 13240 so that the linerless label paper 1320 can be moved only between the taken sensor 13250 and the hard lock detection sensor. In this case, the hard lock sensor may be provided at the rear end of the taken sensor. In other words, the hard lock sensor may be disposed between the taken sensor 13250 and the print head 1330.

If, as a result of the determination at step 13730, it is determined that the hard lock phenomenon has been resolved, the controller 13210 may determine whether the platen roller 13240 is in a normal state based on the numbers of repetitions of forward feeding and back feeding performed on the linerless label paper 1320 during the hard lock resolution process and the accumulated print distance of the linerless label printer at step 13740. The relationship between the number of repetitions of the hard lock resolution process and the accumulated print distance is as follows. The surface of the platen roller 13240 is coated with an anti-adhesive agent that prevents adhesion to the adhesive surface of the linerless label paper 1320. Accordingly, in the case where the accumulated print distance is short, even when the number of repetitions of the hard lock resolution process is small, the hard lock phenomenon may be resolved. However, as the accumulated print distance increases, the anti-adhesive agent with which the platen roller 13240 is coated is lost, and accordingly the number of repetitions of the hard lock resolution process for solving the hard lock phenomenon increases. Therefore, the maximum numbers of repetitions of the hard lock resolution process may be set for respective accumulated print distances in advance, and the controller 13210 may determine that the platen roller 13240 is in an abnormal state when the number of repetitions of the hard lock resolution process exceeds the maximum number of repetitions for a corresponding accumulated print distance.

In connection with this, when the number of repetitions of forward feeding and back feeding performed on the linerless label paper during the hard lock resolution process exceeds the maximum number of repetitions of the hard lock resolution process corresponding to the accumulated print distance of the linerless label printer, the controller 13210 may determine that the platen roller 13240 is in an abnormal state.

Referring to FIG. 40, it can be seen that the maximum numbers of repetitions of the hard lock resolution process are preset for respective accumulated print distances. For example, assuming that the accumulated print distance of the linerless label printer 13100 is 8 km and the number of repetitions of the hard lock resolution process is 5, the controller 13210 determines that the platen roller 13240 is in an abnormal state because the number of repetitions of the hard lock resolution process exceeds 3, which is the corresponding maximum number of repetitions.

Furthermore, the controller 13210 may modify the maximum number of repetitions of the hard lock resolution process based on the ambient temperature of the linerless label printer 13100. The maximum number of repetitions of the hard lock resolution process may be set in various manners depending on the temperature (the season). The relationship between the temperature (the season) and the maximum number of repetitions of the hard lock resolution process is as follows. As the temperature is higher, the adhesion is higher. In summer, the temperature of an environment outside the linerless label printer 13100 is high, and thus the number of repetitions of the hard lock resolution process required is large. In contrast, in winter, the temperature of the environment outside the linerless label printer 13100 is low, and thus the number of repetitions of hard lock resolution process required is small. Accordingly, the controller 13210 may set the maximum number of repetitions of the hard lock resolution process to a high value in summer when the temperature is high, and may set the maximum number of repetitions of the hard lock resolution process to a low value in winter when the temperature is low.

If, as a result of the determination at step 13740, it is determined that the platen roller 13240 is in an abnormal state, the controller 13210 may transmit a message indicating that the platen roller 13240 is in an abnormal state to the host device or may allow the display to output a message indicating that the platen roller 13240 is in an abnormal state at step 13750. The linerless label printer 13100 may further include an input/output interface (not shown) capable of receiving various inputs from the user or displaying the status of the linerless label printer 13100. According to an embodiment, the linerless label printer may notify the user that the platen roller 13240 is in an abnormal state via the input/output interface. In addition, a message directing the user to open and close the cover of the linerless label printer 13100 or a message directing the user to replace the platen roller 13240 of the linerless label printer 13100 may be provided to the user. Moreover, the linerless label printer 13100 may inform the central management server that the platen roller 13240 is in an abnormal state, thereby inducing a visit of a repair technician.

Meanwhile, the linerless label printer 13100 according to an embodiment may include a marker sensing module including a sensor configured to recognize markers arranged on the linerless label paper 1320, and a step counter for counting the number of steps of the motor driving the platen roller 13240. In addition, the linerless label printer may include a cutting unit capable of automatically or manually cutting the linerless label paper 1320 as a component for cutting the linerless label paper 1320.

In this case, the configuration of the markers arranged on the linerless label paper 1320 will be described in greater detail. The linerless label paper 1320 includes a front surface F configured such that an output is printed thereon, and a rear surface R configured to be opposite to the front surface F. In this case, an adhesive may be applied to the rear surface R of the linerless label paper 1320.

In this case, a plurality of markers M may be repeatedly arranged on the rear surface R of the linerless label paper 1320. In this case, each of the markers M may be any type of mark that enables a location marked with the marker M and a location not marked with the marker M to be optically distinguished from each other based on the direction in which the linerless label paper 1320 is transferred. In particular, the marker M is intended to recognize the location of a vertical component with respect to the direction in which the linerless label paper 1320 is transferred, and may be formed in a straight line perpendicular to the direction in which the linerless label paper 1320 is transferred.

Meanwhile, as described above, the plurality of markers M may be repeatedly formed. In particular, the plurality of markers M may be formed at predetermined intervals. In this case, the term "predetermined intervals" does not mean that all the markers M are arranged at regular intervals, but means that according to the embodiment, some of the markers M may be arranged at a different type of intervals and a group of the markers M arranged at the different type of intervals may appear periodically throughout the linerless label paper 1320.

In connection with this, when the print head prints one unit output on the linerless label paper 1320, the controller 13210 may allow the platen roller 13240 to transfer the linerless label paper until a cutting target marker initially disposed downstream of the location where the printing of the unit output is completed reaches the cutting location of the cutter based on the direction in which the linerless label paper is transferred.

In the linerless label printer 13100 according to an embodiment, the operation of the above-described controller 13210 will be described in greater detail. When the print head 13230 prints one unit output on the linerless label paper 1320, the controller 13210 allows the platen roller 13240 to transfer the linerless label paper until a marker, i.e., a cutting target marker, initially disposed downstream of the location where the printing of the unit output is completed reaches the cutting location of the cutter based on the direction in which the linerless label paper 1320 is transferred. In other words, the controller 13210 uses a marker disposed immediately downstream of the location where the printing of the unit output is completed based on the direction in which the linerless label paper 1320 is transferred as a cutting target marker, and transfers the linerless label paper 1320 so that the cutting target marker reaches the cutting location before the linerless label paper 1320 is cut. In addition, the controller 13110 may allow the cutter to cut the linerless label paper 1320 after the cutting target marker reaches the cutting location.

In this case, as an embodiment, in order to transfer the linerless label paper 1320 until the cutting target marker reaches the cutting location, the controller 13210 may calculate a transfer target distance, over which the platen roller 13240 needs to transfer the linerless label paper 1320 from the location in which the printing of the unit output of 13230 is completed by the print head, based on the location of the marker detected by a marker sensor. In this case, the transfer target distance for the linerless label paper 1320 is the distance over which the linerless label paper 1320 is to be transferred in the transfer direction at the time when the printing of a unit output is completed, and is the distance over which the linerless label paper 1320 needs to be transferred in order for the cutting target marker, initially disposed downstream of the location at which the printing of the linerless label paper 1320 on which a unit output is completed, to reach the cutter.

In order to calculate the transfer target distance, the controller 13210 may calculate or count at least one of the transfer distance for the linerless label paper 1320 or the number of steps of the motor, and may use it to calculate the transfer target distance. More specifically, the controller 13210 may count the transfer distance over which the platen roller 13240 transfers the linerless label paper 1320 while the print head 13230 prints the unit output, and may initialize the counted transfer distance when the marker is detected by the marker sensor before the print head 13230 completes the printing of the unit output. The controller 13210 may recount the initialized transfer distance when a marker is detected during printing, and may calculate the transfer target distance using the counted transfer distance when the print head 1330 completes the printing of the unit output. In this case, the transfer distance and the transfer target distance may be calculated as the numbers of steps of the motor, or may be calculated in units of actual distances. In other words, the controller 13210 may count the transfer distance based on the number of steps of the motor counted by a step counter, may count the number of steps of the motor while initializing the counted number of steps of the motor when the marker sensor detects the marker, and may use the number of steps of the motor without change or may convert the number of steps of the motor into a transfer distance and use the obtained transfer distance.

Meanwhile, the controller 13210 may determine the number of times and feeding length of back feeding and forward feeding performed in the hard lock prevention process based on the input of the user. When the length of back feeding is determined, the maximum value of the length of back feeding may be determined to be the length of a passage through which the linerless label paper passes and which is formed between the cutter for cutting the linerless label paper 1320 and the platen roller 13240. The reason for this is to prevent the length of back feeding from being set outside the range within which the platen roller 13240 can be driven by excessively setting the length of back feeding.

Meanwhile, when receiving a print command while driving the platen roller 13240 to perform the hard lock resolution process, the controller 13210 may subtract the length of back feeding, performed in the hard lock resolution process, from the length of back feeding required for printing, and may then allow the platen roller to be driven. The reason for this is to prevent the linerless label paper 1320 from being transferred out of the range, within which the platen roller 13240 can be driven, when back feeding is performed by the length of back feeding normally required for printing while performing the hard lock resolution process.

The term "unit" used in the above-described embodiments means software or a hardware component such as a field-programmable gate array (FPGA) or application-specific integrated circuit (ASIC), and a "unit" performs a specific role. However, a "unit" is not limited to software or hardware. A "unit" may be configured to be present in an addressable storage medium, and also may be configured to run one or more processors. Accordingly, as an example, a "unit" includes components, such as software components, object-oriented software components, class components and task components, processes, functions, attributes, procedures, subroutines, segments in program code, drivers, firmware, microcode, circuits, data, a database, data structures, tables, arrays, and variables.

Components and a function provided in "unit(s)" may be coupled to a smaller number of components and "unit(s)" or divided into a larger number of components and "unit(s)."

In addition, components and "unit(s)" may be implemented to run one or more CPUs in a device or secure multimedia card.

The method of managing a thermal printer according to the embodiment described via FIGS. 28 to 30 and the method of driving a linerless label printer according to each of the embodiments described via FIGS. 35 to 40 may be implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

Furthermore, the method of managing a thermal printer according to the embodiment described via FIGS. 28 to 30 and the method of driving a linerless label printer according to each of the embodiments described via FIGS. 35 to 40 may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, the method of managing a thermal printer according to the embodiment described via FIGS. 28 to 30 and the method of driving a linerless label printer according to each of the embodiments described via FIGS. 35 to 40 may be implemented in such a manner that the above-described computer program is executed by a computing apparatus. The computing apparatus may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing apparatus. An example of the instructions is instructions which are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within the computing device. As an example, the memory may include a volatile memory unit or a set of the volatile memory units.

As another example, the memory may include a non-volatile memory unit or a set of the non-volatile memory units. Furthermore, the memory may be another type of computer-readable medium, such as a magnetic or optical disk.

In addition, the storage device may provide a large storage space to the computing device. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

According to any one of the above-described technical solutions, there may be expected an effect in which when a predetermined condition is satisfied, at least one of the heating elements included in the plurality of recording elements constituting the thermal print head is driven, and thus heat is applied to the adhesive accumulated and cured on the thermal print head, with the result that the adhesive is attached to printing paper and then discharged to the outside.

Furthermore, according to any one of the above-described technical solutions, a cleaning method is selected based on a condition used when whether to perform cleaning is determined, and thus cleaning may be performed in the manner most appropriate for a corresponding situation.

The effects that can be obtained by the embodiments disclosed herein are not limited to the above-described effects, and other effects that have not been described above will be clearly understood by those having ordinary skill in the art, to which the present invention pertains, from the foregoing description.

The above-described embodiments are intended for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

The scope of protection pursued through the present specification should be defined by the attached claims, rather than the detailed description. All modifications and variations which can be derived from the meanings, scopes and equivalents of the claims should be construed as falling within the scope of the present invention.

What is claimed is:

1. A linerless label printer comprising:

a print head configured to perform printing;

a platen roller configured to transfer linerless label paper by rotating in contact with an adhesive surface of the linerless label paper;

a controller configured to control driving of the platen roller; and a cutter spaced apart from the platen roller and configured to cut the linerless label paper at a cutting position;

wherein when power of the linerless label printer is turned on, the controller is configured to drive the platen roller to perform a hard-lock prevention process for preventing a hard-lock phenomenon in which the adhesive surface of the linerless label paper fixedly adheres to the platen roller, the hard-lock prevention process being performed by performing back feeding and forward feeding on the linerless label paper at least once based on a printing position of the print head or a cutting position of the cutter, or a combination of the printing position of the print head and the cutting position of the cutter.

2. The linerless label printer of claim 1, wherein the controller drives the platen roller to periodically perform the hard-lock prevention process.

3. The linerless label printer of claim 2, wherein the controller determines a period, at an end of which the hard-lock prevention process is performed, based on a measured temperature value of a thermistor provided in the linerless label printer.

4. The linerless label printer of claim 2, wherein the controller, when the linerless label printer is performing printing at the time an end of a period at which the hard-lock prevention process is performed is reached, resets a count of the period and then counts the period again without performing the hard-lock prevention process.

5. The linerless label printer of claim 2, wherein the controller, when the linerless label printer has performed printing before an end of a period at which the hard-lock prevention process is performed is reached, resets a count of the period.

6. The linerless label printer of claim 2, wherein the controller sets a period at an end of which the hard-lock prevention process is performed or whether to perform the-hard lock prevention process.

7. The linerless label printer of claim 1, wherein the controller:
- determines lengths of the back feeding and the forward feeding that are performed in the hard-lock prevention process; and
- when determining the length of the back feeding, determines a maximum value of the length of the back feeding to be a length of a passage through which the linerless label paper passes and which is formed between the platen roller and the cutter configured to cut the linerless label paper.

8. The linerless label printer of claim 1, wherein the controller drives the platen roller to perform the hard-lock prevention process while making lengths of the forward feeding and the back feeding different from each other when the forward feeding and the back feeding are performed.

9. The linerless label printer of claim 1, wherein the controller determines whether there has occurred a hard-lock phenomenon in which the adhesive surface of the linerless label paper is fixedly adhered to the platen roller.

10. The linerless label printer of claim 9, wherein the controller, when the hard-lock phenomenon has occurred, drives the platen roller to perform a hard-lock resolution process of performing each of back feeding and forward feeding at least once over a shorter length or in a shorter period than the hard-lock prevention process.

11. The linerless label printer of claim 10, wherein the controller, when receiving a print command while driving the platen roller to perform the hard-lock resolution process, causes the platen roller to drive over a length of the back feeding that is obtained by subtracting a length, over which the back feeding has been performed in the hard-lock resolution process, from a length of the back feeding required for printing.

12. The linerless label printer of claim 9, wherein the controller determines whether the platen roller is in a normal state based on a number of times the forward feeding and the back feeding have been performed on the linerless label paper during the hard-lock resolution process and a cumulative printing distance of the linerless label printer.

13. The linerless label printer of claim 12, wherein the controller, when it is determined that the platen roller is in an abnormal state, transmits a message indicating that the platen roller is in an abnormal state to a host device, or causes a display of the linerless label printer to output a message indicating that the platen roller is in an abnormal state or a message instructing a user to open a cover.

14. The linerless label printer of claim 12, wherein the controller sets a maximum number of repetitions of the hard-lock resolution process according to the cumulative printing distance.

15. The linerless label printer of claim 1, wherein:
- the controller determines whether there has occurred a hard-lock phenomenon in which the adhesive surface of the linerless label paper is fixedly adhered to the platen roller;
- the linerless label printer further comprises a first sensor configured to detect whether the linerless label paper transferred by the platen roller has reached a set position; and
- the controller, when the control unit drives the platen roller to feed the linerless label paper forward by a predetermined length but the first sensor does not detect the linerless label paper, determines that the hard-lock phenomenon has occurred in the linerless label paper.

16. The linerless label printer of claim 15, further comprising:
- a second sensor configured to detect whether the linerless label paper transferred by the platen roller has reached a set position;
- wherein the second sensor is disposed between the first sensor and the print head; and
- wherein the controller, when a hard-lock resolution process is performed by the platen roller, controls the platen roller so that the linerless label paper moves only between the first sensor and the second sensor.

17. The linerless label printer of claim 1, further comprising:
- a marker detector configured to detect markers arranged on the linerless label paper,
- wherein the controller, when the print head prints one unit printout on the linerless label paper, controls the platen roller to transfer the linerless label paper until a cutting object marker, first arranged after a position where the printing of the unit printout has been completed based on a direction in which the linerless label paper is transferred, reaches the cutting position of the cutter.

18. The linerless label printer of claim 1, wherein the controller sequentially performs the back feeding and the forward feeding on the linerless label paper at least once while performing the hard-lock prevention process once.

19. The linerless label printer of claim 1, wherein the controller first performs the back feeding on the linerless label paper and then performs the forward feeding.

* * * * *